United States Patent
Ko et al.

(10) Patent No.: US 11,250,326 B1
(45) Date of Patent: Feb. 15, 2022

(54) SPLITTING NEURAL NETWORK FILTERS FOR IMPLEMENTATION BY NEURAL NETWORK INFERENCE CIRCUIT

(71) Applicant: Perceive Corporation, San Jose, CA (US)

(72) Inventors: Jung Ko, San Jose, CA (US); Kenneth Duong, San Jose, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 461 days.

(21) Appl. No.: 16/212,643

(22) Filed: Dec. 6, 2018

Related U.S. Application Data

(60) Provisional application No. 62/773,162, filed on Nov. 29, 2018, provisional application No. 62/773,164,
(Continued)

(51) Int. Cl.
  *G06N 3/08* (2006.01)
  *G06N 3/04* (2006.01)
  (Continued)

(52) U.S. Cl.
  CPC ........... *G06N 3/084* (2013.01); *G06N 3/0481* (2013.01); *G06N 3/06* (2013.01); *G06N 3/063* (2013.01); *G06N 5/046* (2013.01); *G06N 20/00* (2019.01)

(58) Field of Classification Search
  CPC ........ G06N 3/084; G06N 20/00; G06N 20/10; G06N 20/20; G06N 3/0481; G06N 3/063; G06N 5/046; G06N 3/06; G06N 3/04; G06N 3/08; G06F 17/16; G06F 30/33; G06F 30/34; H03K 19/00; H03K 19/177
  See application file for complete search history.

(56) References Cited

U.S. PATENT DOCUMENTS

| | | | |
|---|---|---|---|
| 5,463,573 | A | 10/1995 | Yoshida |
| 5,956,703 | A | 9/1999 | Turner et al. |

(Continued)

OTHER PUBLICATIONS

Chen et al., Using Dataflow to Optimize Energy Efficiency of Deep Neural Network Accelerators, IEEE Micro May/Jun. 2017, pp. 12-21 (Year: 2017).*

(Continued)

*Primary Examiner* — Li B. Zhen
*Assistant Examiner* — William Wai Yin Kwan
(74) *Attorney, Agent, or Firm* — Adeli LLP

(57) ABSTRACT

Some embodiments provide a method for compiling a neural network (NN) program for an NN inference circuit (NNIC) that includes multiple partial dot product computation circuits (PDPCCs) for computing dot products between weight values and input values. The method receives an NN definition with multiple nodes. The method assigns a group of filters to specific PDPCCs. Each filter is assigned to a different set of the PDPCCs. When a filter does not have enough weight values equal to zero for a first set of PDPCCs to which the filter is assigned to compute dot products for nodes that use the filter, the method divides the filter between the first set and a second set of PDPCCs. The method generates program instructions for instructing the NNIC to execute the NN by using the first and second PDPCCs to compute dot products for the nodes that use the filter.

22 Claims, 29 Drawing Sheets

Related U.S. Application Data filed on Nov. 29, 2018, provisional application No. 62/753,878, filed on Oct. 31, 2018, provisional application No. 62/742,802, filed on Oct. 8, 2018, provisional application No. 62/724,589, filed on Aug. 29, 2018, provisional application No. 62/660,914, filed on Apr. 20, 2018.

(51) Int. Cl.
| | |
|---|---|
| G06N 3/063 | (2006.01) |
| G06N 20/00 | (2019.01) |
| G06N 5/04 | (2006.01) |
| G06N 3/06 | (2006.01) |

(56) References Cited

U.S. PATENT DOCUMENTS

| | | | |
|---|---|---|---|
| 6,038,583 | A | 3/2000 | Oberman et al. |
| 9,904,874 | B2 | 2/2018 | Shoaib et al. |
| 10,409,604 | B2 | 9/2019 | Kennedy et al. |
| 10,445,638 | B1 | 10/2019 | Amirineni et al. |
| 10,489,478 | B2 | 11/2019 | Lim et al. |
| 10,768,856 | B1 | 9/2020 | Diamant et al. |
| 2004/0078403 | A1 | 4/2004 | Scheuermann et al. |
| 2011/0055308 | A1 | 3/2011 | Mantor et al. |
| 2016/0328643 | A1 | 11/2016 | Liu et al. |
| 2017/0011288 | A1* | 1/2017 | Brothers ............... G06F 9/3017 |
| 2017/0168775 | A1 | 6/2017 | Tseng et al. |
| 2017/0300828 | A1 | 10/2017 | Feng et al. |
| 2017/0323196 | A1 | 11/2017 | Gibson et al. |
| 2018/0018559 | A1 | 1/2018 | Yakopcic et al. |
| 2018/0046900 | A1 | 2/2018 | Dally et al. |
| 2018/0114569 | A1 | 4/2018 | Strachan et al. |
| 2018/0121796 | A1 | 5/2018 | Deisher et al. |
| 2018/0197068 | A1 | 7/2018 | Narayanaswami et al. |
| 2018/0246855 | A1 | 8/2018 | Redfern et al. |
| 2018/0293493 | A1 | 10/2018 | Kalamkar et al. |
| 2018/0293691 | A1 | 10/2018 | Nurvitadhi et al. |
| 2018/0300600 | A1 | 10/2018 | Ma et al. |
| 2018/0307494 | A1 | 10/2018 | Ould-Ahmed-Vall et al. |
| 2018/0307950 | A1 | 10/2018 | Nealis et al. |
| 2018/0322095 | A1 | 11/2018 | Longley et al. |
| 2018/0373975 | A1 | 12/2018 | Yu et al. |
| 2019/0012296 | A1 | 1/2019 | Hsieh et al. |
| 2019/0026078 | A1 | 1/2019 | Bannon et al. |
| 2019/0026237 | A1 | 1/2019 | Talpes et al. |
| 2019/0114499 | A1* | 4/2019 | Delaye .................. G06F 17/153 |
| 2019/0138891 | A1 | 5/2019 | Kim et al. |
| 2019/0171927 | A1 | 6/2019 | Diril et al. |
| 2019/0205358 | A1* | 7/2019 | Diril ....................... G06N 3/063 |
| 2019/0205736 | A1 | 7/2019 | Bleiweiss et al. |
| 2019/0236445 | A1 | 8/2019 | Das et al. |
| 2019/0294413 | A1 | 9/2019 | Vantrease et al. |
| 2019/0303749 | A1 | 10/2019 | Appuswamy et al. |
| 2019/0325296 | A1 | 10/2019 | Fowers et al. |
| 2020/0134461 | A1 | 4/2020 | Chai et al. |

OTHER PUBLICATIONS

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Courbariaux, Matthieu, et al., "Binarized Neural Networks: Training Neural Networks with Weights and Activations Constrained to +1 or-1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc., San Jose, CA, USA.

Gao, Mingyu, et al., "TETRIS: Scalable and Efficient Neural Network Acceleration with 3D Memory," Proceedings of the 22nd International Conference on Architectural Support for Programming Languages and Operating Systems (ASPLOS '17), Apr. 8-12, 2017, 14 pages, ACM, Xi'an, China.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Huan, Yuxiang, et al., "A Low-Power Accelerator for Deep Neural Networks with Enlarged Near-Zero Sparsity," May 22, 2017, 5 pages, arXiv:1705.08009v1, Computing Research Repository (CoRR)—Cornell University, Ithaca, NY, USA.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Leng, Cong, et al., "Extremely Low Bit Neural Network: Squeeze the Last Bit Out with ADMM," Proceedings of 32nd AAAl Conference on Artificial Intelligence (AAAI-18), Feb. 2-7, 2018,16 pages, Association for the Advancement of Artificial Intelligence, New Orleans, LA, USA.

Li, Fengfu, et al., "Ternary Weight Networks," May 16, 2016, 9 pages, arXiv:1605.04711v1, Computing Research Repository (CoRR)—Cornell University, Ithaca, NY, USA.

Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.

Moons, Bert, et al., "Envision: A 0.26-to-10TOPS/W Subword-Parallel Dynamic-Voltage-Accuracy-Frequency-Scalable Convolu-

(56) References Cited

OTHER PUBLICATIONS tional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.
Moshovos, Andreas, et al., "Exploiting Typical Values to Accelerate Deep Learning," Computer, May 24, 2018, 13 pages, vol. 51-Issue 5, IEEE Computer Society, Washington, D.C.
Non-published commonly owned U.S. Appl. No. 16/212,642, filed Dec. 6, 2018, 112 pages, Perceive Corporation.
Non-published commonly owned U.S. Appl. No. 16/212,645, filed Dec. 6, 2018, 110 pages, Perceive Corporation.
Non-published commonly owned U.S. Appl. No. 16/212,646, filed Dec. 6, 2018, 110 pages, Perceive Corporation.
Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.
Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.
Ren, Mengye, et al., "SBNet: Sparse Blocks Network for Fast Inference," Jan. 7, 2018, 10 pages, arXiv:1801.02108v1, Computer Research Repository (CoRR)—Cornell University, Ithaca, NY, USA.
Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.
Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.
Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.
Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.
Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.
Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.
Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.
Zhang, Shijin, et al., "Cambricon-X: An Accelerator for Sparse Neural Networks," 2016 49th Annual IEEE/ACM International Symposium on Microarchitecture (MICRO '16), Oct. 15-19, 2016, 12 pages, IEEE, Taipei, Taiwan.
Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.
Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.
Chen, Tianqi, et al., "TVM: End-to-End Optimization Stack for Deep Learning," Feb. 12, 2018, 19 pages, arXiv:1802.04799v1, Computing Research Repository (CoRR)—Cornell University, Ithaca, NY, USA.
Deng, Lei, et al., "GXNOR-Net: Training Deep Neural Networks with Ternary Weights and Activations without Full-Precision Memory under a Unified Discretization Framework," Neural Networks 100, Feb. 2018, 10 pages, Elsevier.
Ghanekar, Sachin P., et al., "Signed-Digit-Based Multiplier-Free Realizations for Multirate Converters," IEEE Transactions on Signal Processing, Mar. 1995, 12 pages, vol. 43, No. 3, IEEE.
Giri, Sweta, et al., "Implementation of Combinational Circuits Using Ternary Multiplexer," International Journal of Computational Engineering Research, Mar.-Apr. 2012, 7 pages, vol. 2, No. 2, IJCER.
Pawar, A. B., "Radix-2 Vs Radix-4 High Speed Multiplier," International Journal of Advanced Research in Computer Science and Software Engineering, Mar. 2015, 5 pages, vol. 5, No. 3, IJARCSSE.
Wang, Peiqi, et al., "HitNet: Hybrid Ternary Recurrent Neural Network," 32nd Conference on Neural Information Processing Systems (NeurIPS '18), Dec. 2018, 11 pages, Montreal, Canada.

* cited by examiner

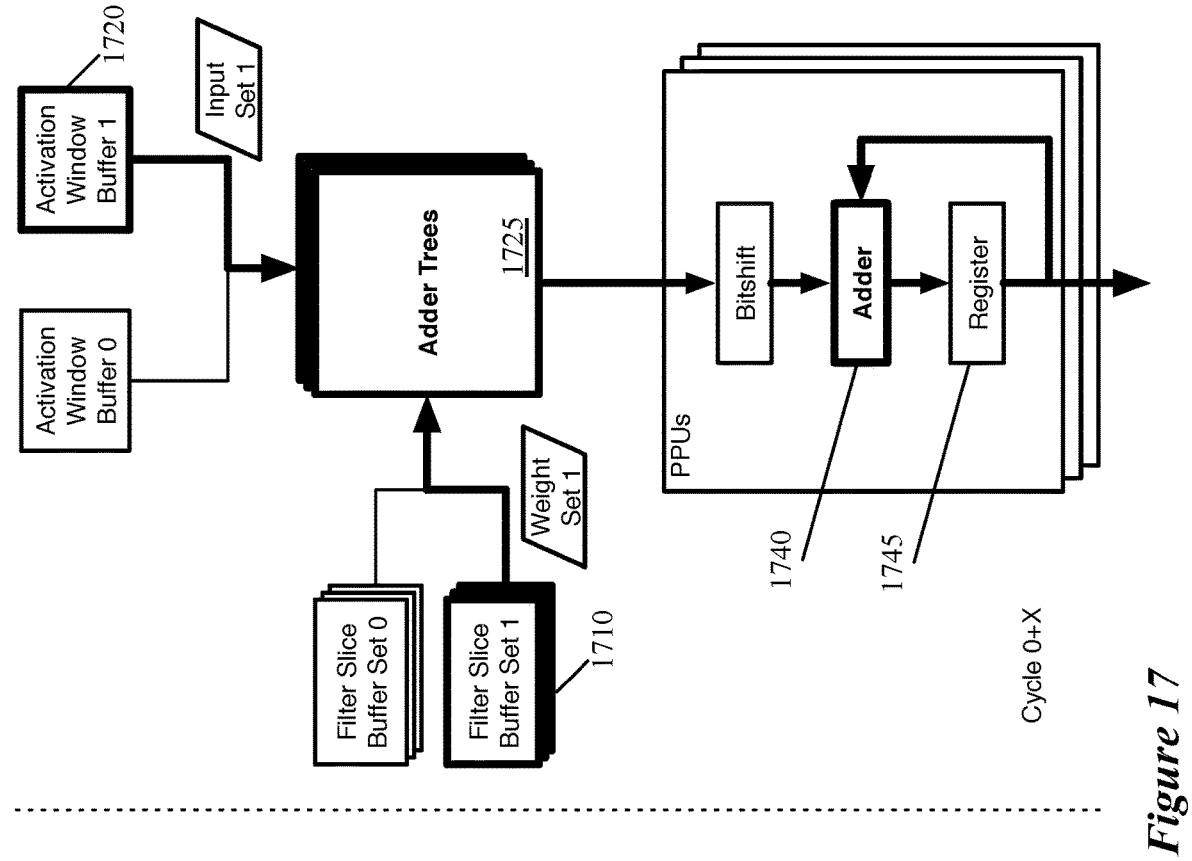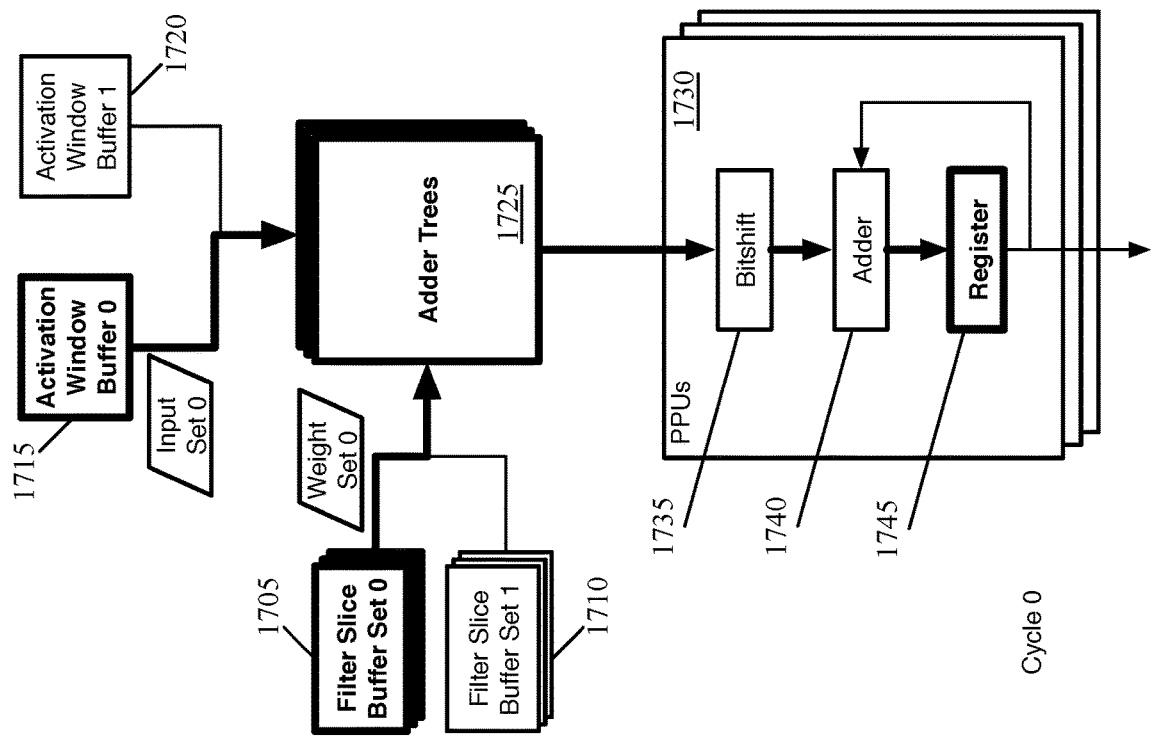
*Figure 17*

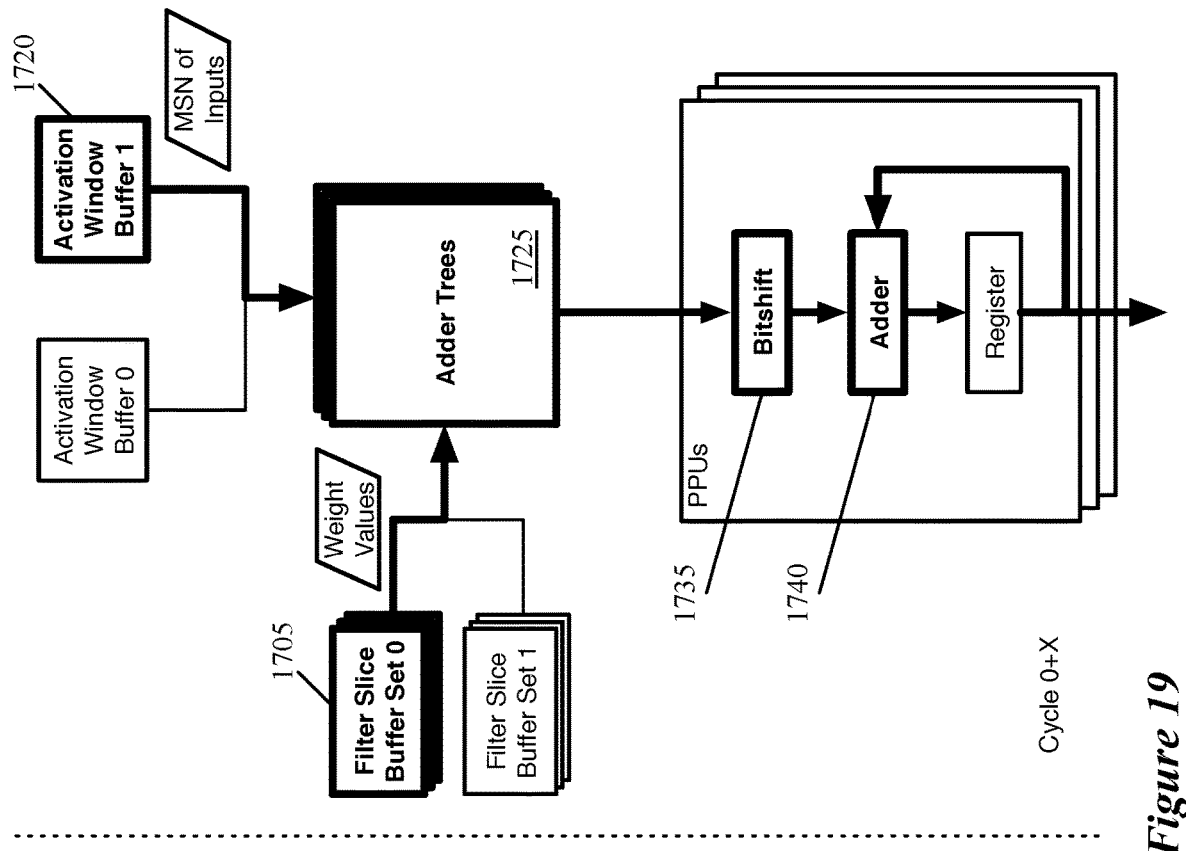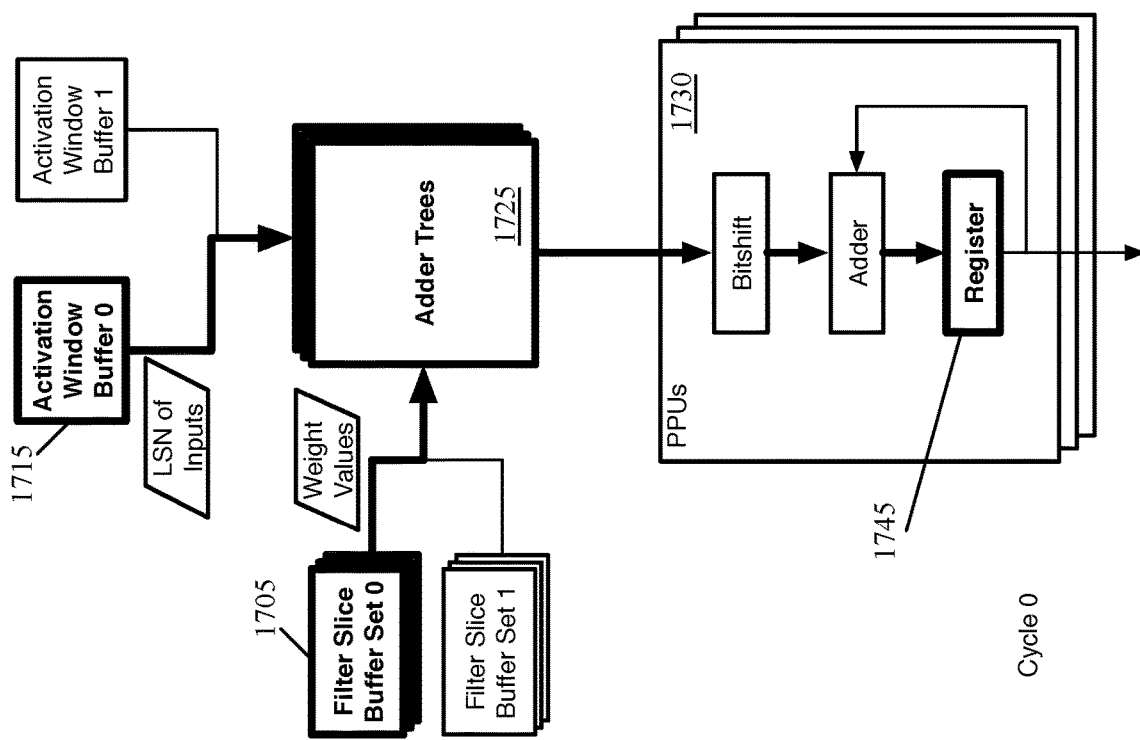
Figure 19

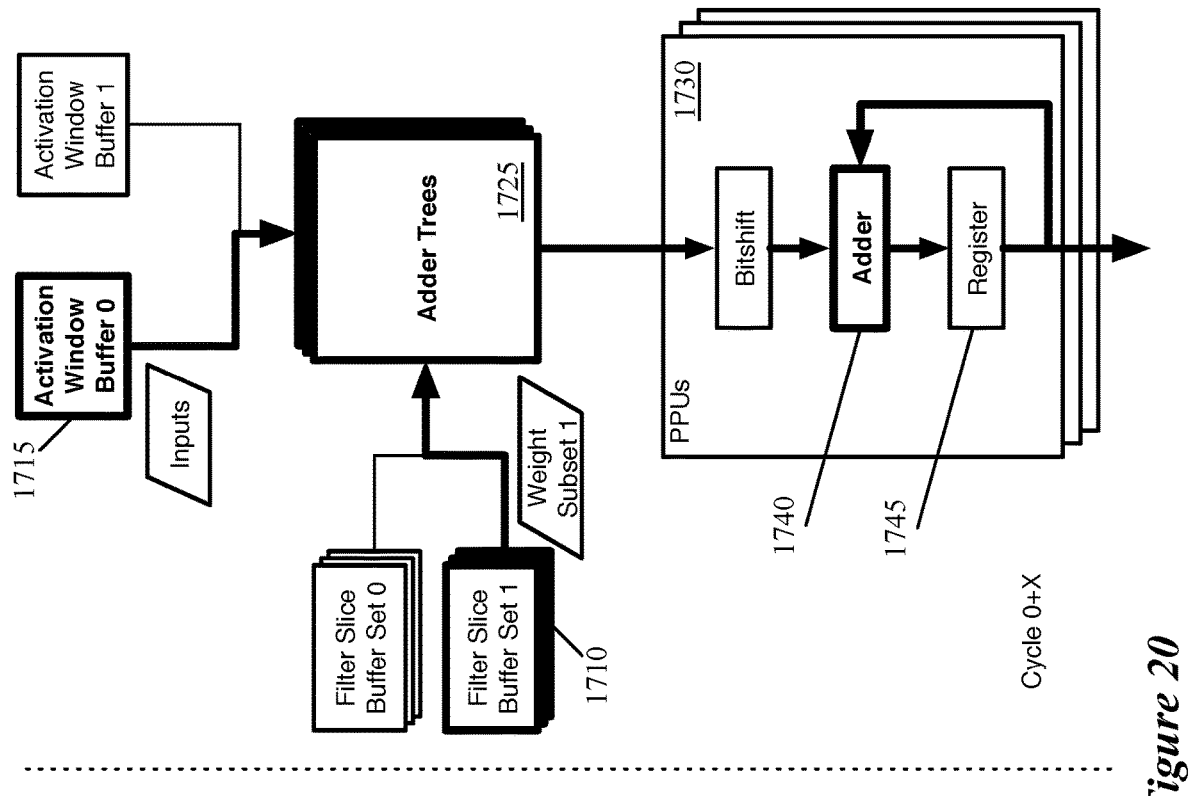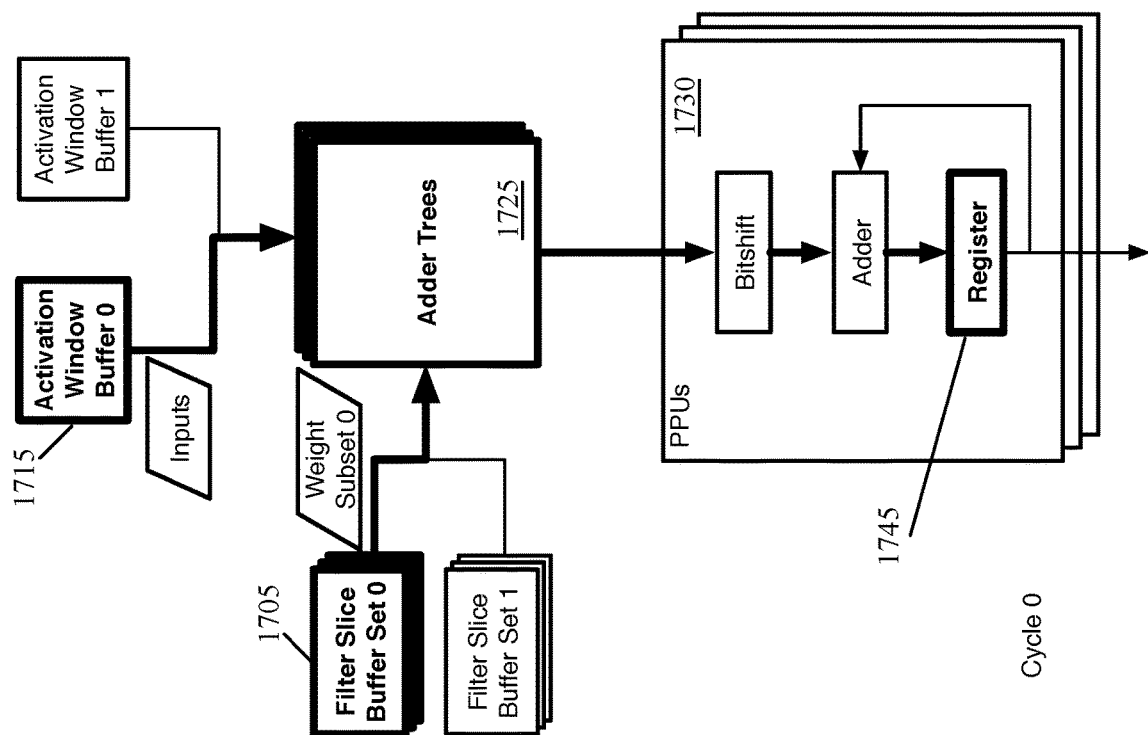
Figure 20

| PPU | dpb_a | dpb_b |
|---|---|---|
| 48 | dpb[48] | dpb[56] |
| 49 | dpb[49] | dpb[57] |
| 50 | dpb[50] | dpb[58] |
| 51 | dpb[51] | dpb[59] |
| 52 | dpb[52] | dpb[60] |
| 53 | dpb[53] | dpb[61] |
| 54 | dpb[54] | dpb[62] |
| 55 | dpb[55] | dpb[63] |
| 56 | dpb[56] | dpb[60] |
| 57 | dpb[57] | dpb[61] |
| 58 | dpb[58] | dpb[62] |
| 59 | dpb[59] | dpb[63] |
| 60 | dpb[60] | dpb[62] |
| 61 | dpb[61] | dpb[63] |
| 62 | dpb[62] | dpb[63] |
| 63 | dpb[63] | 0 |

| PPU | dpb_a | dpb_b |
|---|---|---|
| 32 | dpb[32] | dpb[48] |
| 33 | dpb[33] | dpb[49] |
| 34 | dpb[34] | dpb[50] |
| 35 | dpb[35] | dpb[51] |
| 36 | dpb[36] | dpb[52] |
| 37 | dpb[37] | dpb[53] |
| 38 | dpb[38] | dpb[54] |
| 39 | dpb[39] | dpb[55] |
| 40 | dpb[40] | dpb[56] |
| 41 | dpb[41] | dpb[57] |
| 42 | dpb[42] | dpb[58] |
| 43 | dpb[43] | dpb[59] |
| 44 | dpb[44] | dpb[60] |
| 45 | dpb[45] | dpb[61] |
| 46 | dpb[46] | dpb[62] |
| 47 | dpb[47] | dpb[63] |

| PPU | dpb_a | dpb_b |
|---|---|---|
| 16 | dpb[16] | dpb[48] |
| 17 | dpb[17] | dpb[49] |
| 18 | dpb[18] | dpb[50] |
| 19 | dpb[19] | dpb[51] |
| 20 | dpb[20] | dpb[52] |
| 21 | dpb[21] | dpb[53] |
| 22 | dpb[22] | dpb[54] |
| 23 | dpb[23] | dpb[55] |
| 24 | dpb[24] | dpb[56] |
| 25 | dpb[25] | dpb[57] |
| 26 | dpb[26] | dpb[58] |
| 27 | dpb[27] | dpb[59] |
| 28 | dpb[28] | dpb[60] |
| 29 | dpb[29] | dpb[61] |
| 30 | dpb[30] | dpb[62] |
| 31 | dpb[31] | dpb[63] |

| PPU | dpb_a | dpb_b |
|---|---|---|
| 0 | dpb[0] | dpb[32] |
| 1 | dpb[1] | dpb[33] |
| 2 | dpb[2] | dpb[34] |
| 3 | dpb[3] | dpb[35] |
| 4 | dpb[4] | dpb[36] |
| 5 | dpb[5] | dpb[37] |
| 6 | dpb[6] | dpb[38] |
| 7 | dpb[7] | dpb[39] |
| 8 | dpb[8] | dpb[40] |
| 9 | dpb[9] | dpb[41] |
| 10 | dpb[10] | dpb[42] |
| 11 | dpb[11] | dpb[43] |
| 12 | dpb[12] | dpb[44] |
| 13 | dpb[13] | dpb[45] |
| 14 | dpb[14] | dpb[46] |
| 15 | dpb[15] | dpb[47] |

*Figure 22*

SPLITTING NEURAL NETWORK FILTERS FOR IMPLEMENTATION BY NEURAL NETWORK INFERENCE CIRCUIT

BACKGROUND

In a typical neural network, a standard computation is a dot product between input values (activations) and weight values. A typical way for an integrated circuit to compute these weight values is to use multiply-accumulate (MAC) circuits that repeatedly perform the multiplication of an input value by a weight value, adds that to an existing partial dot product, and stores the new partial dot product. However, this requires numerous clock cycles, as each term in the dot product computed by a MAC uses a separate cycle. In addition, the storage of each intermediate term requires the use of memory (contributing to both slowing down of the computation and use of resources for the read/write operations). Accordingly, techniques for parallelization without massively expanding the surface area of the circuit are required.

BRIEF SUMMARY

Some embodiments provide an integrated circuit (IC) for implementing a machine-trained network (e.g., a neural network). The IC of some embodiments includes a set of input processing circuits, a neural network computation fabric that can be configured to apply a neural network to an input value, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

In some embodiments, at startup of the IC, the microprocessor loads neural network configuration data (e.g., weight values, scale and bias parameters, etc.) from off-chip storage and generates instructions for the neural network computation fabric to write the neural network parameters to memory. In addition, microprocessor loads the neural network program instructions for the computation fabric to its own memory. These instructions are applied by the computation fabric to input data (e.g., images, audio clips, etc.) in order to execute the neural network. The instructions include, e.g., the memory locations to which input values are written, configuration data specifying how to compute specific neural network nodes, etc. Upon receiving input data (e.g., from a sensor on a device that incorporates the IC), the microprocessor provides neural network program instructions to the computation fabric. Once the final output of the neural network is computed, the fabric provides this output back to the microprocessor, so that the microprocessor (or other circuitry on the device) can evaluate this output and perform any actions based on the output.

The microprocessor executes a controller, in some embodiments, that provides the neural network instructions to the computation fabric. Some embodiments provide these instructions to the computation fabric incrementally. For instance, in some embodiments, the system controller on the microprocessor initially loads the instructions for the first layer (or a first portion of the first layer) of the neural network, then waits for a signal from the fabric indicating that these instructions have been completed. Once the first portion of the network is completed by the fabric, the system controller provides the fabric with the instructions for the second portion (either a second portion of the first layer, or the second layer of the network), and so on until the network has been fully executed.

As mentioned, the neural network computation fabric includes numerous cores as well as a global channel that connects the cores, with the various data processing circuits configured by the hierarchical set of control circuits. These data processing circuits operate to compute neural network operations in an efficient, low-power manner, according to the configuration data provided by the control circuits.

A typical neural network operates in layers, with each layer including numerous nodes. Examples of neural networks include feed-forward neural networks, regulatory feedback networks, radial basis function networks, recurrent networks, etc. In convolutional neural networks (a type of feed-forward network), a majority of the layers include computation nodes with both a linear function followed by a non-linear activation function (applied to the result of the linear function). The linear function is a dot product of input values (either the initial inputs based on the input data for the first layer, or outputs of the previous layer for subsequent layers) and predetermined (trained) weight values, along with bias (addition) and scale (multiplication) terms, which are also predetermined based on training. As such, for convolutional neural networks, the dot products are the primary computation that uses the most circuit resources.

The neural network computation circuit of some embodiments computes numerous neural network nodes simultaneously, with the computation for one node spread across multiple cores (and subsequently the global channel). That is, each of several cores of the computation fabric computes a partial dot product from a subset of the input values and weight values for the node. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

For a dot product computed across more than one core, these multiple cores compute partial dot products and provide these partial dot products to the global channel. In the simplest case, all of the partial dot products for a given computation node are computed in the same clock cycle and provided at the same time to the global channel. In some cases, however (e.g., for dot products with a very large number of terms), each core computes more than one partial dot product, requiring multiple clock cycles. Based on configuration data specifying which outputs from the cores are to be added together (and whether multiple partial dot products are required from the same core), the global channel aggregates these partial dot products to compute the complete dot product for each node, then applies various post-processing functions (e.g., the bias, scale, and non-linear activation functions) to compute the output of each node.

In some embodiments, each segment of the global channel includes (in addition to the cluster controllers) a dot product bus, a set of post-processing circuits, and an output bus. The dot product bus, in some embodiments, includes a number of independent dot product bus lanes that each receives partial dot products from the cores, aggregates these dot products together, and provides the aggregated dot products to the post-processing circuits. In some embodiments, configuration data from the cluster controllers specifies to which post-processing unit each aggregated dot product is sent. Each lane of the dot product bus spans all of the channel segments, each of which aggregates the partial dot products from its own cores. These aggregated values are then aggregated together by additional circuits of the dot product bus lane, and configuration data specifies whether to pass the aggregated dot products in one direction of the segment or the other, or whether that segment is the final aggregator for the dot product (in which case that aggregated dot product is provided to a post-processing unit in that segment).

In some embodiments, each segment includes the same number of post-processing units as dot product bus lanes, with each post-processing unit receiving the output of a different dot product bus lane as its primary input. The post-processing units, as mentioned, perform the non-dot product functions of the neural network nodes. For a typical computation node of a convolutional (or fully-connected) layer, this includes a bias factor, a scaling factor, and a non-linear activation function. In some embodiments, the outputs of the linear function are quantized or truncated to a particular number of bits (e.g., 4 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design.

The non-linear activation function, in some embodiments, is implemented as a lookup table rather than a hardwired function. This enables the IC to execute different neural networks that use different activation functions and, in some embodiments, allows for different activation functions to be used in different layers of the neural network. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function.

In addition to these operations, in some embodiments the post-processing units include additional circuitry for (i) performing additional dot product operations if required and (ii) performing operations for neural network computation nodes that do not use dot products. The post-processing units of some embodiments each have the ability to combine dot products from two separate cycles if a dot product is too large to be computed in a single cycle across the cores of the computation fabric. In addition, if a particular filter slice needs to be split across multiple cores (because of too many non-zero weight values, as described in greater detail below), the post-processing unit is configured to account for that. Furthermore, some embodiments enable dot products to be double the size of the standard quantized output (e.g., 8-bit rather than 4-bit) by using dot products from multiple cycles and bit-shifting the first set of input data.

Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output bus carries the computation node outputs from the post-processing units back to the cores, to be stored in the memory of the core and used as inputs for the next layer of neural network computation nodes. In some embodiments, the output values may be computed by post-processing units in one cluster but carried to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value.

As mentioned, the cores compute partial dot products in parallel that are provided to the dot product bus of the local channel segment. In some embodiments, the cores include memory that stores the weight values and input values, an input buffer into which input values are loaded for the partial dot product computations, a set of weight value buffers into which weight values are loaded for the partial dot product computations, a controller or set of controller circuits for loading the input values and weight values from memory into the respective buffers, and a set of partial dot product computation circuits.

In some embodiments, the number of partial dot product computation circuits in each core is equal to (i) the number of weight value buffers in the core (or half of the number of weight value buffers, if primary and secondary buffers are used), (ii) the number of independent lanes of the dot product bus, and (iii) the number of post-processing units of each segment of the global channel. Thus, for a typical neural network computation node, the partial dot products computed by the partial dot product computation circuits having a particular index are aggregated by the dot product bus lane with the same index and that aggregated dot product is provided for post-processing to one of the post-processing units with the same index (i.e., the post-processing unit with that index in one of the channel segments).

As mentioned, each core includes one input value buffer and numerous weight value buffers in some embodiments. In convolutional neural networks, a set of input values are used as the inputs to a number of different nodes, and each layer has numerous different filters (sets of weight values). For parallelization within the cores, such a set of input values are loaded into the input value buffers of the cores used to compute the dot product for a node (by computing partial dot products that are then aggregated), while the weight values for each of these different nodes are loaded into the weight value buffers (for a node computed across multiple cores, the weight values for a given node are loaded into the weight value buffers with the same index in each of the cores). The partial dot product computation circuits corresponding to these weight value buffers then simultaneously compute the partial dot product computations for the loaded input values.

In some embodiments, the weight values for each layer of the network are ternary values (e.g., each weight is either zero, a positive value, or the negation of the positive value), with at least a fixed percentage (e.g., 75%) of the weight values being zero. Using ternary weight values allows for the weights to be treated as $\{0, 1, -1\}$ (with a potential multiplication by the actual positive weight value in the post-processor), such that the multiplication of each input value by its weight value can be handled with a simple circuit that avoids actual multiplier circuits. The remainder of the partial dot product computation in a core can then be computed with an adder tree. The sparsity requirement allows for some embodiments to reduce the size of the partial dot product computation circuits by mapping each of a first number (e.g., 144) input values to a second number (e.g., 36) of dot product inputs, such that each input value with a non-zero corresponding weight value is mapped to a different one of the dot product inputs.

Specifically, in some embodiments, the partial dot product computation circuits include at least two sets of wires for each input value, with each of the sets of wires for a given input value providing that input value to two different dot product inputs. With a guarantee of at least 75% weight sparsity (i.e., at least 75% of the weight values for any set of input values are zero), the number of dot product inputs is set at 25% (or slightly more than 25%, for redundancy) of the number of input values provided to the circuit. In some embodiments, the weight sparsity is guaranteed by the training algorithm used to train the weights to perform a specific purpose, and the neural network computation circuit is adaptable for any set of weights that meets the guarantee. In some cases, individual partial dot product computations will not meet the sparsity requirement, and solutions for handling these situations are described below.

In addition to storing discrete weight values (e.g., 0, 1, and −1), in some embodiments the input values (which, other than for the first layer, are output values of previous computation nodes) are discrete values (e.g., 4-bit values). As such, for the simplest type of dot product computation, the neural network computation circuit of some embodiments places the following restrictions on the computation: (i) all of the input values should be of the specified discrete size, (ii) the maximum number of input values is the size of the input buffer multiplied by the number of cores, (iii) all of the weight values are either 0, +a, or −a (and thus can be stored as 0, 1, and −1), and a large enough percentage of the weight values are 0 that the input values with non-zero weight values can each map to a different multiplexer input.

However, some embodiments include solutions for cases when each of these restrictions is broken (at least in certain specific ways). As mentioned above, the post-processing units of some embodiments include dot product input processing circuits for performing additional operations on the dot product inputs if needed. Specifically, some embodiments include a register that can be configured to store a dot product received by the post-processing unit on one clock cycle. The register outputs this stored value to an adder that receives both (i) the register output when enabled and (ii) the input from the dot product bus. The post-processing units also include a configurable bit shift circuit that operates on the dot product bus input prior to the adder in some embodiments.

In addition, the input value buffer and each of the weight value buffers in each core actually include both primary and secondary buffers. Each primary input value buffer can hold the specified number of input values for the partial dot product computation circuits (e.g., 144), with the secondary input value buffer able to hold the same number. Similarly, each primary weight value buffer can hold the specified number of weight values (which is the number of inputs to which the input values are reduced) for the partial dot product computation circuits (e.g., 36), with the secondary weight value buffers able to hold the same number.

In a typical dot product computation that meets the requirements listed above (i.e., sparsity, ternary weights, input values of a specified size, and less than the maximum number of dot product components), the secondary buffers are not used. However, this circuitry also enables more complex dot products to be computed if needed, thereby increasing the size and types of neural networks that can be executed by the neural network computation circuit.

Specifically, some embodiments allow up to twice the number of dot product components that can be computed in a single cycle across all of the cores. Such a computation uses the secondary input value buffer as well as the secondary weight value buffers, and uses two (or more) clock cycles of the neural network computation circuit. Weight values for the computation are loaded into the primary and secondary weight value buffers of each core used, while the input values are loaded into the primary and secondary input value buffers. In a typical convolutional neural network layer, each of the nodes has the same dimensions, and thus all of the filters will use both the primary and secondary buffers. In the first clock cycle, the partial dot product computation circuits in the cores and the dot product bus compute the dot products of the input values and weight values from the primary buffers, and the results are stored in the registers of the post-processing units. In a subsequent clock cycle, the dot product computation circuits compute the dot products of the input values and weight values from the secondary buffers, and the stored result is released from the register to be added to this secondary dot product. The results are the full dot products for the computation nodes.

In addition, some embodiments enable dot product computations with input values up to twice the bit length of the specified discrete size. For instance, if the neural network computation circuit is designed for a typical computation that uses 4-bit inputs (and thus 4-bit outputs), some embodiments allow for 8-bit input values (and outputs). To compute this using the hardware designed for the specified discrete size, some embodiments load the least significant bits (e.g., the least significant 4 bits) of the input values into the primary activation buffers in each core used and load the most significant bits (e.g., the most significant 4 bits) of the input values into the secondary activation buffers of these cores (or vice versa). The weight values for each filter are loaded into the primary weight value buffers, with the secondary weight value buffers are unused. Then, in the first clock cycle, the dot product computation circuits compute the dot products of the weight values with the input values from the primary input value buffer. These initial dot products are stored in the post-processing unit registers, as for the dot products with a large number of components. In a subsequent clock cycle, the dot product computation circuits compute the dot product of the same weight values with the input values from the secondary input value buffer. The dot product for the most significant bits is bit shifted by the post-processing unit (e.g., 4 bits in the case of 8-bit input values on 4-bit hardware) before being added to the dot product for the least significant bits (and before being stored in the register if the dot product for the most significant bits is computed first).

Furthermore, some embodiments have solutions if a particular filter slice (i.e., the weights assigned to a particular weight value buffer in a particular core) has too many non-zero values (i.e., the network is not locally sparse enough for the hardware). That is, if the number of non-zero weight values is greater than the number of multiplexer inputs to the dot product computation, then the filter slice is not sparse enough. In addition, the wiring of each input value in the input value buffer to two multiplexers will not accommodate certain configurations of non-zero weight values (which is why the neural network computation circuit of some embodiments includes a number of multiplexers that is slightly more than one-fourth the number of input values in the buffer, with some of the input values wired to three multiplexers).

The input values (and their corresponding weight values), in some embodiments, cannot be easily moved around to different cores because (i) the input values are used for numerous simultaneous dot products and (ii) the input values are efficiently carried in contiguous blocks to the cores by the output bus, with the ordering of these input values dependent on the post-processing unit indices that computed them as output values in the previous layer.

As such, the compiler of some embodiments is responsible for dividing the filter slice into two slices while maintaining efficient computation by the neural network computation circuit. The compiler, in some embodiments, is a software application that is responsible for receiving a trained neural network and converting that network into instructions for loading the weight values onto the neural network computation circuit and instructions for the circuit to execute. The compiler assigns each layer to a particular number of cores, assigns the different filter slices to different weight value buffer/partial dot product computation circuit/dot product bus lane/post-processing unit indices, specifies which segment will perform post-processing on each output value, etc. Because the computations of a previously-trained network are not dynamic (that is, the computations performed are not dependent on the results of previous computations), the entire execution of a network can be statically scheduled by the compiler.

When a filter slice is not sparse enough for each input value with a nonzero weight value to be mapped to a different multiplexer input, different embodiments use different techniques to divide the filter. Some embodiments move a portion of the weight values to the secondary weight value buffer in the core. For instance, the odd weight values could be moved to the secondary weight value buffer, such that all of the odd values are 0 in the primary weight value buffer and all of the even values are 0 in the secondary weight value buffer. In other embodiments, the compiler does not blindly move half of the weight values to the secondary weight value buffer, but instead moves a subset of the weight values while ensuring that all of the input values with nonzero weights can be mapped to different input multiplexers. In this scenario, the computation of the node incurs an extra clock cycle of latency, as the dot product is computed similarly to the manner described above. That is, a dot product is computed between the primary weight value buffer and the input value buffer, stored in the post-processing unit register, then added to a dot product computed in a subsequent clock cycle between the secondary weight value buffer and the input value buffer (with different mappings of input values to multiplexers for each computation).

However, some embodiments also provide for the ability to split filters without incurring the latency cost. In addition, dot products with a large number of components or with large input values already use the secondary buffers, and thus require a different solution for such filters. In some embodiments, each post-processing unit (or the majority of the post-processing units) receives the output of two different dot product bus lanes. One of these is the output of the dot product bus lane with the same index as the post-processing unit, and one of these is the output of a different lane. In some embodiments, the first half of the dot product bus lanes are only wired to a single post-processing unit in each channel segment (those with the same index), with the secondary inputs all coming from the second half of the lanes. This allows for optimal packing of output values from the post-processing units when filter splits are required.

Using this scheme, when a filter slice needs to be split, a subset of the weight values are assigned to a different input value buffer (i.e., an input value buffer with a different index), with the removed weight values again replaced by zeros. This different input value buffer is selected such that the same post-processing unit receives both of the dot product bus computations from (i.e., as its primary and secondary inputs). The post-processing unit adds these two dot products together before performing the post-processing operations (bias, scaler, etc.). In addition, if a filter split is required for a large dot product or a dot product with large input values, the post-processing unit performs this aggregation before performing the bit shifting and/or storing the initial dot product in the register. However, if a particular dot product index is used for a split filter, then the post-processing unit with that index will not receive a useful primary input. However, that post-processing unit can have its primary input disabled and its secondary input enabled (so long as that filter does not also need to be split). In addition, the use of secondary inputs can be rippled to additional post-processing units if needed, so as to pack the output values next to each other on the output bus (allowing for easier writes to memory in the cores).

Some embodiments also use similar techniques to enable larger numbers of possible weight values, while using the same hardware designed for ternary weights. To illustrate these techniques, the example of quinary weights (e.g., $-2$, $-1$, 0, 1, 2) will be used. As an optimal solution if the weights in a filter are sparse enough, then quinary weights can be used without incurring any latency or cost. As noted, each input value in the input value buffer is wired to two different multiplexers. In certain cases, both of the multiplexers that receive input values with weights of $-2$ or 2 select those inputs, and the weight of 1 or $-1$ is used for both of these inputs (so that the input value is effectively multiplied by 2 or $-2$).

However, in many cases the compiler will not be able to find such a solution if the weight values are not sparse enough (i.e., the second multiplexers for all of the input values with $+2/-2$ weights will not be free to select those input values). In these cases, however, the compiler can use the filter splitting techniques. Rather than move half of the input values to a different input value buffer (either the secondary buffer or a buffer with a different index), the entire filter is duplicated. Weight values of $+2/-2$ are represented by $+1/-1$ in both filters, while weight values of $+1/-1$ are represented by $+1/-1$ in the first filter and 0 in the second filter. Some embodiments use either of the filter splitting techniques, depending on the requirements of the network (i.e., either using the secondary weight value buffer and incurring a latency penalty or moving the second half of the filter to a weight value buffer with a different index). For example, if the number of filters is large and all of the filters use quinary weights, then using the secondary weight value buffers and incurring the latency penalty may be preferred.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 17 illustrates the operation of various circuits to compute large dot products over two or more clock cycles of the chip fabric.

FIG. 19 illustrates the operation of the circuits from FIG. 17 to compute dot products with large input values over two or more clock cycles of the chip fabric.

FIG. 20 illustrates the operation of the circuits from FIG. 17 to compute a dot product with a split filter over multiple clock cycles.

FIG. 22 illustrates a table showing the mapping of dot product bus outputs to the different post-processing units for a neural network computation circuit of some embodiments.

DETAILED DESCRIPTION

Some embodiments provide an integrated circuit (IC) for implementing a machine-trained network (e.g., a neural network). The IC of some embodiments includes a set of input processing circuits, a neural network computation fabric (also referred to as a neural network inference circuit) that can be configured to apply a neural network to a set of input values, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

Figure 1:
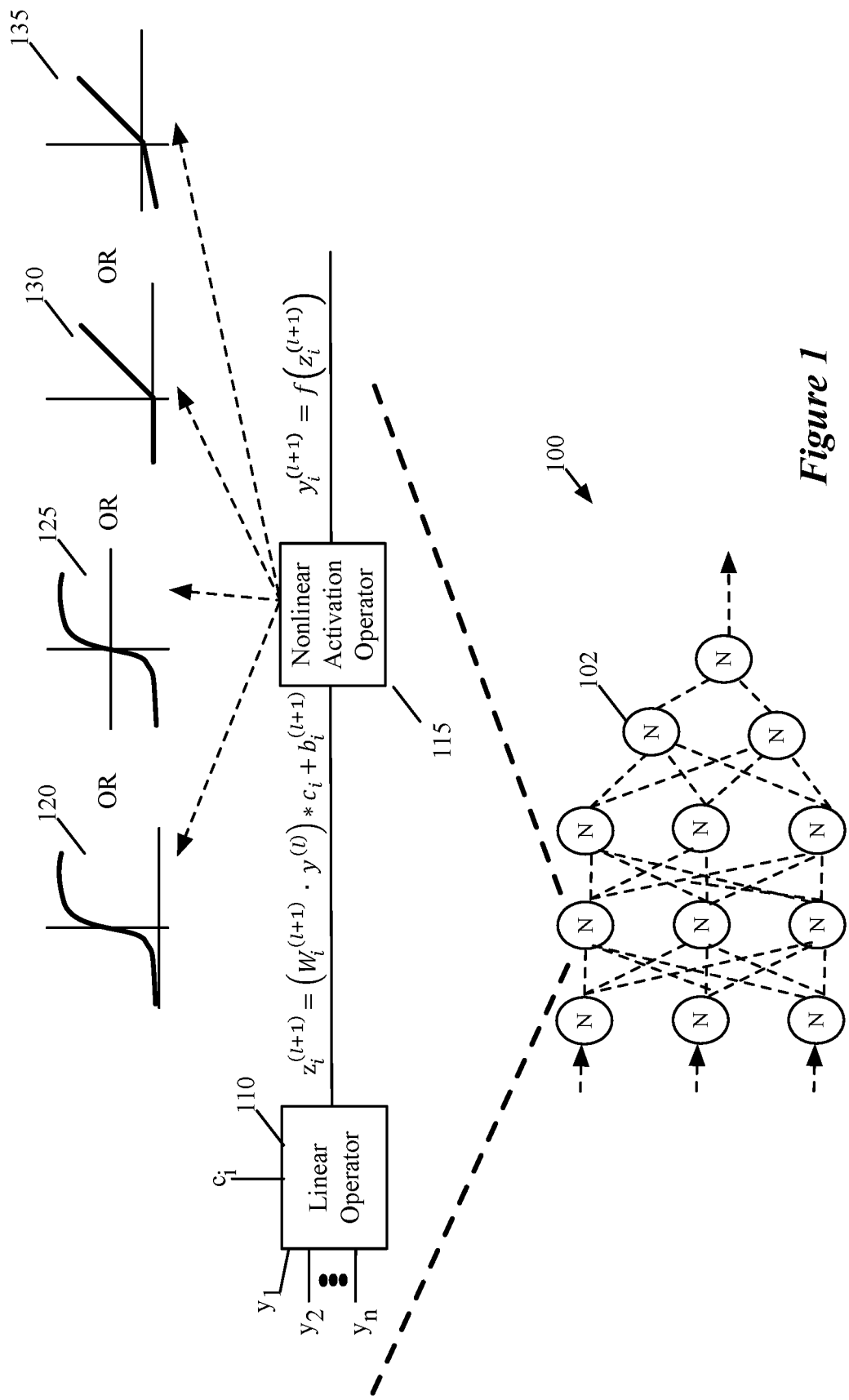
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with $l=0$ representing the input layer and $l=L$ representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = (W_i^{(l+1)} \cdot y^{(l)}) * c_i + b_i^{(l+1)} = \sum_{k=1}^{n} (w_{ik}^{(l+1)} * y_k^{(l)}) * c_i + b_i^{(l+1)}. \quad (A)$$

The constant value $c_i$ is a value to which all the weight values are normalized. In some embodiments, the constant value $c_i$ is 1. The symbol * is an element-wise product, while the symbol • is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y^{(l+1)}$ of the nonlinear component 115 of a node in layer l+1 is a function of the node's linear component, and can be expressed as by Equation (B) below:

$$y_i^{(l+1)} = f(z_i^{(l+1)}). \quad (B)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f\left[\left(\sum_{k=1}^{n} w_{ik} * y_k\right) * c_i + b_i^{(l+1)}\right]. \quad (C)$$

In this equation, $w_{ik}$ are weight values associated with the inputs $y_k$ of the node i in layer l+1.

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

As mentioned, some embodiments provide an IC that implements a machine-trained network such as that shown in FIG. 1. The ICs of some embodiments are configurable to implement different networks trained to perform a particular function, which may have various different arrangements of nodes and different trained weight values. For instance, the ICs may implement networks for object or facial recognition in images, voice recognition in audio samples, etc. The IC of some embodiments includes a set of input processing circuits, a neural network computation fabric that can be configured to apply a neural network to an input value, and a microprocessor (e.g., for controlling the input processing circuits and configuring the neural network computation fabric).

Figure 2:
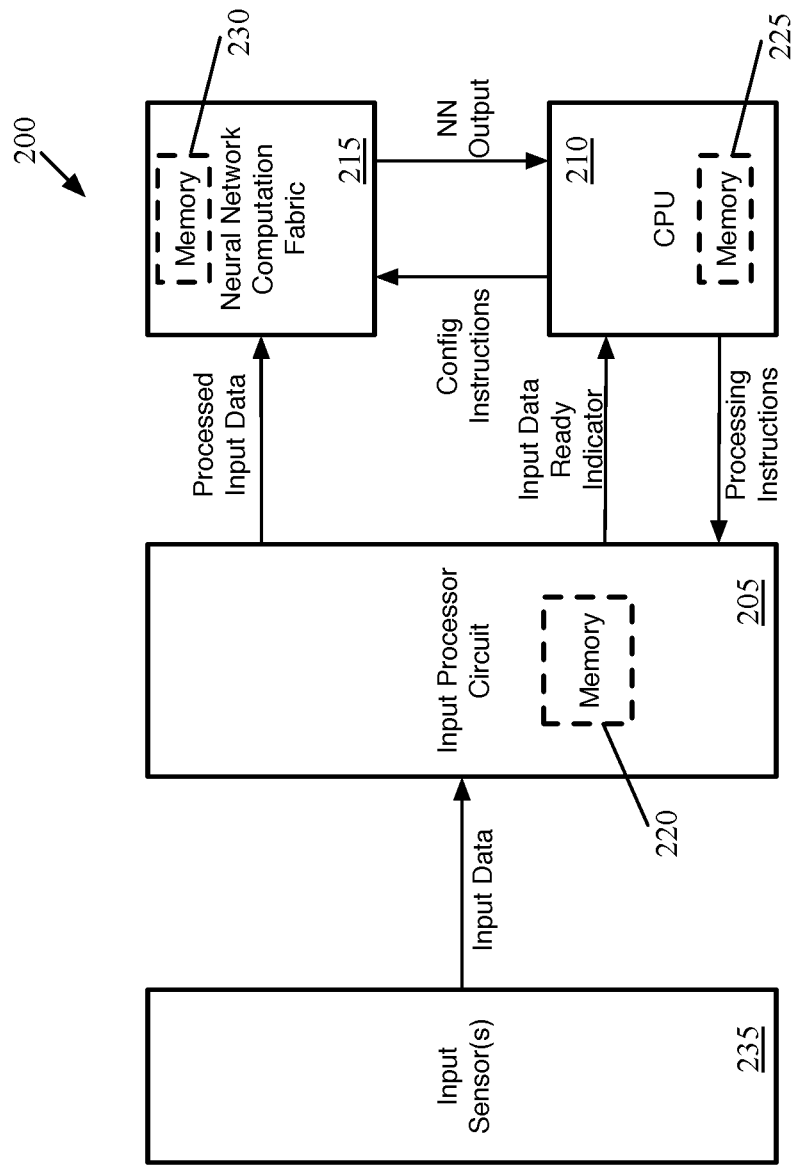
FIG. 2 conceptually illustrates an integrated circuit of some embodiments.

FIG. 2 conceptually illustrates such an IC 200 of some embodiments. As shown, the IC includes an input processor circuit 205, a microprocessor (CPU) 210, and a neural network computation fabric 215. Each of these components 205-215 also has corresponding memory (e.g., random access memory (RAM)) 220-230. In addition, in some embodiments, the IC is integrated into a device (such as an Internet of Things (JOT) device) with one or more input sensors 235. These input sensors can include cameras (e.g., for capturing video images on which the neural network computation fabric 215 performs face or object recognition, etc.), microphones (e.g., for capturing audio on which the neural network computation fabric 215 performs voice recognition, speech processing, etc.), or other types of input sensors. In other embodiments, the input sensors 235 are located on a separate device that is linked with the IC 200.

In some embodiments, at bootup of the IC 200, the CPU 210 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 215 to write the weight values and other data to its memory 230. In addition, CPU 210 loads the neural network program instructions for the computation fabric to its own memory 225. These instructions are applied by the computation fabric 215 to input data in order to execute the neural network. These runtime instructions include, e.g., indications as to which pre-loaded sets of instructions to use for each set of calculations, etc.

The input processor circuit 205 receives input data (e.g., still images or video frames, sounds, etc.) from the input sensor(s) 235, and processes these according to processing instructions received from the CPU 210. The CPU 210 stores in its memory instructions for the input processor circuit to prepare input data for the computation fabric 215 as well as the neural network program instructions. These instructions identify, in some embodiments, any sort of initial processing to apply to the raw data (e.g., decompression of compressed data, etc.) as well as how to arrange the data to be provided to the computation fabric 215. For an image, e.g., these instructions might specify the order in which the pixels should be arranged and streamed to the computation fabric 215, so that the computation fabric stores this data in the appropriate locations of its memory 230 for subsequent operations. The input processor circuit 205 also sends signals to the CPU 210 to indicate when it has fully buffered an input (e.g., a frame of video) and when the input is prepared to be sent to the computation fabric 215.

In addition to instructing the input processor circuit 205 how and when to provide input data to the computation fabric 215, the CPU 210 provides the neural network program instructions to the computation fabric. In some embodiments the CPU 210 provides these instructions in stages (e.g., one layer or portion of a layer at a time). Once the final output of the neural network is computed, the fabric 215 provides this output back to the CPU, so that the CPU (or other circuitry on the device) can evaluate this output and perform any actions based on the output.

Before describing the controller structure on the computation fabric and the parsing of configuration instructions in detail, an overview of the neural network computation fabric structure will be provided. The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 3:
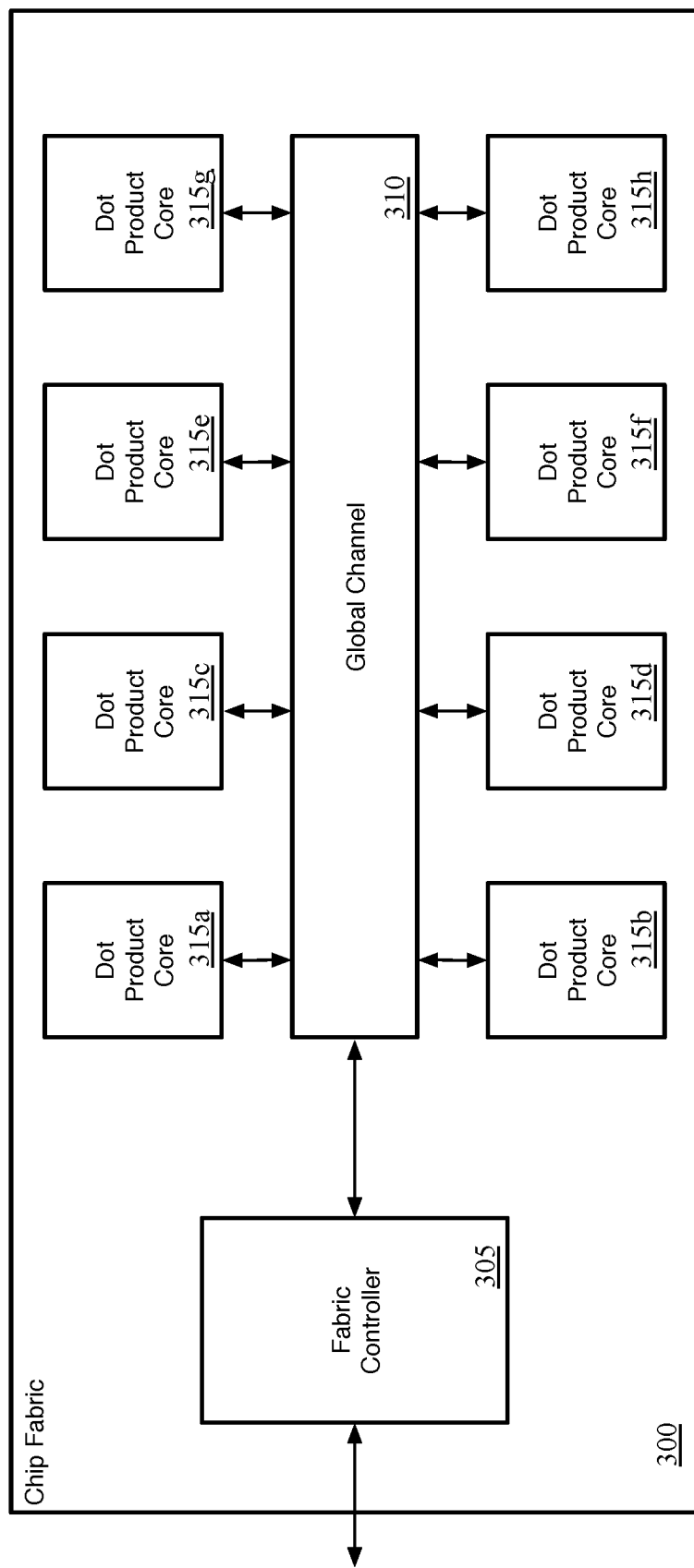
FIG. 3 conceptually illustrates the neural network computation fabric of some embodiments.

FIG. 3 conceptually illustrates the neural network computation fabric 300 (also referred to as the chip fabric) of some embodiments. The chip fabric 300 of some embodiments includes a fabric controller 305, a global channel 310, and a set of dot product cores 315a-h. The connections between the various components 305-315 represent the flow of both control data (e.g., configuration data for a particular neural network layer) and computation data at runtime in some embodiments.

The fabric controller 305 is responsible for managing the operation of the rest of the chip fabric 300 (e.g., the dot product cores 315) in some embodiments. The fabric controller 305 loads instruction arguments (e.g., weight values, previously computed activation values, etc.) from local memory (not shown) on the chip, maps instructions into a sequence of memory-mapped register writes, synchronizes the downstream controllers (e.g., controllers for the various cores 315), etc. The instructions managed by the fabric controller 305 are configured at compile time, in some embodiments, based on the parameters of the network being implemented by the chip fabric 300. In some embodiments, the fabric controller 305 interacts with the microprocessor of the IC as well (i.e., the fabric controller 305 handles the communication with the CPU 210 shown in FIG. 2).

The chip fabric also includes numerous dot product cores 315a-h as well as a global channel 310 that connects the cores, with these data processing circuits configured by the fabric controller (and a set of hierarchical control circuits, in some embodiments). These data processing circuits 310 and 315a-h operate to compute neural network operations in an efficient, low-power manner, according to the configuration data provided by the control circuits.

The dot product cores 315a-h include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The adder trees and input circuitry of some embodiments are described below in greater detail, by reference to FIGS. 12-14.

The global channel 310 is responsible for providing a communications bus for control and computation data between the fabric controller 305 and the cores 315a-h, as well as from one core to another. The global channel 310, among other operations, accumulates partial dot products from multiple cores when computing dot products that require more computations than can be performed in a single core, and performs post-processing on these dot products. In addition, the global channel 310 carries activations (i.e., computation node outputs) after post-processing for storage (and for use as inputs to subsequent computation nodes) in other cores 315a-h. In some embodiments, the global channel 310 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 310.

The chip fabric 300 of some embodiments computes numerous neural network computation nodes simultaneously, with the computation for one node often spread across multiple cores (and subsequently the global channel). In some cases, if a neural network layer is small enough, then computation for that layer may be confined to a single one of the cores 315a-h. However, if multiple cores are used for a given layer (any number of cores may be used in some embodiments), then each dot product computed for that layer is spread across all of the cores 315a-h in use.

That is, for a dot product computed across more than one of the cores 315a-h, each of these cores computes a partial dot product from a subset of the input values and weight values for the node, then provides these partial dot products to the global channel 310. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then computes dot products of these weight values with numerous different sets of input values.

In the simplest case, all of the partial dot products are computed in the same clock cycle and provided at the same time to the global channel 310. In some cases, however (e.g., for dot products with a very large number of terms), each core 315a-h computes more than one partial dot product, requiring multiple clock cycles. Based on configuration data specifying which outputs from the cores are to be added together (and whether multiple partial dot products are required from the same core), the global channel 310 aggregates these partial dot products to compute the complete dot product for each node, then applies various post-processing functions (e.g., the bias, scale, and non-linear activation functions) to compute the output of each node.

Figure 4:
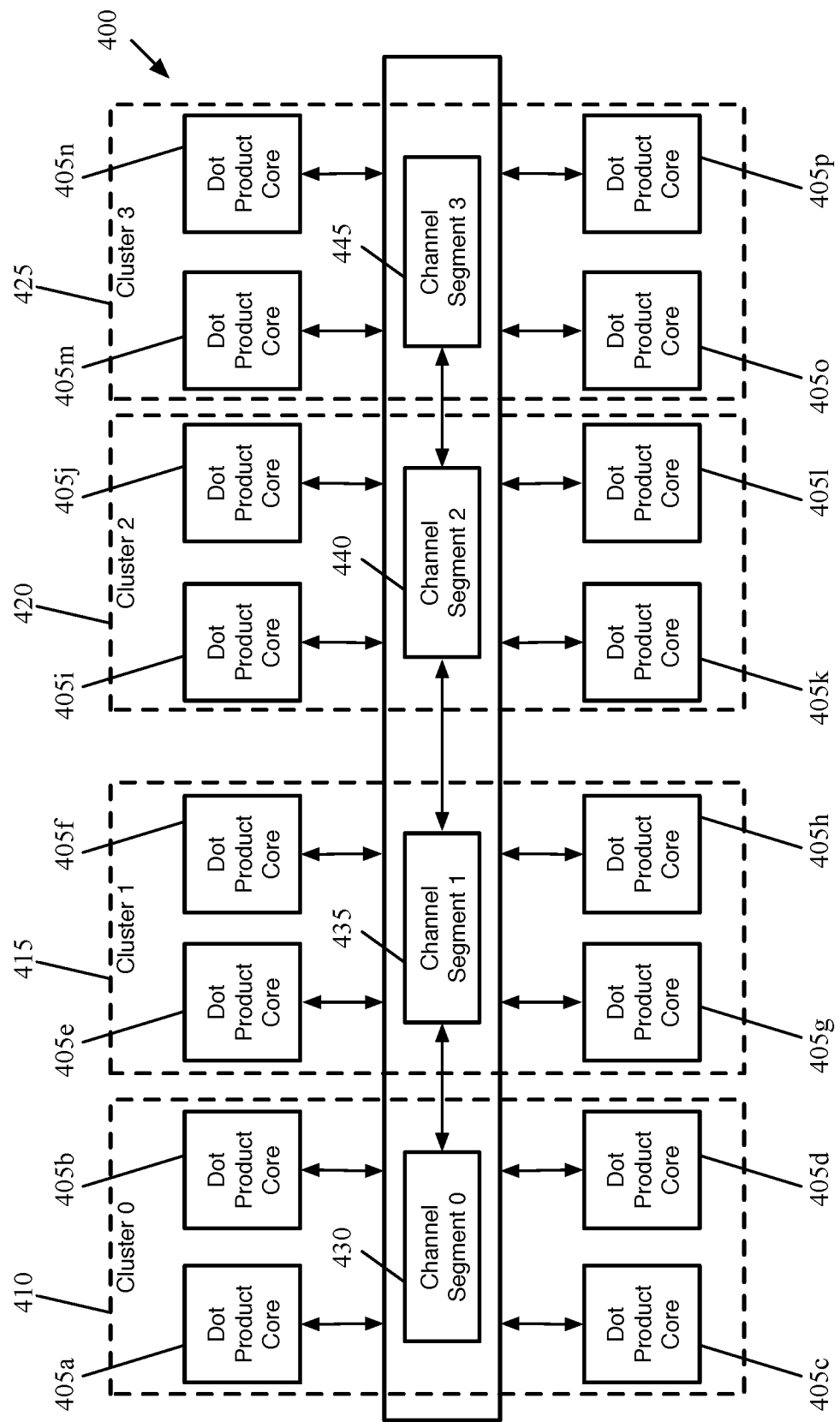
FIG. 4 illustrates a neural network computation fabric of some embodiments with sixteen dot product cores grouped into four clusters.

In some embodiments, the dot product cores are grouped into clusters, and the global channel includes separate segments for each such cluster. FIG. 4 illustrates a neural network computation fabric 400 of some embodiments with sixteen dot product cores 405a-p grouped into four clusters 410-425. In addition, the global channel includes four channel segments 430-445. Each of these channel segments includes the same circuitry in some embodiments, with the exception that buses in the first channel segment 430 and last channel segments 445 only connect to corresponding buses in one other channel segment while the buses in the intermediate channel segments 435 and 440 connect to corresponding buses in two channel segments.

The data processing circuitry of each of the channel segments 430-445 includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits are the computation node outputs (activations). The output bus, or activation write bus, carries the outputs of the post-processing circuits to the cores 405a-p to be stored as inputs for the next computation layer.

In some embodiments, each cluster 410-425 or group of clusters (e.g., clusters 410 and 415 being one group and clusters 420 and 425 being a second group) can execute a separate neural network. This allows the fabric to execute multiple networks simultaneously, so long as the networks are not so large as to require more than the cores of the allocated cluster. For instance, a single chip of an TOT device could run both a facial recognition network and an object recognition network, a facial recognition network and a language parsing network, etc.

Figure 5:
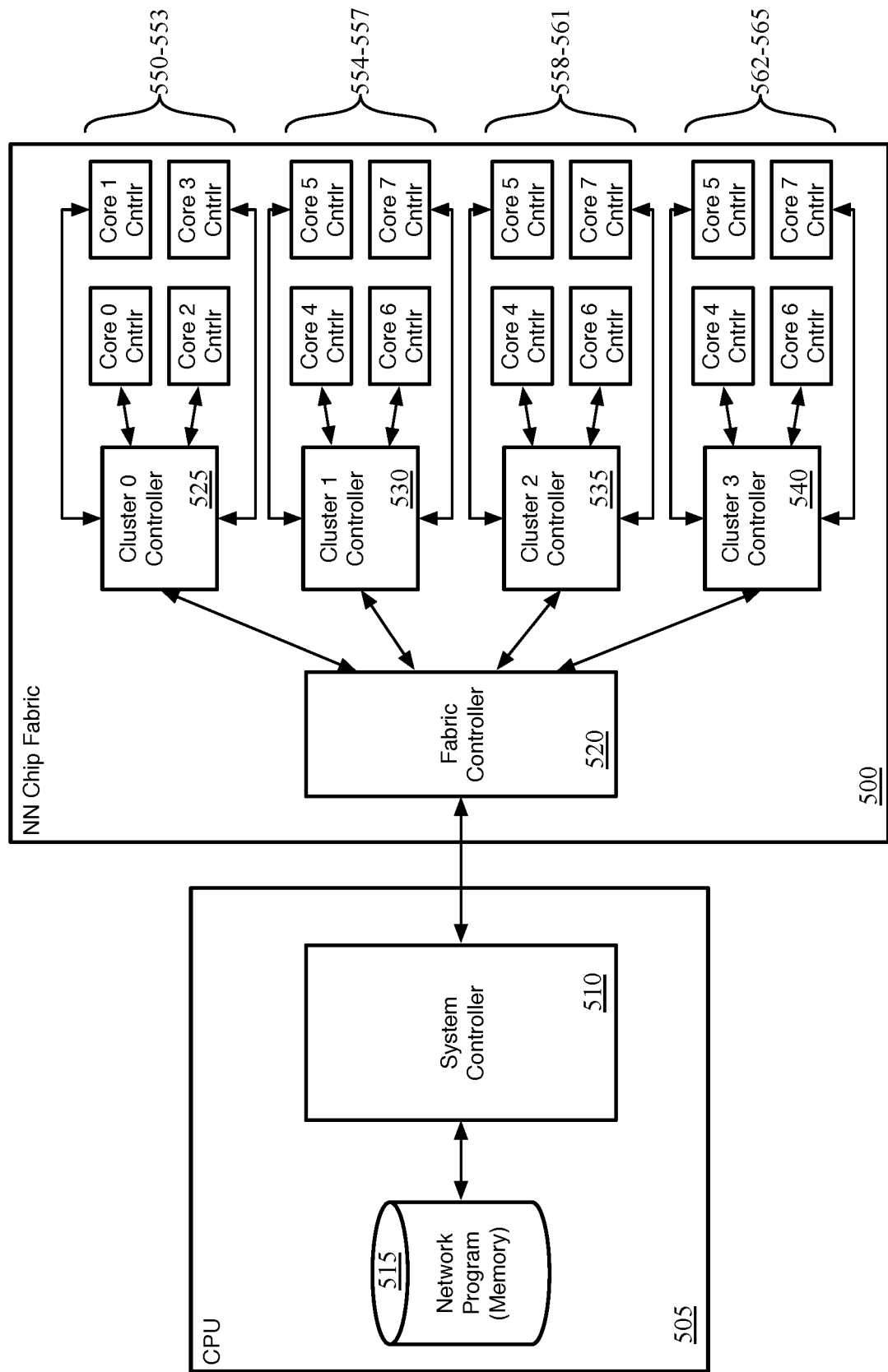
FIG. 5 conceptually illustrates a set of controller circuits for configuring a neural network chip fabric of some embodiments to execute a neural network.

Before describing the structure of the global channel in greater detail, the hierarchical control and configuration of the neural network chip fabric will be described. FIG. 5 conceptually illustrates the set of controller circuits for configuring a neural network chip fabric 500 of some embodiments to execute a neural network. As shown, a CPU 505 executes a system controller 510 and stores a neural network program 515 (i.e., the compiled version of the neural network) in its memory.

The system controller 510 provides the neural network instructions to the chip fabric 500 (per the stored network program 515) for the chip fabric to execute the program on incoming input data (e.g., images, etc.). In some embodiments, the system controller 510 provides these instructions to the chip fabric 500 incrementally. For instance, in some embodiments, the system controller 510 initially loads the instructions for the first layer of the neural network, or a portion of the first layer, then waits for a signal from the chip fabric 500 indicating that these instructions have been completed.

If a layer of the network is small enough to be completed in a single pass, then the compiler of some embodiments schedules the entire layer for one pass. However, as described below, there is a maximum number of filters that can be loaded in a single pass (e.g., 64). In addition, in some embodiments there is a maximum number of output sets that can be written to the same core in the same pass, so this can also constrict the number of filters in a pass. The chip fabric computes the output all of the nodes for each filter loaded (i.e., each pass loads all of the input activations for the layer in the correct order for the outputs to be computed. However, if a layer has more than this maximum number of filters, then the layer will be divided across multiple passes. Once the first portion of the network is completed, the system controller 510 provides the fabric 500 with the instructions for the second portion (e.g., a second layer, or a second pass of the first layer), and so on until the chip fabric has fully executed the network.

The chip fabric 500 includes a hierarchical control structure for configuring the data processing circuitry (i.e., the dot product cores and global channel segments) to execute the neural network instructions from the system controller 510. As shown, the chip fabric 500 of some embodiments includes (i) a fabric controller 520 that interacts with the system controller 510 on the CPU 505, (ii) a set of cluster controllers 525-540, and (iii) a set of core controllers 550-565. Some embodiments include one cluster controller for each cluster of the chip fabric and one core controller for each core (in this case the chip fabric 500 has four clusters with four cores each).

The fabric controller 520 provides the point of interaction with the CPU 505 for the chip fabric 500, receiving neural network program instructions from the system controller 510 and sending signals to the system controller to indicate when instructions have been completed. Upon receiving neural network instructions (e.g., for a layer of the network or portion of a layer), the fabric controller 520 receives these neural network instructions, parses the instructions to identify the active cores (and thus the active clusters), and unpacks additional arguments stored in local instruction memory on the chip fabric. In some embodiments, in order to minimize power usage, the instructions provided from the CPU are high-level commands that the fabric controller parses in order to determine more detailed instructions for the lower-level controllers. Doing so limits control signal power consumption on the chip while encapsulating implementation details of the lower-level (cluster, core) circuits.

For example, in some embodiments the instructions from the system controller 510 to the fabric controller 520 specify to execute a particular pass of a particular layer of the network, and the fabric controller memory includes the required information to execute this specific pass. In some embodiments, this information is conveyed by the system controller instructions specifying to execute a particular type of pass or layer (e.g., convolution) based on the arguments found at a particular memory location of the fabric controller's memory. The specified memory location stores arguments such as the source cores for the computations (i.e., the cores that will perform the dot product calculations) and the destination cores for the output values (i.e., the cores to which the output values are stored), the memory locations in the cores at which to find the weight and/or input values for the computations (in some embodiments, the weight values are loaded into memory initially such that these memory locations are the same across all of the source cores), information for calculating the non-linear activation function for the layer (e.g., the lookup table mapping information), etc.

Because layers may potentially include thousands of output activation values, having the CPU specify a core and RAM location for each such activation value would require a lot of power. Instead, as described, some embodiments specify only a few parameters required for the chip fabric to determine the memory locations for each activation value (e.g., the cores at which the values will be stored, the starting memory address that is the same for each core, and the dimensions of the activation layer). In addition, similar principles apply to the use of input values already stored in RAM (the outputs of the previous layer) for the dot products of the current layer. The weight values and their location in memory, the location of the input values, the lookup table configuration for a layer, etc. are all the same for each network input (e.g., each frame of video) as the network is statically scheduled, so resources can be saved by storing all of this information on the chip at bootup, with a minimal amount of instruction information sent from the CPU for each layer or pass (i.e., only the location in the fabric controller of the arguments for the current layer).

The fabric controller then provides cluster instructions to the cluster controllers for the identified clusters that are in use for the current neural network layer, and waits for completion signals from the clusters indicating that the current set of instructions has been executed (and thus, that the fabric controller can retrieve the next set of instructions from the system controller on the CPU). Avoiding use of some of the clusters when possible provides power savings, as these cores can be powered down, or at least the memories in the cores put to sleep. Even for networks that require the use of all of the cores of the chip fabric, often the initial layers have smaller dot product computations that require fewer cores. In addition, in some embodiments, the fabric controller synchronizes the cluster controllers, ensuring that dot products computed across multiple clusters are aggregated together correctly.

In some embodiments, the cluster instructions provided by the fabric controller are not fully parsed instructions, pushing some of this work to the cluster and/or core controllers. For instance, the fabric controller may only provide the starting memory address for the activations and the activation layer dimensions, allowing the cluster controllers to determine at which core (and the RAM location within that core) each activation value is to be stored. The fabric controller also broadcasts these instructions in some embodiments, while including certain bits that specify the difference in setup between the clusters (or whether certain clusters even need to act on the instructions). Some embodiments broadcast the instructions only to the clusters involved in the computation (which could include clusters with source cores, destination cores, or both). This broadcasting reduces latency and power consumption as compared to sending separate sets of instructions to each cluster.

Each of the cluster controllers 525-540 receives instructions from the fabric controller and configures its own segment of the global channel in addition to parsing the instructions to identify configuration data for each of the cores in its cluster. That is, each cluster controller 525-540 that receives cluster instructions for a given high-level instruction directly configures the dot product bus, the post-processing units, and the activation write bus in its channel segment. In addition, these cluster controllers 525-540 determines which of its cores require the instructions and provides these instructions to the core controllers for these identified cores.

Much as the fabric controller 520 parses the high-level instructions from the system controller 510, the cluster controllers 525-540 of some embodiments decompose the instructions from the fabric controller 520 to determine the configuration data to provide to its channel segment circuits (dot product bus, post-processing units, and activation write bus) as well as the sets of instructions for each of its cores. The cluster controllers configure the channel segment circuits to, e.g., aggregate the partial dot products from the cores correctly (both within a channel segment and across channel segments), provide these aggregated dot products to the post-processing units in the correct channel segment, perform post-processing operations, and provide the output of the post-processors to the correct core. In some embodiments, this information both comes from the fabric controller (e.g., the lookup table mapping for the non-linear activation function) as well as from information stored in cluster controller memory.

The use of separate cluster controllers enables the ability of the chip fabric to execute multiple separate networks simultaneously in some embodiments. The fabric controller 520 can provide instructions to the first cluster controller 525 for a layer of a first neural network and, so long as those instructions do not require the use of other clusters, the first cluster can execute the entire neural network layer in a self-contained manner. At the same time, the fabric controller 520 could provide instructions to the second cluster controller 530 for a layer of a second neural network, with the second cluster executing the entire neural network layer in a self-contained manner. The third and fourth cluster controllers 535 and 540 could receive instructions for third and fourth networks as well, to execute at the same time as the first two. In addition, other combinations of clusters can execute multiple networks simultaneously (e.g., the first two clusters executing a first network and the second two clusters executing a second network, the first two clusters executing a first network while the third and fourth clusters each separately execute second and third networks, etc.

The cluster controllers 525-540, as mentioned, also provide the appropriate configuration data to each of the core controllers 550-565, which coordinate the dot product processing in the core (as well as the direct delivery of input activation values to the global channel for pooling, element-wise operations, etc.). In some embodiments, the cluster controllers do not fully parse the instructions to specify each individual memory read or write, but instead provide the higher-level instructions to each core controller. In addition, some embodiments broadcast the instructions from a particular cluster controller to each of the core controllers within the cluster (or the core controllers for each of the cores active in the current pass), while including certain bits that specify the difference in setup between the cores. This broadcasting reduces latency and power consumption as compared to sending separate sets of instructions to each core.

The core controllers 550-565 then parse these instructions to determine the specific configuration data for the operations of the core. This configuration data includes memory locations for various read operations to read and align weight and activation values, enable bits for the dot product operations, memory locations for write operations after activations have been computed, etc. Once the instructions are fully executed, the core controllers 550-565 send completion signals to the cluster controllers 525-540. Similarly, once the cluster controllers 525-540 receive these completion messages, they send similar messages to the fabric controller 520, which can then notify the system controller executing on the CPU that the instructions are complete. In some embodiments, the last set of neural network instructions is a set of memory read operations, for the computation fabric to deliver the neural network output results to the system controller for any post-processing operations (e.g., a soft-max operation to generate a probability, etc.). After this, the system controller puts the fabric to sleep until the next set of input data is to be processed, in some embodiments.

Figure 6:
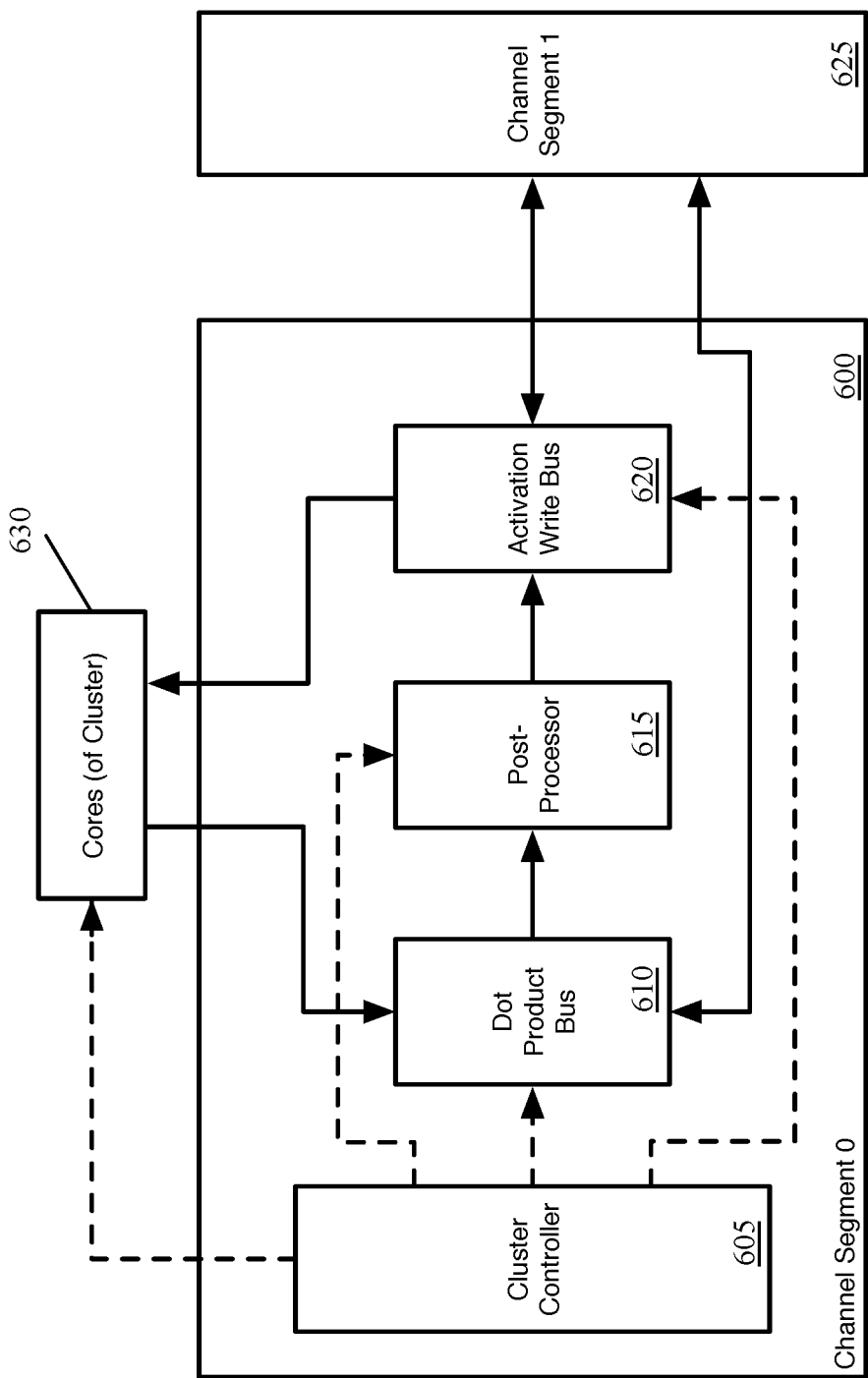
FIG. 6 conceptually illustrates the circuit blocks of a channel segment of some embodiments.

Returning to the neural network computation circuitry, FIG. 6 conceptually illustrates the circuit blocks of a channel segment 600 of some embodiments (e.g., one of the channel segments 430-445 shown in FIG. 4). The channel segment 600 includes a cluster controller 605, a dot product bus 610, a post-processor 615, and an activation write bus 620 (also referred to as an output bus). In addition to the channel segment 600, the figure also illustrates an additional channel segment 625 and the cores 630 of the local cluster for the channel segment 600, as the circuit blocks of the channel segment 600 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 630 to the post-processor 615 for pooling nodes or element-wise operators, is not shown.

The cluster controller 605 configures the dot product bus 610, post-processor 615, and activation write bus 620 as per the configuration instructions received from the fabric controller in some embodiments. For the dot product bus 610, this configuration data specifies, in some embodiments, (i) which partial dot products are to be added together as part of the same neural network computation node and (ii) to which post-processing unit each aggregated dot product is sent (the post-processor 615 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 615, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 620, the configuration data indicates to which cores each output value is to be delivered, in some embodiments. The operation of each of these circuit blocks 610-620 is discussed in greater detail below.

As mentioned, the solid lines indicate the flow of neural network computation data, for a node in a convolutional or fully-connected layer. The cores 630 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these cores.

These partial dot products are output to the dot product bus 610, which aggregates the partial dot products from the cores 630 of the local cluster. The dot product bus spans all of the channel segments, and the dot product bus in each channel segment aggregates the partial dot products from the cores of its local cluster. The dot product bus 610 in the channel segment 600 also exchanges locally-aggregated dot products with its neighboring segments for further aggregation if needed. In this case, the channel segment 600 only has one neighboring segment, but internal channel segments (e.g., the segments 435 and 440 in FIG. 4) will have two such neighboring segments. The configuration data from the cluster controller 605 specifies whether to send these dot products in one direction or the other along the global channel, or to aggregate the dot products from the neighboring channels locally, depending on where post-processing will occur for each dot product.

The post-processor 615 includes numerous post-processing units that receive the dot products from the dot product bus and perform the non-dot product functions of the neural network computation nodes. For a typical computation node of a convolutional (or fully-connected) layer, these functions includes an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table rather than a hardwired function. This enables the IC to execute different neural networks that use different activation functions and, in some embodiments, allows for different activation functions to be used in different layers of the neural network.

The activation write bus 620 receives the computation node activation outputs from the post-processing units and carries these outputs back to the cores 630, to be stored in the memory of the core and used as inputs for the computation nodes of the next layer of the neural network. The activation write bus connects to the cores 630 in the local cluster as well as the activation write bus in the neighboring channel segment 625. As with the dot product bus 610, the activation write bus 620 of some embodiments includes lanes, with each post-processing unit of the post-processor 615 sending its output to a different one of these lanes.

In some embodiments, the output values may be computed by the post-processor 615 in one cluster but carried by the activation write bus 620 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 620 also includes a right shift circuit for each core that is used to align the output values for the core, in order for the values to be stored in contiguous blocks within the core RAM.

Figure 7:
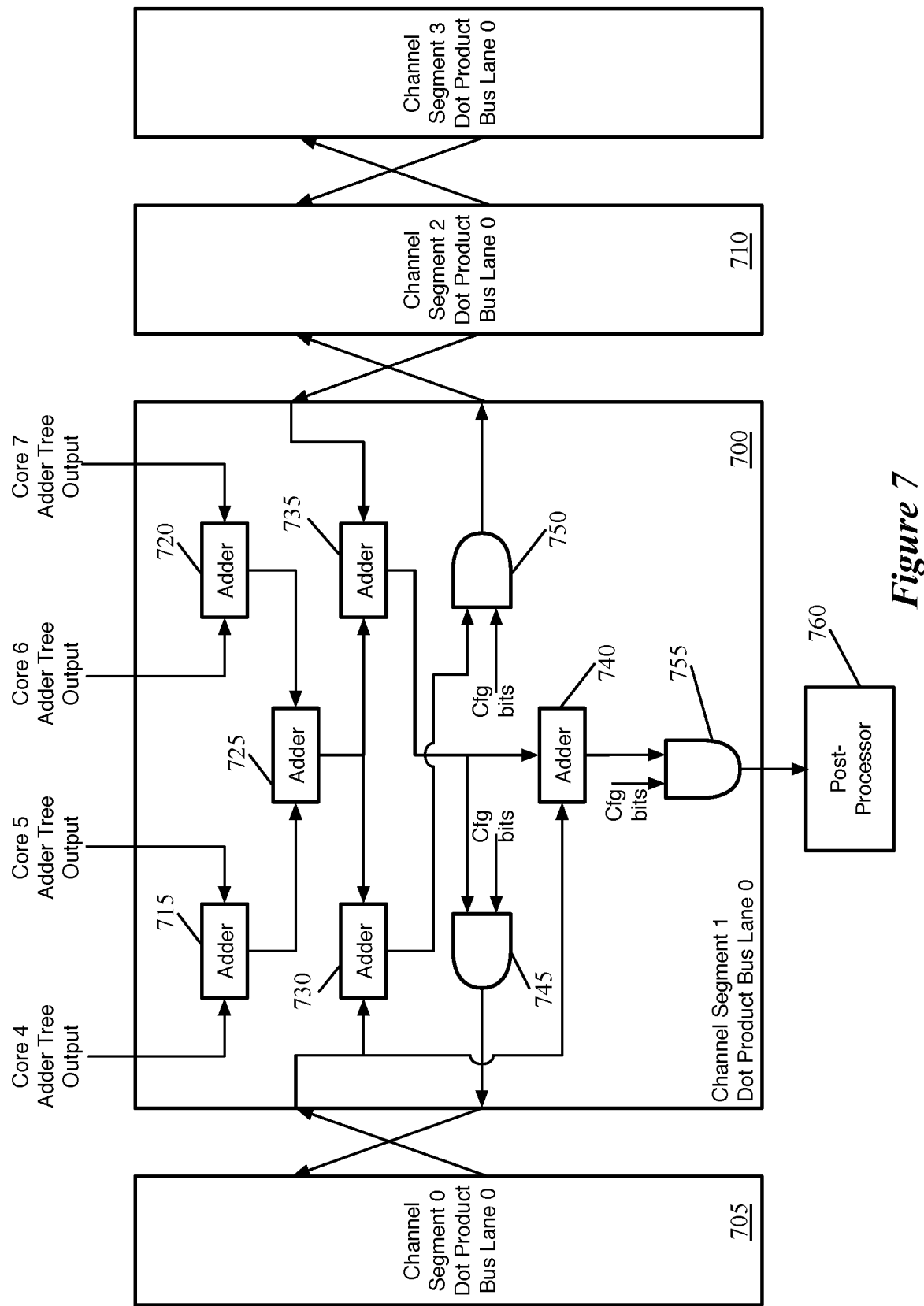
FIG. 7 conceptually illustrates a portion of the dot product bus of some embodiments.

Now that the primary circuit blocks of the global channel have been introduced, these circuits of some embodiments will be explained in greater detail. FIG. 7 conceptually illustrates a portion 700 of a dot product bus of some embodiments. In this example, the segment for which the dot product bus portion 700 is shown is an internal segment (in that it has two neighboring segments 705 and 710). The dot product bus of some embodiments includes, within each segment, numerous (N) non-interacting lanes, and the portion 700 is a segment of one of these lanes. In some embodiments, each segment includes the same number of lanes, and lane n E N in one segment is connected to lane n in its neighboring segments for the aggregation of dot products across clusters. In some embodiments, the number N of dot product bus lanes is equal to the number of adder trees computing partial dot products in each core, the number of post-processing units in each post-processor block of a channel segment, and the number of activation write bus lanes. Thus, each computation node has its partial dot product computed by the same adder tree in each of one or more cores, which is aggregated across the corresponding dot product bus lane to calculate the complete dot product. This complete dot product is (in the typical case) provided to the corresponding dot post-processing unit, which provides its output to the corresponding activation write bus lane to be carried to the appropriate core.

The dot product bus portion 700 includes a set of adders 715-740 as well as a set of AND gates 745-755. The first three adders 715-725 form an adder tree to aggregate the partial dot products output by the corresponding adder trees of the four cores of the local cluster for the channel segment. In some embodiments, if a core does not compute a partial dot product for a particular computation node, then that core outputs a 0 value to the dot product bus. This aggregated partial dot product is output to both of the adders 730 and 735.

These adders 730 and 735 handle the computation of dot products that are "moving" downstream (to a lower-numbered segment, in this case segment 705) and downstream (to a lower-numbered segment, in this case segment 710). The adder 730 receives the aggregated dot product from the corresponding downstream dot product bus lane 705 and combines it with the locally aggregated dot product from the adder 725. If either (i) the cores of the downstream cluster(s) do not participate in the dot product computation or (ii) the dot product will be completely aggregated and sent to a post-processor downstream, then this value received from the downstream dot product bus lane 705 is gated to 0 (i.e., by the equivalent of AND gate 750 in the downstream segment).

Correspondingly, the adder 735 receives the aggregated dot product from the corresponding upstream dot product bus lane 710 and combines it with the locally aggregated dot product from the adder 725. If either (i) the cores of the upstream cluster(s) do not participate in the dot product computation or (ii) the dot product will be completely aggregated and sent to a post-processor upstream, then this value received from the upstream dot product bus lane 710 is gated to 0 (i.e., by the equivalent of AND gate 745 in the upstream segment).

The output of the adder 730 is sent to the AND gate 750, which ANDs this output with configuration bits from the local cluster controller based on where the post-processing for the completed dot product will be performed. If the post-processing segment is upstream, then these configuration bits are 1 (resulting in the aggregated dot product being passed upstream), whereas if the post-processing segment is either downstream or local, then these configuration bits are 0 (resulting in 0 values being passed upstream).

Similarly, the output of the adder 735 is sent to the AND gate 745, which ANDs this output with configuration bits from the local cluster controller based on where the post-processing for the completed dot product will be performed. If the post-processing segment is downstream, then these configuration bits are 1 (resulting in the aggregated dot product being passed downstream), whereas if the post-processing segment is either upstream or local, then these configuration bits are 0 (resulting in 0 values being passed downstream).

The final adder 740 receives (i) the output of the adder 735 and (ii) the aggregated dot product from the downstream segment 705 of the dot product bus lane. It should be noted that the directions could be reversed in other embodiments with an equivalent effect, with this adder 740 instead receiving the output of the adder 730 and the aggregated dot product from the upstream segment 710 of the dot product bus lane. This adder aggregates the complete dot product (accounting for the partial dot products from the local cores and upstream cores via the output of adder 735 and the partial dot products from the downstream cores via the output from the segment 705).

The output of the final adder 740 is provided to the post-processor 760 (e.g., to the post-processing unit that corresponds to the lane of the dot product bus). However, AND gate 755 is used to gate this output to 0 if the post-processor for this dot product bus lane is not local (i.e., either upstream or downstream). In summary, the dot product bus lane segment 700 is configured (via the AND gates 745-755) to (i) add the local cluster partial product with the downstream partial product and pass this aggregated partial product upstream if the post-processing segment is upstream, (ii) add the local cluster partial product with the upstream partial product and pass this aggregated partial product downstream if the post-processing segment is downstream, and (iii) add the local cluster partial product with the downstream and upstream partial products and pass this completed dot product to the local post-processor if the post-processing will be performed locally. In some embodiments, the post-processing segment is selected by the compiler, with the primary factor in this selection being that the post-processing segment is centrally located among the source clusters (i.e., the cores that compute the partial dot products and a secondary factor being that the selected segment is as close to the destination core(s) as possible, in order to reduce the power required for the computation and write operations.

In addition to the circuitry shown in FIG. 7, the dot product bus also includes a control block in some embodiments. This block is responsible for outputting a signal to the post-processor block to indicate when the output of the dot product bus is valid (i.e., when the dot products are aggregated by the dot product bus), so that the post-processor acts on the data from the dot product bus.

Figure 8:
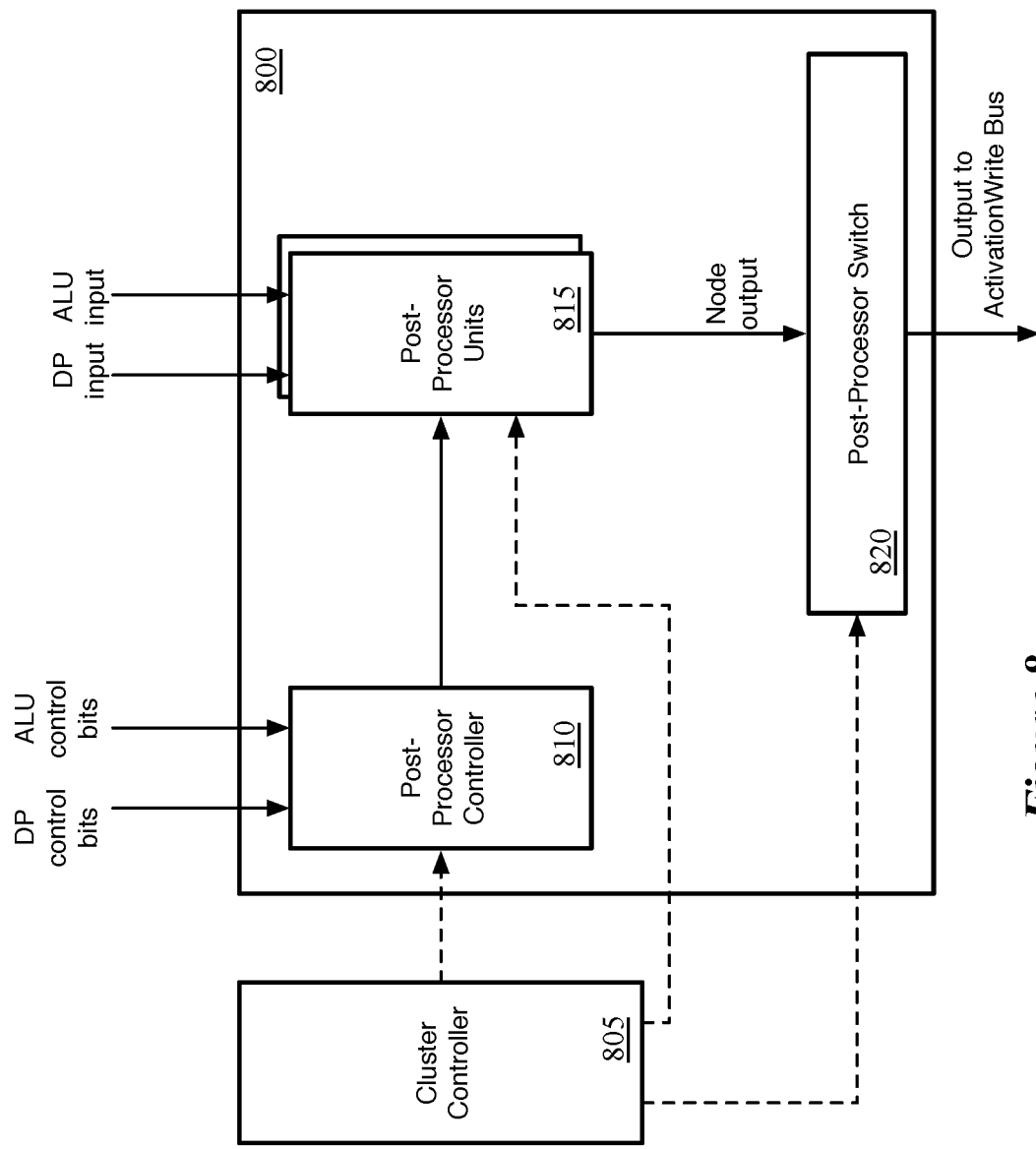
FIG. 8 conceptually illustrates the post-processing circuit block for a channel segment of some embodiments, along with the local cluster controller that provides configuration data to this post-processor.

FIG. 8 conceptually illustrates the post-processing circuit block 800 for a channel segment of some embodiments, along with the local cluster controller 805 that provides configuration data to this post-processor 800. As shown, the post-processing circuit block 800 includes as sub-blocks a post-processor controller 810, a set of post-processing units 815, and a post-processor switch 820. The cluster controller 805 provides configuration data to each of these sub-blocks in order to synchronize operations, and to configure the post-processing units 815 with the correct bias and scale factors as well as the activation function.

The post-processor controller block 810 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is final dot product, as dot products are not sent every clock cycle) as well as accumulate, valid, and end of row signals for the ALU bus. The ALU bus, as mentioned, carries activation values directly from the cores without having dot products performed, to be used for pooling and element-wise operation layers. The accumulate and valid signals indicate to the post-processor whether the incoming ALU data is to be used, while the end of row signals that different configuration data should be used for certain post-processing operations when the end of a row of input values is reached (e.g., on account of padding, etc.). The post-processor controller block 810 aggregates these signals, as mentioned, and outputs signals to the post-processing units 815 to indicate when the post-processing units are receiving valid dot product or ALU data.

The post-processor 800 includes numerous post-processing units 815 that handle the non-dot product computation of the neural network nodes. In some embodiments, the post-processor block within a segment includes the same number of post-processing units 815 as there are dot product bus lanes and activation write bus lanes (which is also the number of adder trees in each core for computing partial dot products). Each post-processing unit 815 receives two types of data inputs: (1) dot products from the dot product bus for convolution and fully-connected neural network nodes and (2) activation inputs (ALU inputs) from the core RAM for pooling nodes and element-wise operator nodes.

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Some of the details of the post-processing units are described further below by reference to FIGS. 9-11.

The post-processing switch 820 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing four 4-bit activation outputs onto the wires for one 16-bit activation output).

Figure 9:
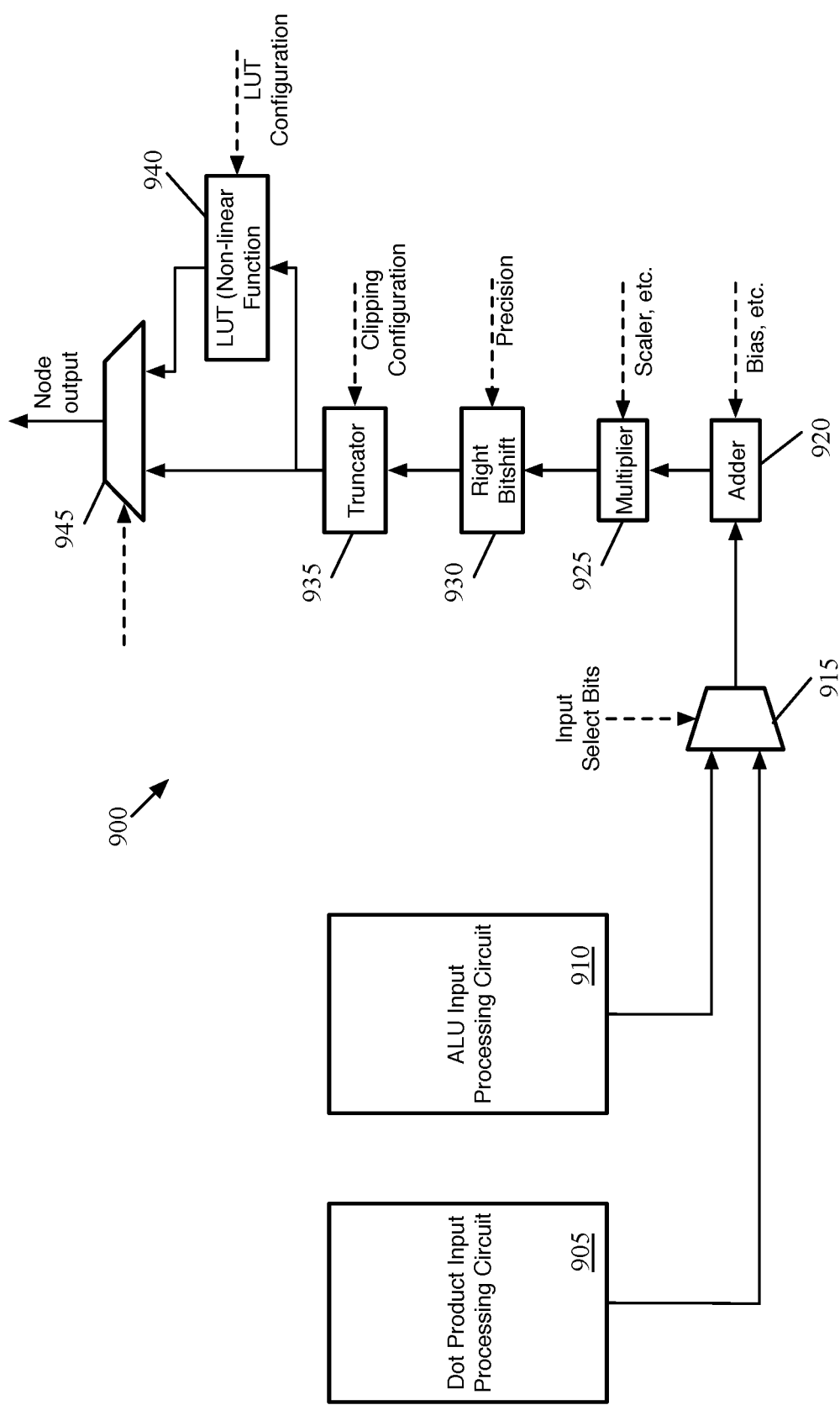
FIG. 9 conceptually illustrates the structure of a post-processing unit of some embodiments.
Figure 10:
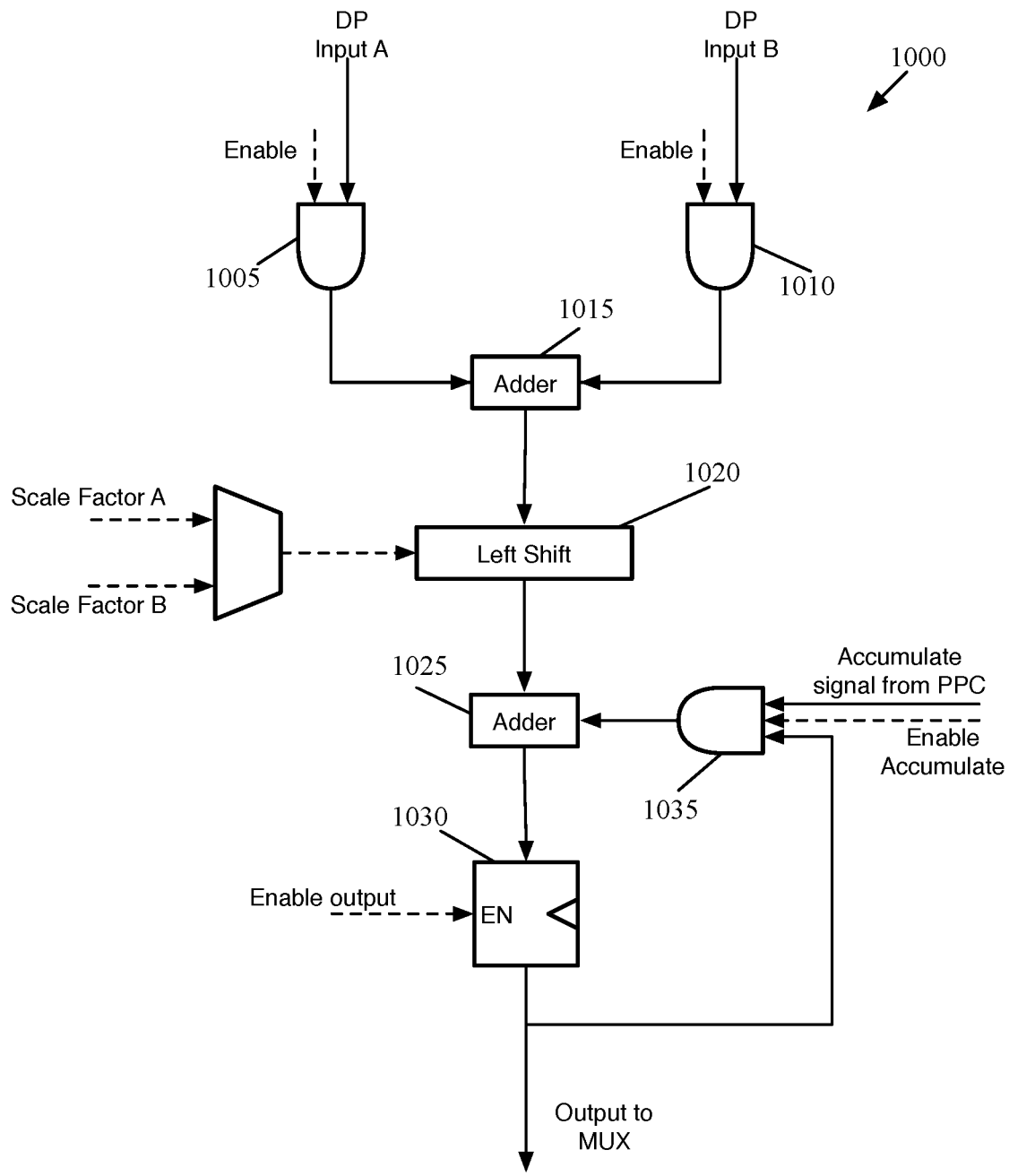
FIG. 10 conceptually illustrates a dot product input processing circuit of some embodiments.
Figure 11:
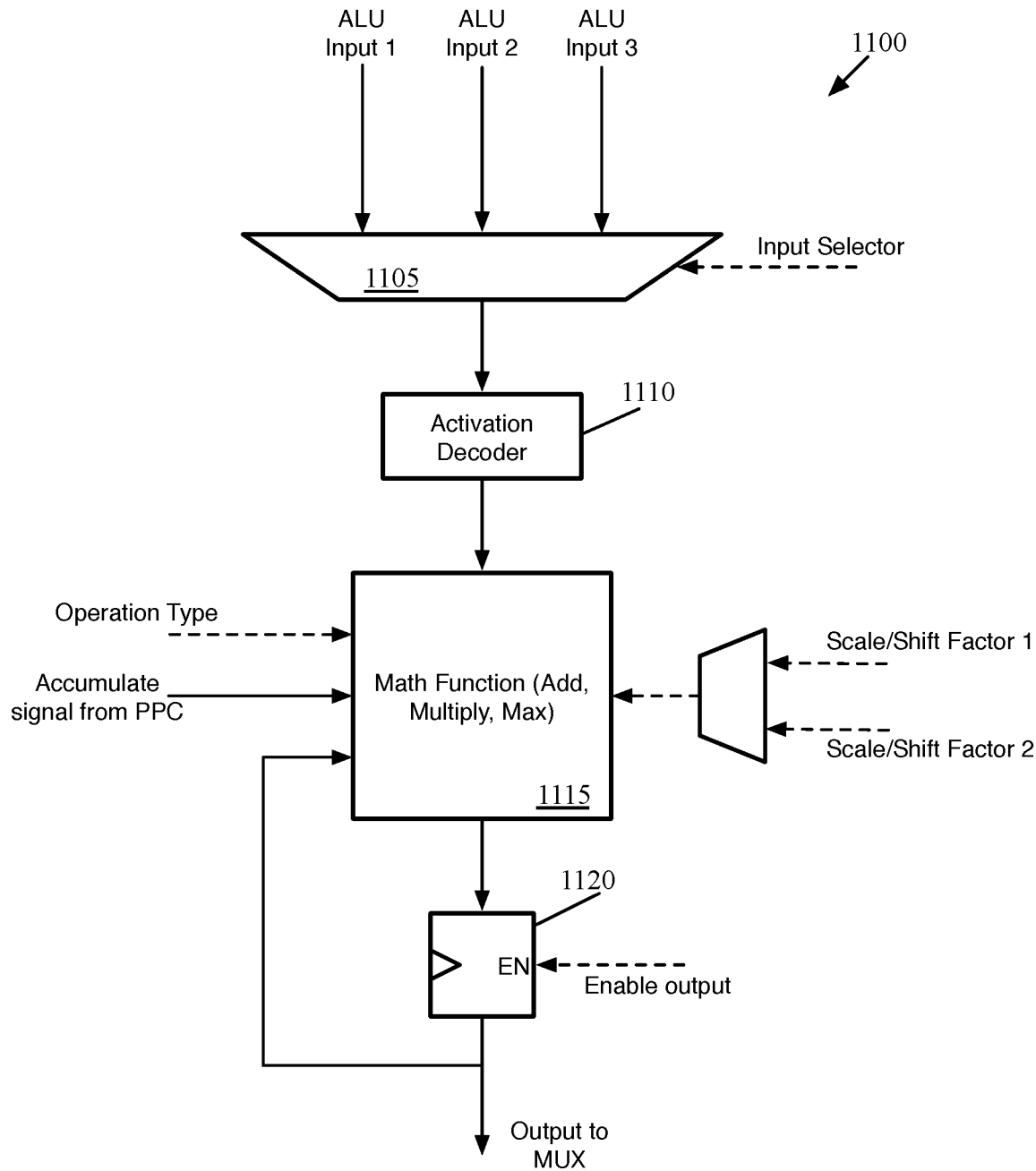
FIG. 11 conceptually illustrates an ALU input processing circuit of some embodiments.

As mentioned, FIGS. 9-11 illustrate the post-processing units in more detail. FIG. 9 conceptually illustrates the structure of a post-processing unit 900 of some embodiments. As shown, the post-processing unit 900 includes a dot product input processing circuit 905, an ALU input processing circuit 910, a multiplexer 915 that selects between the outputs of these two circuits, and a set of post-processing operation circuits 920-945.

The dot product input processing circuit 905, described in further detail by reference to FIG. 10, is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bit-shifting the first set of input data.

The ALU input processing circuit 910, described in further detail by reference to FIG. 11, is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output of each of these circuits 905 and 910 is sent to a multiplexer 915, and a set of configuration bits is used to select between these two possible inputs. This input value is sent to an adder 920 and then to a multiplier 925. For dot product outputs, the adder 920 adds the bias of the linear function for the node and the multiplier 925 multiplies this by the scaling factor for the linear function. The bias value sent to the adder 920, in some embodiments, is a combination of (i) the bias value computed during the training of the neural network and (ii) a number of negative weight values. As described in more detail below and in U.S. patent application Ser. No. 16/120,387, filed Sep. 3, 2018, now issued as U.S. Pat. No. 10,740,434, which is incorporated herein by reference, in some embodiments the weight values are ternary in each layer (i.e., either 0, a positive value, or a negation of that positive value). The partial dot product calculation in the cores treats these ternary weights as {0, 1, and −1}, and uses a ternary MAC circuit that performs one's complement addition to account for negative weights. The bias factor in the configuration data then accounts for the number of negative weights, to effectively turn the one's complement addition into two's complement addition. Furthermore, for larger input and output values (e.g., 8-bit input and output values), in which the dot product input processing circuit 905 left shifts the dot product of the most significant bits of the inputs (e.g., by 4 bits), the bias factor has to add a larger amount for the negative weights. For the 8-bit case (in which the dot product of the weights with the most significant nibble of the inputs is shifted by 4 bits), the bias factor adds 17 for each negative weight. The value sent to the multiplier 925, in some embodiments, is a combination of (i) the scaler value computed during the training of the neural network (which is often 1) and (ii) the positive value of the ternary weight (which was removed in order to scale the weight values used in the dot product to 1 and −1).

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and element-wise operator layers may use the same value for all of the nodes (often zero). For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 930 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions.

The truncator 935 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 935 receives (as output from the right bit shifter 930) more bits than it outputs (e.g., receiving 32 bits but outputting a maximum of 16 bits).

Finally, the LUT 940 implements the non-linear activation function. The full (e.g., 16-bit, 8-bit) output of the truncator 935 is passed to the multiplexer 945, while a subset of the output bits (e.g., 5 bits) are also split off to the LUT 940. This LUT effectively implements a mapping table representing the activation function for the neural network computation node, and the multiplexer 945 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions with can be implemented using the modulus function of the truncator 935. In this case, the period of the period function is the full truth table provided to the lookup table 940, with the modulus function meaning that only the 5 least significant bits of the output from the right bit shifter 930 will affect the value output by the lookup table 940.

FIG. 10, as mentioned, conceptually illustrates a dot product input processing circuit 1000 of some embodiments. As shown, the circuit 1000 receives the output of two dot product bus lanes (dot product input A and dot product input B). These inputs are each gated by AND gates 1005 and 1010, which use enable bits from the cluster controller to specify which dot product to use as input (or both), in certain cases. As mentioned above, in some embodiments each post-processing unit receives the output of a different corresponding dot product bus lane as its first dot product input (i.e., DP input A). That is, if there are N dot product bus lanes and N post-processing units in a cluster, then the nth post-processing unit receives its first dot product from the nth dot product bus lane. The second dot product input (i.e., DP input B) for each post-processing unit is from a different lane, as described in more detail below by reference to FIGS. 21 and 22

In this example, the activation size has the option of being either a first size (e.g., 4-bit) or twice that size (e.g., 8-bit). In the simplest case, in which (i) the dot product for a node has few enough input/weight values to be performed in one cycle, (ii) the activation size is the smaller size, and (iii) there are no sparsity violations with the filter slices assigned to each core, then the remainder of the circuit 1000 effectively acts as a pass-through for the first dot product input. The AND gate 1005 enables this first dot product input, while the AND gate 1010 gates the second dot product to 0. However, in other situations, the adder 1015, left-shift operator 1020, and adder 1025 enable the dot product calculation for a neural network node to be completed and provided to the other post-processing operations. In addition, the left shift circuit 1020 can also be used to align a dot product to ensure that the binary point is in the correct location for the input value. The operations of these circuits to compute more complex dot products are described further below.

In addition to these dot product operations, in some embodiments the post-processing units include additional circuitry for performing operations for neural network computation nodes that do not use dot products. As noted above, the nodes of some neural network layers use computations that do not include dot products. For example, a convolutional neural network will typically include pooling layers that reduce the number of activations by performing a computation on spatially-proximate groups of activations (i.e., the outputs of spatially-proximate nodes). Typical pooling operations include average pooling (reducing a group of activations to a single activation value by computing the average of the activations) and max pooling (reducing a group of activations to a single activation value by selecting the maximum value of the activations). Element-wise operations, in some embodiments, use inputs from multiple layers that are the same shape, and add or multiply the corresponding elements from those layers.

FIG. 11, as mentioned, conceptually illustrates an ALU input processing circuit 1100 of some embodiments. As shown, the ALU input processing circuit 1100 receives a set of ALU inputs (in this case 3) from an ALU bus that carries activation values directly from the cores. A multiplexer 1105 selects one of these inputs (based on configuration data from the local cluster controller). The selected input is sent to the activation decoder 1110, which sign-extends the input value into (adding an extra bit to this value. For instance, a 4-bit input activation would be sign-extended into a 5-bit value.

The math circuit 1115 is a set of circuit blocks that performs operations on a pair of operands. The first operand is the decoded ALU input from the activation decoder 1110, and the second operand is either a preset value or the previous output of the math circuit 1115. Some embodiments also subject the first input to a reverse shift and scale, if needed, to put this input in the same number system as the second operand. The shift and scale values are determined by configuration data from the cluster controller, which also provides data to the math circuit 1115 to indicate which of a set of possible operations the math circuit 1115 performs in a given cycle.

In some embodiments, the math circuit 1115 can be configured to perform addition (e.g., for both element-wise addition and average pooling), multiplication (e.g., for element-wise multiplication) and comparison (for maximum pooling). Each of these operations requires multiple clock cycles, as only a single input can be received each cycle. The register 1120 holds the previous output of the math circuit 1115 until that output is required as an operand for the next operation of the math circuit 1115, or the operation is complete and the value is sent to the other post-processing operations (as shown in FIG. 9).

Figure 12:
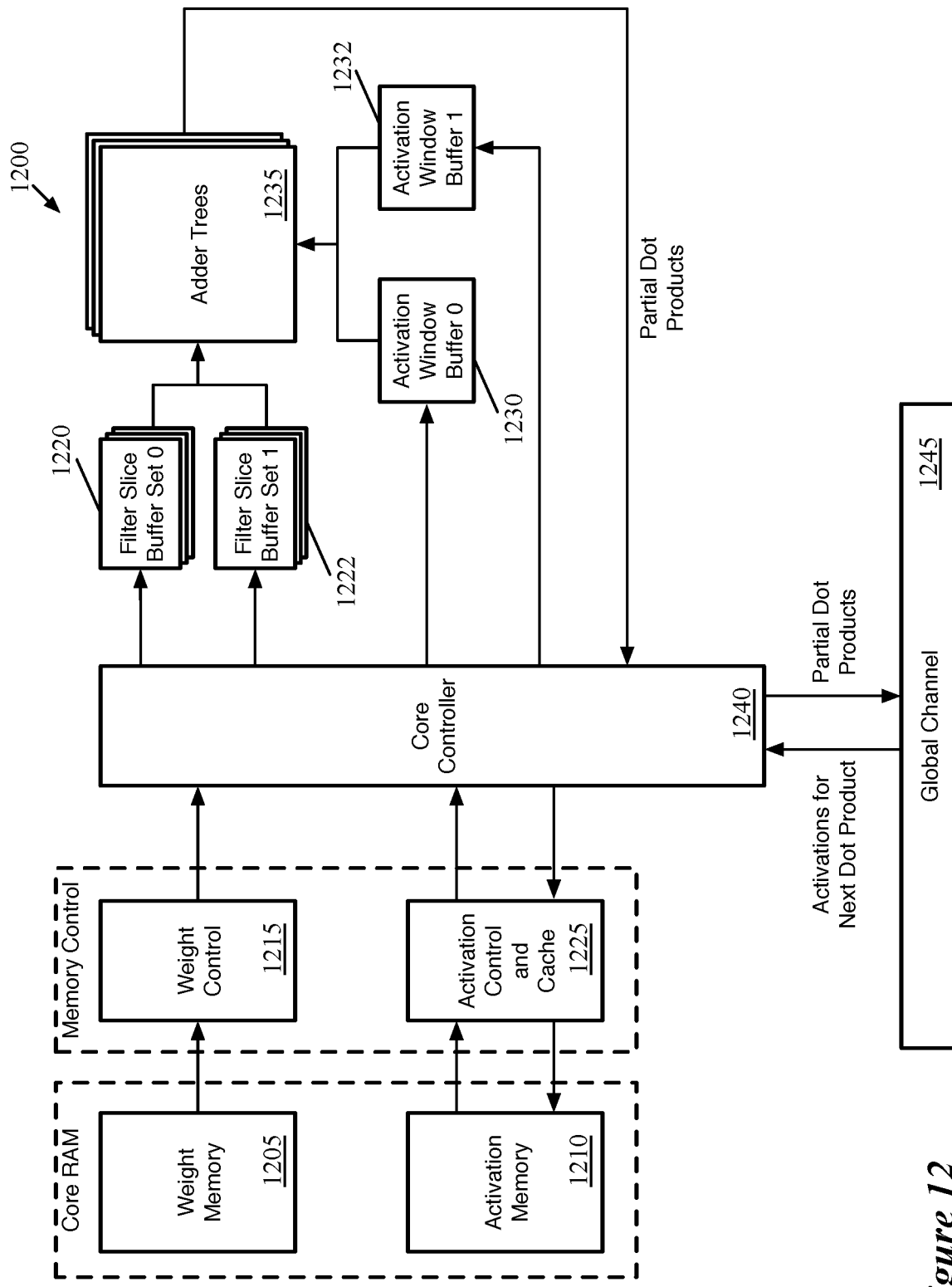
FIG. 12 conceptually illustrates the data flow within one of the cores of some embodiments for a dot product computation.

As mentioned, the dot product cores perform the majority of the dot product computation of the chip fabric of some embodiments. FIG. 12 conceptually illustrates the data flow 1200 within one of the cores of some embodiments for a dot product computation. This data flow will be described with certain specifics (e.g., weight sizes, number of separate adder trees simultaneously computing partial dot products, etc.) as examples, but it should be understood that different embodiments may use different sizes for weight and/or activation values, different numbers of adder trees within a core, etc.

In some embodiments, the dot product cores store weight values (e.g., weights for multiple nodes in multiple layers) in the weight memory 1205 and activation values in the activation memory 1210. In some embodiments, as shown, these memories 1205 and 1210 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric).

The weight values are part of the network parameters and thus are determined at compile time (and do not change at runtime), while the activation values (the input values to a particular node being computed) are the output values from a previous computation (or, for the first layer, are otherwise based on the network input) and thus are determined at runtime. Thus, the weight memory 1205 is typically larger than the activation memory 1210 (e.g., 512 KB to 64 KB), as the activation memory is overwritten for each new computation while the weight memory 1205 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/−1).

The weight controller 1215 reads data from the weight memory 1205 into sets of filter slice buffers 1220 and 1222 that store the weight values to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load 36 weight values into each filter slice buffer, which are actually used to compute 144 dot product components (with the requirement that at least 75% of the weight values be zero, the actual adder tree only receives 36 inputs for 144 activation values, as described in detail below).

Some embodiments include both primary filter slice buffers 1220 and secondary filter slice buffers 1222, as shown in this figure. In a given clock cycle, at most one of these sets of filter slice buffers is used to compute dot products (e.g., using multiplexers to select only one of the sets of weight values). For simpler dot product computations, only the primary filter slice buffer 1220 is needed, so there is no need to load weight values into the secondary filter slice buffers 1222. However, in other cases, both sets of filter slice buffers may be used, as described below.

The activation controller 1225 reads data (input values) from the activation memory 1210 into the activation window buffers 1230 and 1232. In addition, the activation controller 1225 arranges the input values within the activation window buffer 1230 in some embodiments to match up with the weight values in the filters. In some embodiments, the input values in an activation window read into the buffer 1230 include all of the values (as opposed to only 25% of the values), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffers 1230 and a secondary activation window buffer 1232. In a given clock cycle, at most one of these sets of activation window buffers is used to compute dot products (e.g., using multiplexers to select only one of the sets of weight values). For simpler dot product computations, only the primary activation window buffer 1230 is needed, so there is no need to load activation inputs into the secondary activation window buffer 1232. However, in other cases, both activation window buffers may be used, as described below.

The adder trees 1235 compute the dot products between the weight values in the filter slice buffers 1220 and the input values in the activation window buffer 1230. The details of these partial dot product computation circuits of some embodiments are described below by reference to FIG. 13. These adder trees 1235 output partial dot products (e.g., 10-bit values) that are provided to the dot product bus, which combines the partial dot products with other partial dot products as described above. In some embodiments, the number of filter slice buffers in each of the sets 1220 and 1222 is equal to the number of adder trees 1235, dot product bus lanes, and post-processing units in each segment. Thus, for a typical neural network computation node, the partial dot products computed by the adder trees 1235 in multiple cores having a particular index are aggregated by the dot product bus lane with the same index and that aggregated dot product is provided for post-processing to one of the post-processing units with the same index (i.e., the post-processing unit with that index in one of the channel segments).

The core controller 1240 configures and coordinates the operation of the memory controllers 1215 and 1225 in addition to the filter slice buffers 1220, activation window buffer 1230, and adder trees 1235. Furthermore, the core controller 1240 receives the input activations and weights from the memory controllers 1215 and 1225, and loads them into the correct slots in the sets of filter slice buffers 1220 and 1222 and the activation window buffers 1230 and 1232 (or directs them to the ALU bus for non-dot product computations). Lastly, when the adder trees 1235 output their partial dot product values, the core controller 1240 sends these values to the dot product bus in the global channel 1245. When the activations are output, the activation write bus carries these values to the core controller 1240, which provides them to the activation control 1225 to be written to activation memory 1210.

To reduce the circuit area and power required for dot product computations (which use the majority of resources for neural network inference), the partial dot product computation circuits (e.g., the adder trees 1235) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 13:
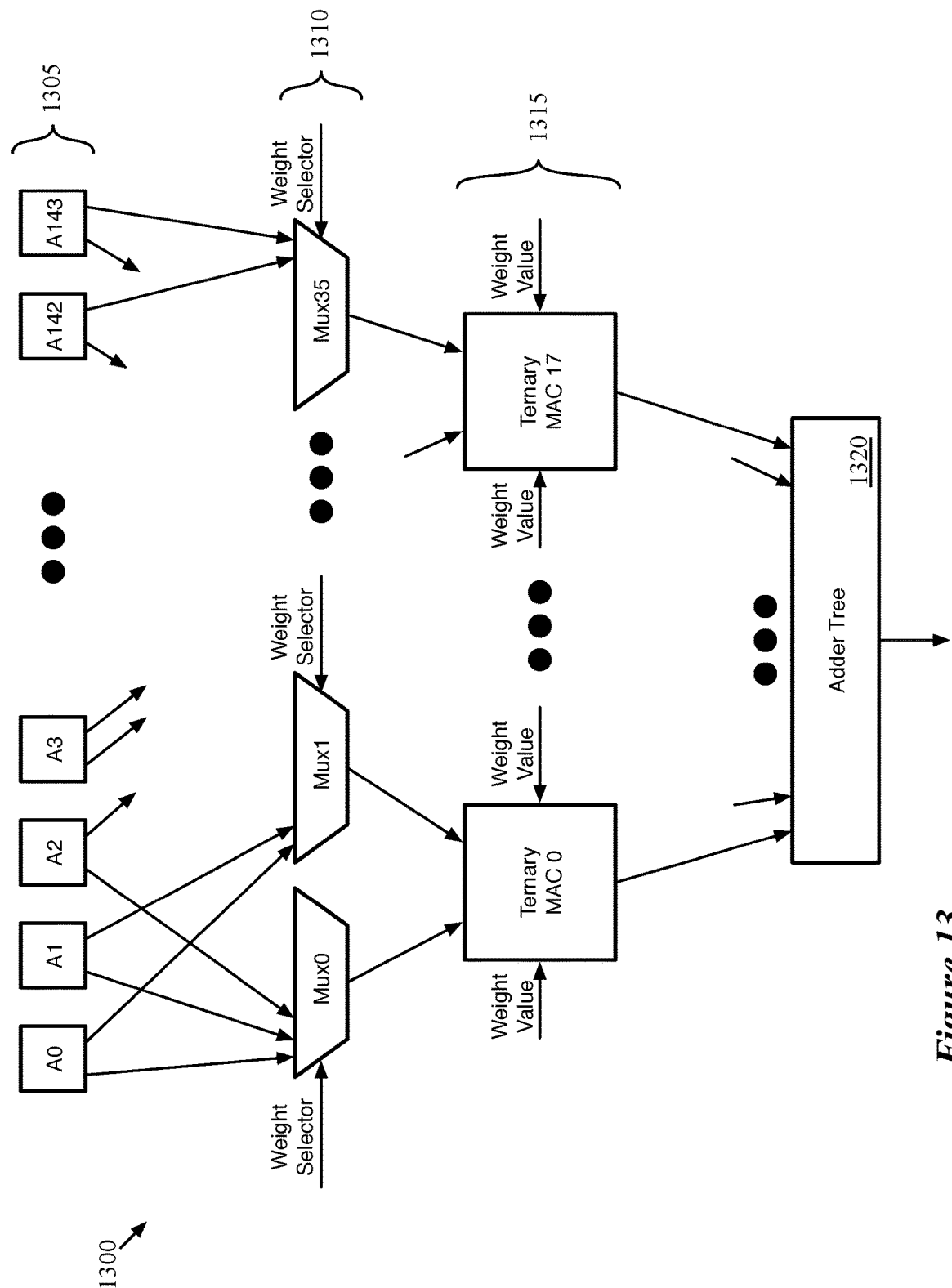
FIG. 13 conceptually illustrates an example of a partial dot product computation circuit for a guaranteed weight sparsity of at least 75%.

FIG. 13 conceptually illustrates an example of such a partial dot product computation circuit 1300 for a guaranteed weight sparsity of at least 75%. The wiring of the input values for this dot product computation circuit ensures that, so long as the weights meet the sparsity requirement, at runtime each input value with a nonzero corresponding weight value is provided to a different dot product input for nearly any arrangement of the nonzero weight values. As shown, the dot product computation circuit 1300 includes a set of activation inputs 1305, a set of multiplexers 1310, a set of ternary multiplier-accumulator (MAC) circuits 1315, and an adder tree 1320.

In this example, the dot product computation circuit 1300 includes 144 input values 1305. In different embodiments, the activation slice buffer may have different sizes, which defines the size of the partial dot product computation. Each input value storage (e.g., each buffer location) is connected to two of the thirty-six multiplexers 1310. In this example, at least 75% sparsity is assumed for each set of weight values, and thus the 144 activation inputs can be reduced to 36 inputs to the actual dot product computation. This significantly reduces the circuit area required for the dot product computation, as the number of adders is reduced by 75% (the adder tree effectively starts with 36 values rather than 144 values).

The multiplexers 1310 each have eight inputs and receive a set of select bits (the weight selector input) from the core controller that specifies which of these eight inputs to pass to the dot product computation. Having thirty-six 8-input multiplexers 1310 allows for 288 sets of wires from the activation inputs 1305 to the multiplexers 1310, which is two wires for each activation input. If the sparsity guarantee was only 50%, then seventy-two 4-input multiplexers could be used with two sets of wires for each activation input 1305 (or seventy-two 8-input multiplexers with four sets of wires for each activation input 1305), with similar proportions for different sparsity guarantees and numbers of wires per activation input.

The wire sets from the activation inputs to the multiplexers are arranged such that each input value with a nonzero corresponding weight is provided to a different one of the multiplexers 1310. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1305 to the multiplexers 1310. In some embodiments, this algorithm computes two hashes (e.g., with two different hash functions) for each of the activation input locations 1305 that map to two different multiplexers 1310 (e.g., by computing the hash modulo 36). Each activation input location 1305 is wired to these two different multiplexers 1310 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1310 are determined by which of the inputs to the multiplexer carries an input activation value with a nonzero corresponding weight value, and are received from the core controller. These multiplexers 1310 provide their output to a set of ternary multiply-accumulator (MAC) circuits 1315. The ternary MAC circuits effectively form the leaves of the dot product computation, and the number of such circuits is half the number of multiplexers 1310 (18 ternary MAC circuits 1315 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 1315 add the two input values from the multiplexers 1310 while also receiving as inputs the corresponding weight values for these input values (or configuration bits generated based on the weight values). If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value). The negative values are accounted for in the bias computation within the post-processing unit, as described above.

The outputs of the ternary MACs provide the inputs to the adder tree 1320 that computes the output for the partial dot product computation. In some embodiments, this adder tree is a standard adder tree circuit that adds pairs of values over several layers. For example, the adder tree 1320 receives 18 inputs for 9 adders, which in turn provide outputs to 4 adders (with an additional output to be added in later), etc. In some embodiments, the inputs to the ternary MACs 1315 are 4-bit inputs (the length of the quantized activation values), and the ternary MACs 1315 output 6-bit values. The adder tree 1320 receives these 6-bit values and outputs a 10-bit value after several stages of addition.

While this diagram shows the wires (or some of the wires) connecting the input value 1305 to a single partial dot product computation circuit, in some embodiments each of these input values 1305 in the activation slice buffer is actually connected to each of the partial dot product computation circuits in the core. That is, for the case with 64 such circuits, each value in the activation slice register is carried by 128 total wires to 128 multiplexers (two for each of the partial dot product computation circuits). In some embodiments, the wiring arrangement is the same for each set of multiplexers (i.e., for each partial dot product computation circuit).

Figure 14:
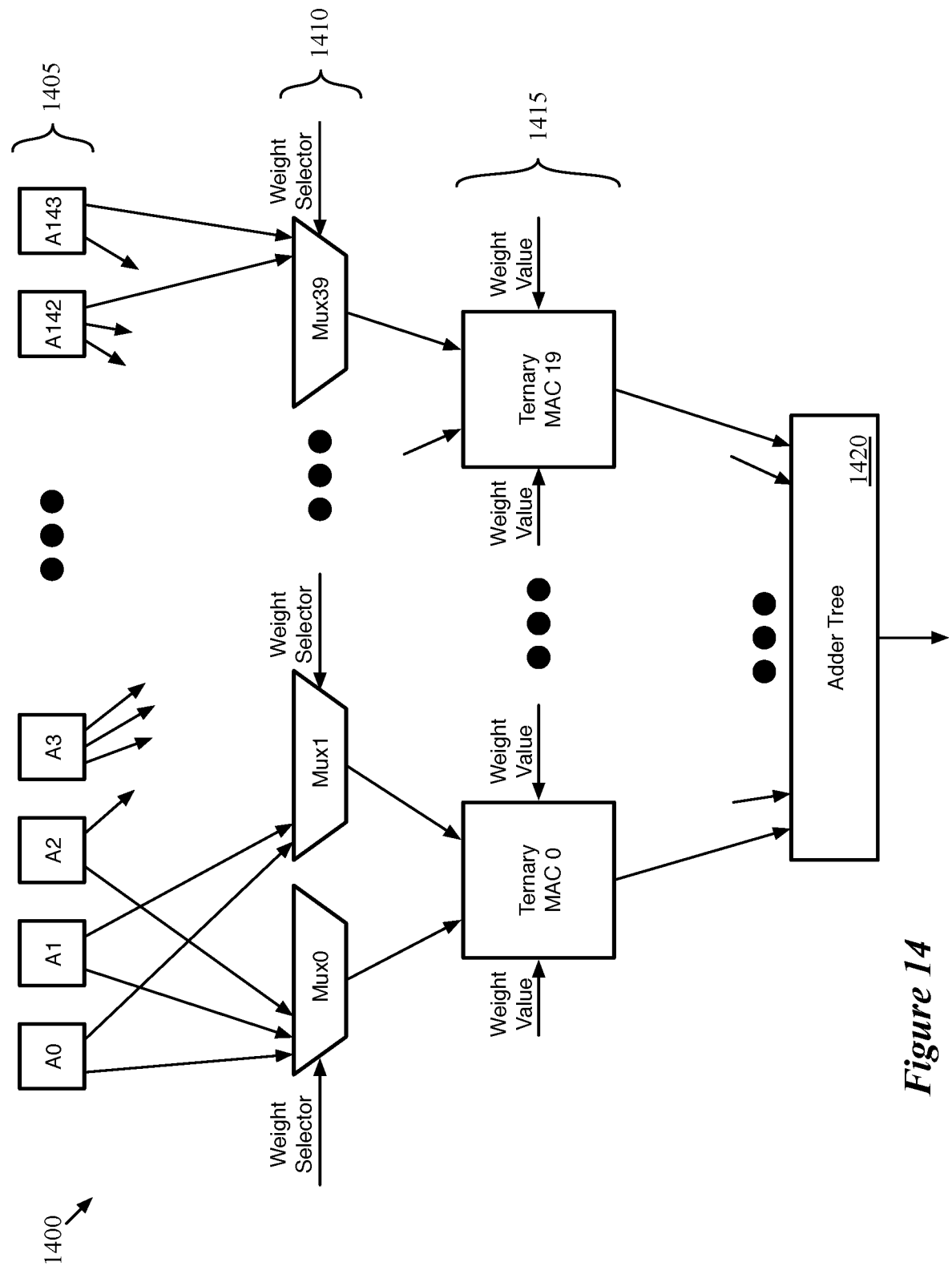
FIG. 14 illustrates a partial dot product computation circuit with redundant multiplexer inputs.

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. FIG. 14 illustrates a partial dot product computation circuit 1400 with redundant multiplexer inputs. The partial dot product computation circuit 1400 is structured in the same manner as the circuit 1300, and includes 144 activation inputs 1405, a set of forty multiplexers 1410, a set of twenty ternary MAC circuits 1415, and an adder tree 1420.

The difference between the circuit 1300 of FIG. 13 and the circuit 1400 is that the latter includes additional multiplexers 1410 (in this case, four) and thus additional ternary MACs 1415 (in this case, two). In addition, in some such embodiments, a subset of the input values are wired to three of the dot product inputs rather than two. In this example, the four additional multiplexers allow for thirty-two of the activation inputs to be wired to three of the multiplexers rather than just two. For instance, the fourth activation input value 1405 (A3) includes three wire sets connecting to three different multiplexers 1410, as does the $143^{rd}$ activation input value (A142). These additional wires provide the compiler with more options for mapping the input values with nonzero corresponding weights to the multiplexers, and thus make this mapping process easier at a small cost in terms of overall circuit area.

Figure 15:
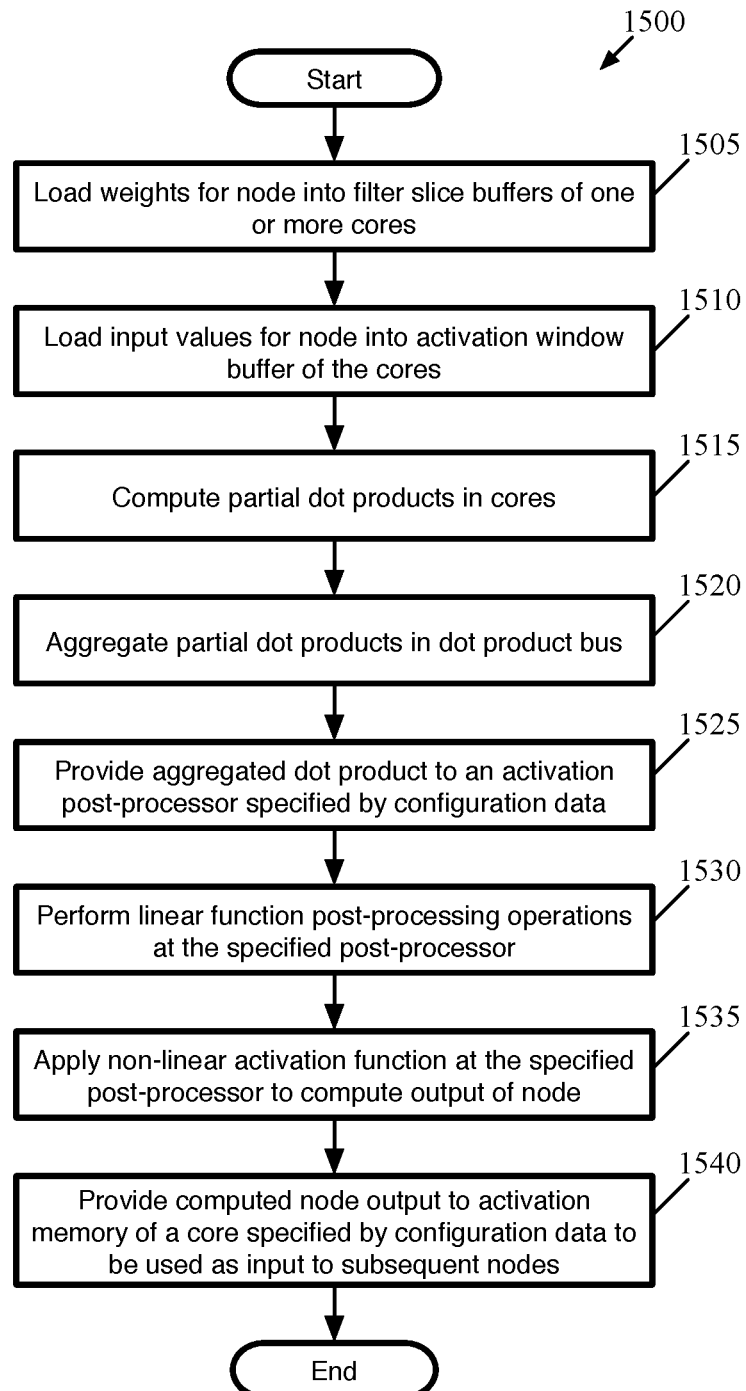
FIG. 15 conceptually illustrates a process of some embodiments for executing a set of instructions (or a portion of a set of instructions) to compute the output of a neural network node.

FIG. 15 conceptually illustrates a process 1500 of some embodiments for executing a set of instructions (or a portion of a set of instructions) to compute the output of a neural network node (specifically, a convolutional or fully-connected node). The process 1500 is executed by the chip fabric of a neural network IC, such as that described above. Typically, the process 1500 is executed simultaneously for multiple nodes, and will be performed repeatedly for multiple activation windows (i.e., multiple groups of input values loaded into the activation slice buffer) in order to completely execute a layer of the neural network. In the case of the process 1500, the dot product can be computed in a single cycle and does not involve any split filter slices. Additional processes are described below for nodes that involve large dot products, larger input values, or split filters.

As shown, the process begins (at 1505) by loading the weights for a node into filter slice buffers of one or more cores. In addition, the process loads (at 1510) the input (activation) values for the node into the activation window buffer of these cores. In some embodiments, a set of input values are loaded into one activation window buffer in a core while the weight values for several nodes are loaded into several filter slice buffers of the core. In addition, the weights and activations for a node, in some embodiments, are divided among the filter slice buffers of all of the cores that are active for the current set of instructions.

The process 1500 then computes (at 1515) partial dot products in the cores. As described above by reference to FIGS. 12-14, the activation values loaded into the activation slice buffers in each of the active cores are multiplied by their corresponding weight values loaded into the filter slice buffers of these cores. In some embodiments, the size of the partial dot products is reduced using the wiring structure shown in FIG. 13, and with ternary weight values of {0, 1, −1}, the multiplication is handled by the ternary MAC circuits shown in this figure.

Next, the process aggregates (at 1520) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1500 then provides (at 1525) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1500 performs (at 1530) linear function post-processing operations. For all dot products, this includes the bias and scale operations described by reference to FIG. 9 above, with the values for these operations sent as configuration data from the cluster controller. In addition, as described below, certain dot products are aggregated over multiple cycles by the dot product input processing circuit shown in FIG. 10 (e.g., if time-multiplexing is required to handle dot products with a large number of components, or for dot products with double the standard number of bits).

Next, the process 1500 applies (at 1535) the non-linear activation function at the post-processing unit to complete the calculation of the node output value. In some embodiments, as shown in FIG. 9, a lookup table is used for this computation (e.g., a 5-bit to 4-bit mapping table). The mapping for each possible set of input bits is provided by configuration data from the cluster controller in some embodiments.

In some embodiments, the operations 1515-1535 are executed to compute the node output without storing the any intermediate values in memory. That is, none of the partial dot products are stored in any memories (e.g., RAM) during the computation within the core, and the same is true before and during the aggregation within the dot product bus. As described below, in some embodiments the register 1030 is used to aggregate multiple dot product bus inputs. However, in a standard case (e.g., for 4-bit dot products), the register 1030 passes the dot product input through and the entire set of operations 1515-1535 is executed in a single clock cycle.

Finally, the process 1500 provides (at 1540) the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s).

As mentioned, the process 1500 illustrates the most simplistic case for computing the dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs×16 cores=2304 total input values), (iii) all of the weight values are either 0, +α, or −α (and thus can be stored as 0, 1, and −1), and a large enough percentage of the weight values are 0 that the input values with non-zero weight values can each map to a different multiplexer input.

However, some embodiments include solutions for cases when each of these restrictions is broken (at least in certain specific ways). As shown above in FIG. 10, the post-processing units of some embodiments include dot product input processing circuits 1000 for performing additional operations on the dot product inputs if needed. Specifically, some embodiments include a register 1030 that can be configured to store a dot product received by the post-processing unit on one clock cycle. The register outputs this stored value to the adder 1025 that receives both (i) the register output when enabled and (ii) the input from the dot product bus. The post-processing units also include a configurable bit shift circuit 1020 that operates on the dot product bus input prior to the adder in some embodiments.

In addition, as shown in FIG. 12, the cores include both primary and secondary input value buffers and sets of weight value buffers. Each primary input value buffer can hold the specified number of input values for the partial dot product computation circuits (e.g., 144), with the secondary input value buffer able to hold the same number. Similarly, each primary weight value buffer can hold the specified number of weight values (which is the number of inputs to which the input values are reduced) for the partial dot product computation circuits (e.g., 36), with the secondary weight value buffers able to hold the same number.

In the typical dot product computation described by reference to the process 1500 that meets the requirements listed above (i.e., sparsity, ternary weights, input values of a specified size, and less than the maximum number of dot product components), these secondary buffers are not used, and the left shift circuit 1020, adder 1025, and register 1030 effectively act as pass-throughs. However, this circuitry also enables more complex dot products to be computed if needed, thereby increasing the size and types of neural networks that can be executed by the neural network computation circuit.

Figure 16:
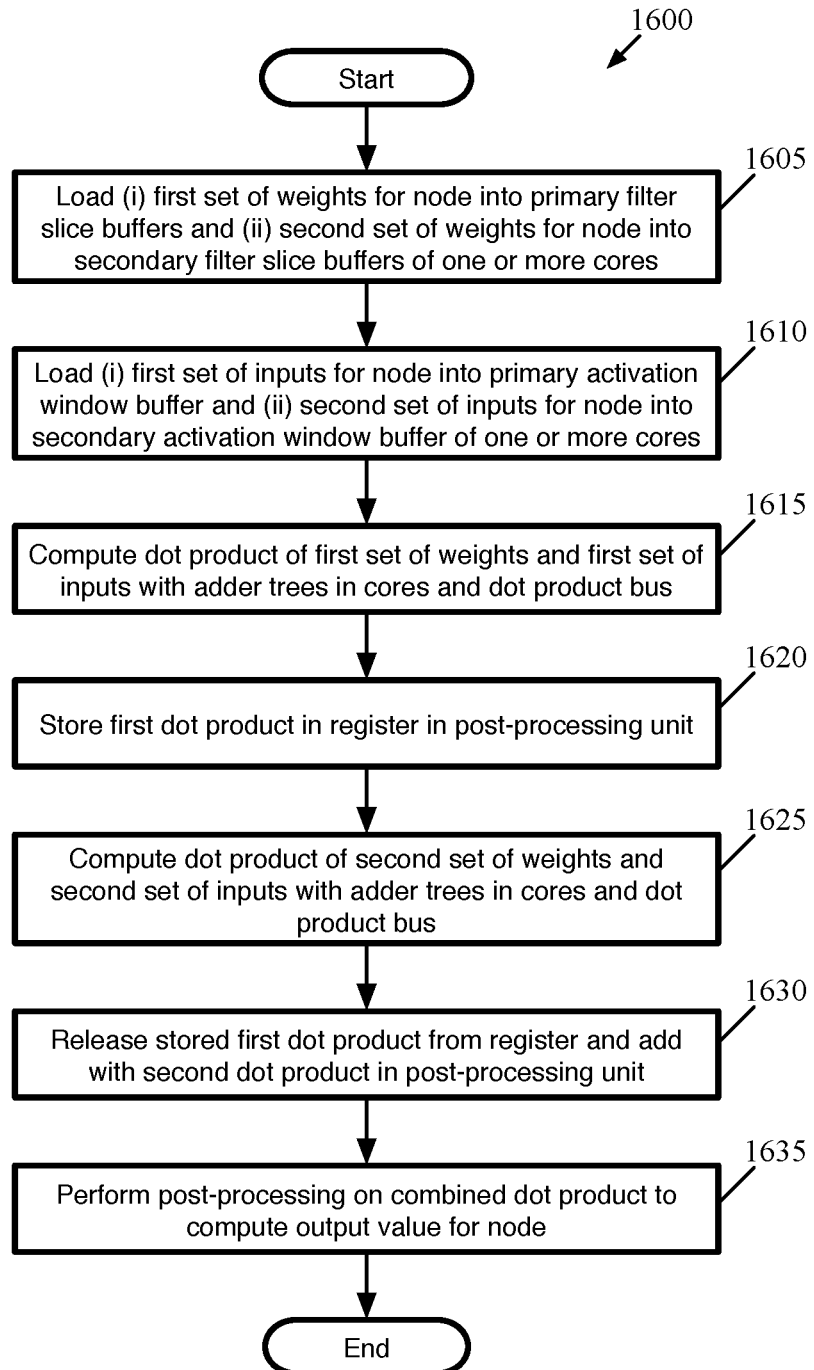
FIG. 16 conceptually illustrates a process of some embodiments for executing a neural network computation node with up to twice the number of dot product components that can be computed in a single cycle across all of the cores.

FIG. 16 conceptually illustrates a process 1600 of some embodiments for executing a neural network computation node with up to twice the number of dot product components that can be computed in a single cycle across all of the cores. Such a computation uses the secondary input value buffer as well as the secondary weight value buffers, and uses two (or more) clock cycles of the neural network computation circuit. The process 1600 is executed by the chip fabric of a neural network IC, such as that described above. Typically, the process 1600 is executed simultaneously for multiple nodes, and will be performed repeatedly for multiple activation windows (i.e., multiple groups of input values loaded into the activation slice buffer) in order to completely execute a layer of the neural network.

This process 1600 will be described in part by reference to FIG. 17, which illustrates the operation of various circuits to compute such large dot products over two or more clock cycles of the chip fabric. Specifically, this figure illustrates primary filter slice buffers 1705, secondary filter slice buffers 1710, primary activation window buffer 1715, secondary activation window buffer 1720, adder trees 1725, and post-processing units 1730. Each activation window buffer represents that (primary or secondary) buffer across all of the cores active for the dot product computation, and similarly each of the filter slice buffers and adder trees of a particular index represents that (primary or secondary) buffer and adder tree at the particular index across all of the active cores. Along these lines, each PPU for a particular index represents the selected PPU for that index that performs the post-processing for a given node (and thus could include PPUs in different channel segments).

As shown, the process 1600 begins by loading (at 1605) (i) a first set of weight values for the node into the primary filter slice buffers and (ii) a second set of weight values for the node into the secondary filter slice buffers of one or more cores. In addition, the process loads (at 1610) (i) a first set of input values for the node into the primary activation window buffers and (ii) a second set of input values for the node into the secondary activation window buffers of the cores. In some embodiments, the sets of input values are loaded into the activation window buffers in the core while the weight values for the various filters are loaded into multiple filter slice buffers (unless there is only a single filter).

In a typical convolutional neural network, all of the nodes in a layer will have the same dimensions, and therefore the same number of weights. As such, if one of the dot products has too many components to be computed in a single cycle, then all of the dot products computed simultaneously will also require to the use of multiple cycles, so the secondary filter slice buffers will be loaded for all of the indices in use. If the number of dot product components (i.e., number of input values and weight values) is larger than the maximum that can be computed in a single cycle but less than twice that amount, some embodiments do not necessarily use all of the cores. For instance, if the maximum number of components for a single clock cycle is 2304 (16 cores with 144 inputs in each activation window buffer) and a dot product has 2880 components, the compiler of some embodiments assigns the inputs and values to the primary and secondary buffers of ten cores rather than using the primary buffers of all sixteen cores and the secondary buffers of only four of the cores. Other embodiments use the latter option, however.

Next, the process 1600 computes (at 1615) the dot product of the first set of weight values (from the primary filter slice buffer) and the first set of input values (from the primary activation window buffer), and stores (at 1620) this dot product in the register of the post-processing unit. The first clock cycle (cycle 0) shown in FIG. 17 illustrates these computations. For each filter slice buffer in use (depending on the number of filters in the layer, all of the filter slice buffers and adder trees may not be required), the corresponding adder tree 1725 in each active core receives the first weight values from the primary filter slice buffer 1705 and the input values from the primary activation window buffer 1715 in the core (as well as configuration data specifying which input values to select), and computes the partial dot product. In some embodiments, sets of multiplexers are used to select whether the input values from the primary or secondary activation buffer and weight values from the primary or secondary set of filter slice buffers are provided to the adder trees. For the input values, these multiplexers select each primary or secondary input value prior to providing each of those input values to the two different input multiplexers as shown in FIG. 13.

The corresponding dot product bus lane for each adder tree (not shown for simplicity) aggregates these partial dot products, and provides this data to one of the corresponding post-processing units 1730 (with the specific channel segment for each post-processing unit identified by configuration data directing the flow of aggregation and enabling the correct post-processing unit). In this first cycle, the bit shifter 1735 and adder 1740 are passed through without modifying the dot product, and the register 1745 is configured to store the first dot product. In some embodiments, these components correspond to the left shift circuit 1020, adder 1025, and register 1030 of FIG. 10.

In a subsequent clock cycle, the process 1600 computes (at 1625) the dot product of the second set of weight values (from the secondary filter slice buffer) and the second set of input values (from the secondary activation window buffer). The process also releases (at 1630) the stored first dot product from the register and adds this with the second dot product in the post-processing circuit. In different embodiments, this second clock cycle may be the next clock cycle after the cycle in which the first dot product is computed, or may be multiple cycles later. For instance, some embodiments initially load the primary buffers and then continue to load the secondary buffers while the first dot product is computed, in which case several cycles may pass before the secondary buffers are ready for the second dot product computation.

The second clock cycle (cycle 0+X) shown in FIG. 17 illustrates the second set of computations. For each filter slice buffer in use (depending on the number of filters in the layer, all of the filter slice buffers and adder trees may not be required), the corresponding adder tree 1725 in each active core receives the second set of weight values from the secondary filter slice buffer 1710 and the input values from the secondary activation window buffer 1720 in the core (as well as configuration data specifying which input values to select for each input), and computes the partial dot product.

The corresponding dot product bus lane for each adder tree aggregates these partial dot products in the second clock cycle, and provides this data to one of the corresponding post-processing units 1730 (for each index, the post-processing unit in the same channel segment is selected as in the first clock cycle). In this second clock cycle, the stored first dot products are released from the registers 1745 and passed to the adder 1740, which combines the dot products from the first and second clock cycles. This value can then be output to the remainder of the post-processing unit (not shown).

With the complete dot product calculated, the process performs (at 1635) post-processing on the combined dot product in order to compute the output value for the node. As described above, this post-processing may include addition of a bias factor, multiplication by a scaler, any required truncation/quantization, and application of the non-linear function.

Figure 18:
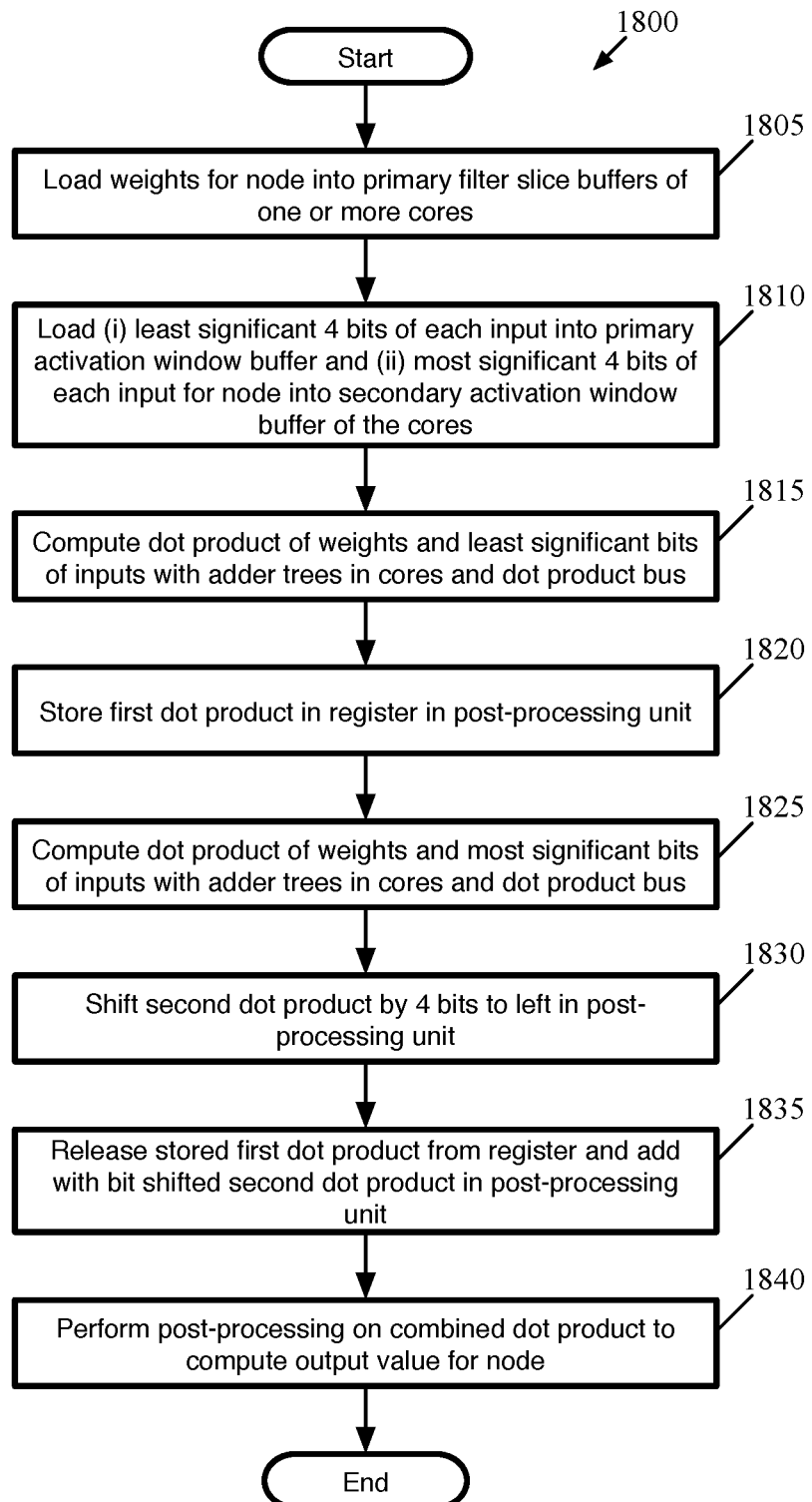
FIG. 18 conceptually illustrates a process of some embodiments for executing a neural network computation node that uses input values (and output values) up to twice the size for which the circuitry is designed.

FIG. 18 conceptually illustrates a process 1800 of some embodiments for executing a neural network computation node that uses input values (and output values) up to twice the size for which the circuitry is designed. That is, if the dot product computation circuits (e.g., the adder trees, dot product bus, etc.) are designed for 4-bit input values, then the process 1800 allows for up to 8-bit input values to be used. Such a computation uses the secondary input value buffer but only the primary weight value buffers, and like the computation for dot products with a large number of components, uses two (or more) clock cycles of the neural network computation circuit. The process 1800 is executed by the chip fabric of a neural network IC, such as that described above. Typically, the process 1800 is executed simultaneously for multiple nodes, and will be performed repeatedly for multiple activation windows (i.e., multiple groups of input values loaded into the activation slice buffer) in order to completely execute a layer of the neural network. Often, if larger input (and output) values are used, the input values for all layers of the will be of the larger size. This process 1800 will be described in part by reference to FIG. 19, which illustrates the operation of the circuits from FIG. 17 to compute such dot products with large input values over two or more clock cycles of the chip fabric.

As shown, the process 1800 begins by loading (at 1805) weight values for the node into the primary filter slice buffers of one or more cores. In addition, the process loads (at 1810) (i) the least significant 4 bits of each input value for the node into the primary activation window buffers and (ii) the most significant 4 bits of each input value for the node into the secondary filter slice buffers of the core. As an example, for the input value 11010001, the least significant nibble (0001) would be loaded into the primary activation window buffer while the most significant nibble (1101) would be loaded into the secondary activation window buffer. In some embodiments, the input values are loaded into the activation window buffers in the core while the weight values for the various filters are loaded into multiple filter slice buffers (unless there is only a single filter). Whereas dot products with a large number of input values will necessitate the use of a large number of cores (i.e., more than half of the cores), neural networks that use large input values may have all different sizes of dot products, and thus any number of cores could be used for a given calculation depending on the size of the dot product.

It should be understood that, while the process 1800 uses 4-bit and 8-bit values, other sizes of input/output values are possible. For instance, the hardware could be designed for 5-bit values (such that up to 10-bit values are possible using this technique), 8-bit values (allowing for up to 16-bit values with this technique), etc. In addition, intermediate-sized values are possible. In the 4-bit and 8-bit example, the circuit would also be configured to 5-bit, 6-bit, or 7-bit input values in the same way. For a 5-bit value, for example, the least significant 4 bits would be loaded into the primary buffer while the remaining bit would be loaded into the secondary buffer with three bits of 0-padding to reach 8 bits.

Next, the process 1800 computes (at 1815) the dot product of the weight values (from the primary filter slice buffer) and the least significant bits of the input values (from the primary activation window buffer), and stores (at 1820) this first dot product in the register of the post-processing unit. The first clock cycle (cycle 0) shown in FIG. 19 illustrates these computations. For each filter slice buffer in use (depending on the number of filters in the layer, all of the filter slice buffers and adder trees may not be required), the corresponding adder tree 1725 in each active core receives the weight values from the primary filter slice buffer 1705 and the least significant nibble of the input values from the primary activation window buffer 1715 in the core (as well as configuration data specifying which input values to select), and computes the partial dot product.

The corresponding dot product bus lane for each adder tree aggregates these partial dot products for the least significant bits of the input values, and provides this data to one of the corresponding post-processing units 1730 (with the specific channel segment for each post-processing unit identified by configuration data directing the flow of aggregation and enabling the correct post-processing unit). In this first cycle, the bit shifter 1735 and adder 1740 are passed through without modifying the dot product, and the register 1745 is configured to store the first dot product.

In a subsequent clock cycle, the process 1800 computes (at 1825) the dot product of the weight values (again from the primary filter slice buffer) and the most significant bits of the input values (from the secondary activation window buffer). In the post-processing circuit for the node, the process 1800 also shifts (at 1830) the result of this second dot product left by 4 bits (i.e., so that the 4 least significant bits of the new dot product become 0). This results in the dot product second being the same value as if all of the inputs to the second dot product computation were 8-bit values with the 4 least significant bits being 0. In addition, the process 1800 releases (at 1835) the stored first dot product from the register and adds this with the second bit shifted dot product in the post-processing circuit. In different embodiments, this second clock cycle may be the next clock cycle after the cycle in which the first dot product is computed, or may be multiple cycles later. For instance, some embodiments initially load the primary activation window buffer and then continues to load the secondary activation window buffer while the first dot product is computed, in which case several cycles may pass before the secondary buffers are ready for the second dot product computation.

The second clock cycle (cycle 0+X) shown in FIG. 19 illustrates this second set of computations. For each filter slice buffer in use, the corresponding adder tree 1725 in each active core receives weight values from the primary filter slice buffer 1705 and the most significant nibble of the input values from the secondary activation window buffer 1720 in the core (as well as configuration data specifying which input values to select for each input), and computes the partial dot product.

The corresponding dot product bus lane for each adder tree 1725 aggregates these partial dot products in the second clock cycle, and provides this data to one of the corresponding post-processing units 1730 (for each index, the post-processing unit in the same channel segment is selected as in the first clock cycle). The bit shifters 1735 in the post-processing units are configured to shift this incoming second dot product left by 4 bits in this second clock cycle. In addition, the stored first dot products are released from the registers 1745 and passed to the adder 1740, which combines the dot products from the first and second clock cycles. This value can then be output to the remainder of the post-processing unit (not shown).

This example describes the least significant nibble being loaded into the primary activation window buffer and the most significant nibble being loaded into the secondary activation window buffer. However, it should be understood that other embodiments load the least significant nibble into the secondary activation window buffer and the least significant nibble into the primary activation window buffer. In the latter case, the initial dot product would be bit shifted 4 bits to the left rather than this bit shift being applied to the latter dot product, and the bit shifted dot product stored in the register.

With the complete dot product calculated, the process performs (at 1840) post-processing on the combined dot product in order to compute the output value for the node. As described above, this post-processing may include addition of a bias factor, multiplication by a scaler, any required truncation/quantization, and application of the non-linear function. In some embodiments, the bias factor includes an addition of +17 for each negative weight value in the filter (as compared to +1 for each negative weight for standard activation size dot products).

In addition to these techniques for computing large dot products or dot products with large input values, some embodiments have solutions if a particular filter slice (i.e., the weights assigned to a particular weight value buffer in a particular core) has too many non-zero values (i.e., the network is not locally sparse enough for the hardware). That is, if the number of non-zero weight values is greater than the number of multiplexer inputs to the dot product computation, then the filter slice is not sparse enough. In addition, the wiring of each input value in the activation window buffer to two multiplexers will not accommodate certain configurations of non-zero weight values (which is why the neural network computation circuit of some embodiments includes a number of multiplexers that is slightly more than one-fourth the number of input values in the buffer, with some of the input values wired to three multiplexers, as shown in FIG. 14).

The input values (and their corresponding weight values), in some embodiments, cannot be easily moved around to different cores because (i) the input values are used for numerous simultaneous dot products and (ii) the input values are efficiently carried in contiguous blocks to the cores by the output bus, with the ordering of these input values dependent on the post-processing unit indices that computed them as output values in the previous layer.

As such, the compiler of some embodiments is responsible for dividing the filter slice into two slices while maintaining efficient computation by the neural network computation circuit. As noted, the compiler of some embodiments is a software application that is responsible for receiving a trained neural network and converting that network into instructions for loading the weight values onto the neural network computation circuit and instructions for the circuit to execute. The compiler assigns each layer to a particular number of cores, assigns the different filter slices to different weight value buffer/partial dot product computation circuit/dot product bus lane/post-processing unit indices, specifies which segment will perform post-processing on each output value, etc. Because the computations of a previously-trained network are not dynamic (that is, the computations performed are not dependent on the results of previous computations), the entire execution of a network can be statically scheduled by the compiler. Networks that do not have local sparsity issues are also scheduled by the compiler, and the local sparsity issues that result in filter splitting lead to additional complexity in the compiler.

When a filter slice is not sparse enough for each input value with a nonzero weight value to be mapped to a different multiplexer input, different embodiments use different techniques to divide (split) the filter. Some embodiments move a subset of the weight values to the secondary weight value buffer in the core and compute the dot product over multiple clock cycles. FIG. 20 illustrates the operation of the circuits from FIG. 17 to compute a dot product with a split filter over multiple clock cycles.

In this example, a first subset of the weight values of the split filter are loaded into the primary filter slice buffer 1705 while the remainder of the weight values are loaded into the secondary filter slice buffer 1710. In this case, the weight values in the primary filter slice buffer 1705 that correspond to the weight values moved to the second subset are zero, and similarly the weight values in the secondary filter slice buffer 1710 that correspond to the weight values remaining in the first subset are zero. As mentioned, some embodiments move half of the weight values to the secondary filter slice buffer (e.g., the odd values or even values). Other embodiments move a subset of weight values so as to ensure that the each subset of weight values is adequately sparse so that each input value with a nonzero weight value can be mapped to a different multiplexer input. In either case, all of the input values are loaded into the primary activation window buffer 1715.

In the first clock cycle (cycle 0) shown in this figure, the adder trees 1725 compute dot products of the first subset of weight values from the primary filter slice buffer 1705 and the input values from the primary activation window buffer 1715. In some embodiments, only the dot products for filters that require splitting are computed over two cycles, whereas other dot products that use the same set of input values are computed in a single cycle. However, in order to align all of the output values on the activation write bus, some embodiments either hold all of the dot products in the registers 1745 until those with split filters are complete or split all of the filters for which dot products are computed simultaneously (e.g., all of the filters for the layer or portion of a layer). In some embodiments, when a particular filter is not split, but two cycles are used, weight values of zero are loaded into all of the unused filter slice buffers so that the computed partial dot products will be zero and not affect any dot product totals.

The corresponding dot product bus lane for each adder tree 1725 aggregates these partial dot products (if more than one core is used for the computation) of the input values and the first subset of weight values, and provides this data to one of the corresponding post-processing units 1730 (with the specific channel segment for each post-processing unit identified by configuration data directing the flow of aggregation and enabling the correct post-processing unit). In this first cycle, the bit shifter 1735 and adder 1740 are passed through without modifying the dot product, and the register 1745 is configured to store the first dot product.

In a subsequent clock cycle (cycle 0+X), the adder trees 1725 in use (or at least the adder trees for the split filters, if not all of the filters are split) receive the second subset of weight values from the corresponding secondary filter slice buffers 1710 as well as the input values from the primary activation window buffer 1715 and compute the partial dot product of these values. The corresponding dot product bus lane for each adder tree 1725 aggregates these partial dot products (if more than one core is used) and provides this data to one of the corresponding post-processing units 1730 (for each index, the post-processing unit in the same channel segment is selected as in the first clock cycle). In this second clock cycle, the stored first dot products are released from the registers 1745 and passed to the adder 1740, which combines the dot products from the first and second clock cycles. This value can then be output to the remainder of the post-processing unit (not shown).

However, some embodiments also provide for the ability to split filters without incurring this latency cost. In addition, dot products with a large number of components or with large input values already use the secondary buffers and second clock cycle, and thus require a different solution for such filters. As shown above by reference to FIG. 10, each post-processing unit actually receives two dot product inputs, which for the majority of the post-processing units are outputs of two different dot product bus lanes. One of these is the output of the dot product bus lane with the same index as the post-processing unit, and one of these is the output of a different lane. In some embodiments, the first half of the dot product bus lanes are only wired to a single post-processing unit in each channel segment (those with the same index), with the secondary inputs all coming from the second half of the lanes. This allows for optimal packing of output values from the post-processing units when filter splits are required.

Figure 21:
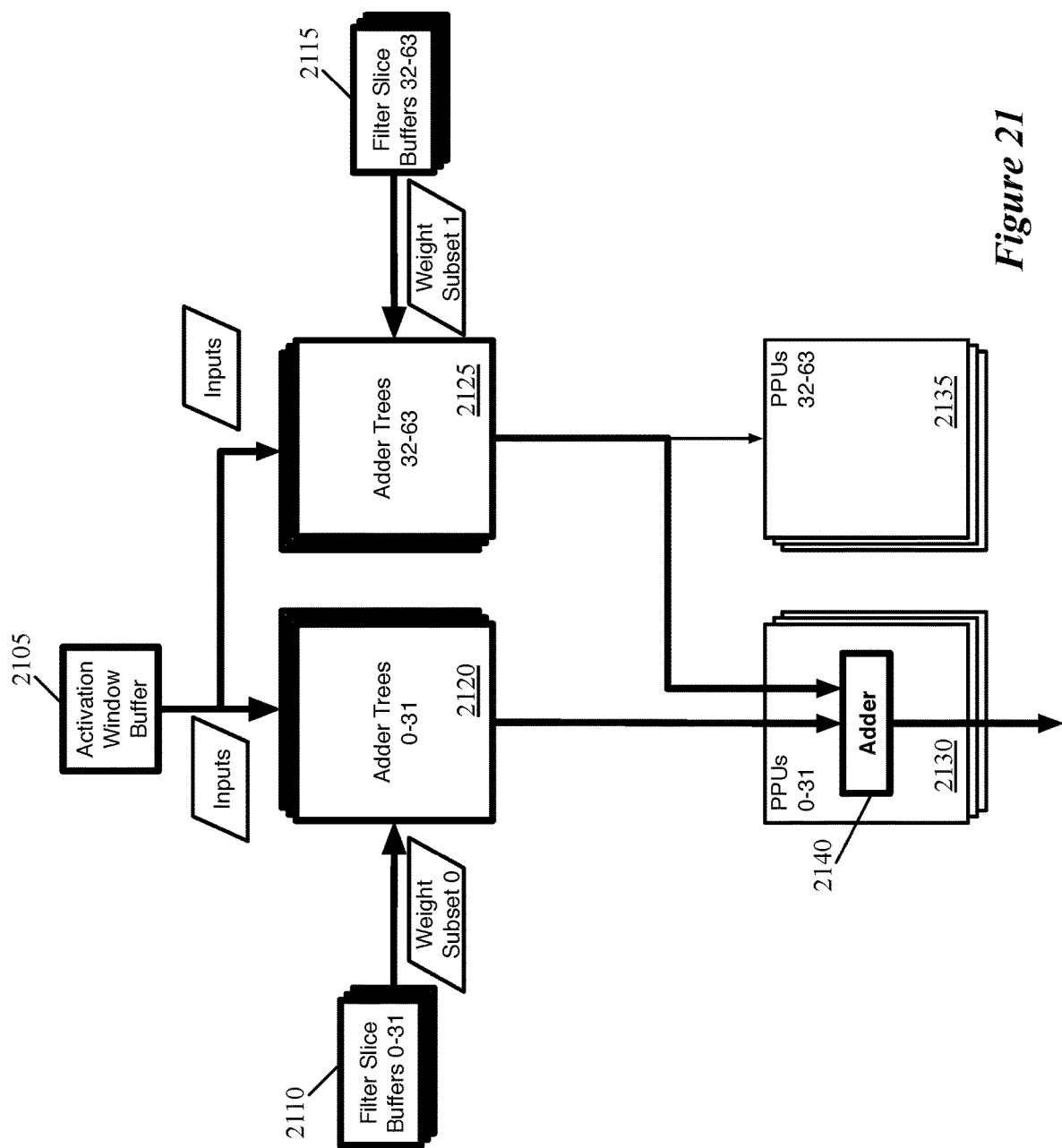
FIG. 21 conceptually illustrates an example of dot product computations using this filter splitting without latency according to some embodiments.

FIG. 21 conceptually illustrates an example of dot product computations using this filter splitting without latency according to some embodiments. Rather than using the secondary input value buffers, for a filter slice that needs to be split, a subset of the weight values are assigned to a different input value buffer (i.e., an input value buffer with a different index), with the removed weight values again replaced by zeros. This different input value buffer is selected such that the same post-processing unit receives both of the dot product bus computations from (i.e., as its primary and secondary inputs).

As shown, FIG. 21 illustrates the primary activation window buffer 2105, the first half (indices 0-31) of the primary filter slice buffers 2110, the second half (indices 32-63) of the primary filter slice buffers 2115, the first and second halves of the adder trees 2120 and 2125, and the first and second halves of the post-processing units 2130 and 2135. The second set of adder trees 2125 (via their respective dot product bus lanes, which are not shown) provide their output to both their post-processing units 2135 with the same indices as well as to the first half of the post-processing units 2130 (which also receive inputs from their corresponding adder trees 2120 via the respective dot product bus lanes). As in the above figures, the activation window buffer 2105 and each filter slice buffer and corresponding adder tree (e.g., filter slice buffer and adder tree with index 0) are representative of these circuits across all of the active cores for a computation. Similarly, the post-processing unit with a given index is representative of that post-processing unit across all of the channel segments.

As in a typical dot product computation, the activation window buffer 2105 provides the input values to all of the adder trees 2120 and 2125. For a split filter, the lower-indexed adder tree (one of the set of adder trees 2120) receives the first subset of the weight values while the higher-indexed adder tree (one of the set of adder trees 2125) receives the second subset of the weight values, with the removed weight values set to zero. In some embodiments, filters that do not have local sparsity problems do not need to be split, in which case the filter can be assigned (if needed) to one of the adder trees 2125 that is not being used for a split filter. Thus, with this scheme, 63 dot products could be computed simultaneously if only a single filter required splitting.

As shown, the post-processing unit 2130 for the split filter adds these two dot products together using adder 2140 (which corresponds to the adder 1015 in FIG. 10, with bot dot product inputs enabled) before performing the other post-processing operations (bias, scaler, etc.). In addition, if a filter split is required for a large dot product or a dot product with large input values, the post-processing unit performs this aggregation before performing the bit shifting and/or storing the initial dot product in the register.

FIG. 22 illustrates a table 2200 showing the mapping of dot product bus outputs to the different post-processing units for a neural network computation circuit of some embodiments with 64 filter slices/adder trees/dot product bus lanes/post-processing units. In this table 2200, the first column is a post-processing unit index, the second column is the primary dot product bus lane input by index and the third column is the secondary dot product bus lane input by index. As shown, the primary input for each post-processing unit is the dot product bus lane with the same index (e.g., post-processing unit 27 receives the output of dot product bus lane 27 as its primary input and, when filter splitting is not required, performs post-processing on this input).

Only the second half of the adder tree/dot product bus indices are used as secondary inputs in this example. For the first half of the post-processing units (indices 0-31), the higher-indexed dot product bus lanes are the secondary inputs, in order (i.e., the index of the secondary input is the primary input index plus 32). For the next sixteen post-processing units (indices 32-47), the secondary input indices are 48-63. Then for the next eight post-processing units (indices 48-55), the secondary input indices are 56-63. For the next four post-processing units (indices 56-59), the secondary input indices are 60-63, and for the next two post-processing units after that (indices 60-61), the secondary input indices are 62-63. Lastly, the secondary input for post-processing unit 62 is index 63, and the secondary input for post-processing unit 63 is always the value 0 (i.e., there is no secondary input). As such, the dot product from adder tree/dot product bus lane 63 is the secondary input for six different post-processing units. This provides various options for selecting to which filter slice buffer to assign a filter that needs to be split.

In the most simplistic case of this type of filter splitting, 32 or fewer filters are used at one time, in which case any filter that needs to be split will be associated with one of indices 0-31 and thus can be extended into the second set of filters (indices 32-63). When a neural network layer includes a larger number of filters, however, additional rearranging by the compiler may be required. When a first post-processing unit uses its secondary dot product input, that means that a second post-processing unit with the same index as the dot product bus lane that provides that secondary input to the first post-processing unit cannot use its primary input. Simply skipping this post-processing unit is not a preferred option, however, because active post-processing units should optimally be packed next to each other rather than spread out, so that output values on the activation write bus will then be packed together and can be written to the core memory as a contiguous block of output values. Instead, this second post-processing unit can use its secondary input, which of course means that a third post-processing unit will have its primary input borrowed. This borrowing of primary inputs and use of secondary inputs can be rippled until the last post-processing unit is reached.

For an example of this borrowing, one can assume that filters 0-34 are all adequately sparse, but filter 35 needs to be split. This means that post-processing unit 35 will use its secondary input from filter 51 (filter here meaning filter/adder tree/dot product bus lane) in addition to its primary input from filter 35. Thus, if there are enough filters in the layer that post-processing unit 51 is needed, it will need to use its secondary input from filter 59. Filters 36-50 and 52-58 (if also needed) will receive and use their own primary inputs in this case. If necessary, post-processing unit 59 receives uses its secondary input from filter 63, which means that post-processing unit 63 will not have any input enabled. By mapping progressively smaller groups of filters ending at the last filter to the secondary inputs (e.g., 32-63, then 48-63, then 56-63, etc.), this scheme minimizes the number of post-processing units with their primary inputs used, while enabling the compiler to effectively pack the active post-processing units together.

Figure 23:
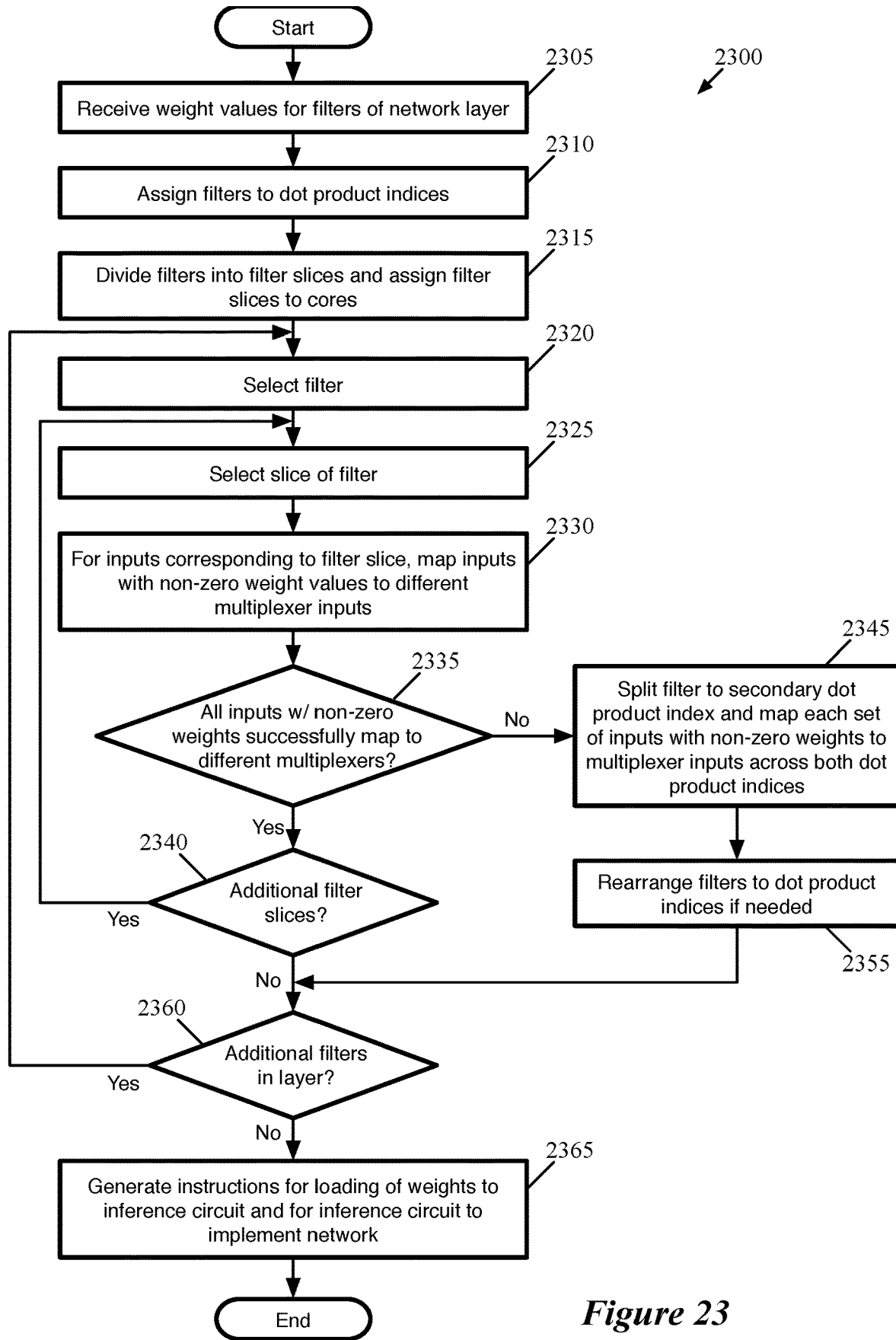
FIG. 23 conceptually illustrates a process of some embodiments for generating program instructions for a layer of a neural network while accounting for split filters.

FIG. 23 conceptually illustrates a process 2300 of some embodiments for generating program instructions for a layer of a neural network. The process 2300 is performed by a compiler of some embodiments in order to generate neural network program instructions that can be executed by the neural network computation fabric. As mentioned, the compiler receives a neural network definition (e.g., definitions for each layer, including layer type, filter dimensions, and parameter values, including weights). The process 2300 relates specifically to a process performed by the compiler to assign the filters of a convolutional layer to different filter slice buffers and generate instructions that define the configuration data for the post-processing units specifying which inputs to enable and disable. It should be understood that other operations will also be performed by the compiler in some embodiments (e.g., assigning the active cores for the particular layer, assigning the channel segment to perform post-processing for each post-processing unit, etc.).

As shown, the process 2300 begins by receiving (at 2305) weight values for the filters of a network layer. In some embodiments, the filter dimensions are defined by a kernel size (e.g., 3×3, 5×5, etc.) as well as the number of channels (which is based on the output values of the previous layer). Based on the training of the neural network, the compiler receives the weight values for each filter. In some embodiments, each of these weight values is in the set $\{0, \alpha, -\alpha\}$, with $\alpha$ varying for each layer. In some such embodiments, the compiler receives these weights normalized to $\{0, 1, -1\}$ along with $\alpha$ as a scaling value. As discussed, in some embodiments, ideally at least 75% of the weight values of each filter are 0; however, in some cases, even if the overall sparsity of the network is greater than 75%, a single filter may not meet this threshold.

Next, the process 2300 assigns (at 2310) each filter to a dot product index. Each dot product index corresponds to the filter slice buffers, adder trees, dot product bus lane, and post-processing units with that index. In some embodiments, the compiler initially assigns the filters to consecutive indices starting at index 0. That is, if the layer includes 25 filters, then these are assigned to filters 0-24; if the layer includes 52 filters, these are assigned to filters 0-51. In this way, if none of the filters require splitting, then the output values will all be aligned on the activation write bus. In some embodiments, the order in which filters are assigned to dot product indices may be random or in a specific order, so long as the order is accounted for in the subsequent layer (i.e., because specific weight values of the subsequent layer will need to be multiplied by specific corresponding input values that are aligned based on the order of the filters in the current layer).

The process 2300 then divides (at 2315) each filter into filter slices and assigns these filter slices to cores. The compiler will have identified the location for each output value of the previous layer, which determines to which cores each group of weight values is assigned. For a set of filters in a layer that all have equivalent dimensions (e.g., 3×3×36), each filter will be divided in the same manner, so that two weights having the same coordinates in their respective filters are assigned to the same core and will always be multiplied by the same input value. In some embodiments, the number of cores used for the filters is based on the number of weights in each filter. For instance, if the activation window buffer size for a given core is 144, then the 3×3×36 filter mentioned above would have 324 weight values and require three cores.

Next, the process 2300 selects (at 2320) a filter. Some embodiments start at the filter assigned to dot product index 0 and proceed from that point. In addition, the process 2300 selects (at 2325) a slice of the selected filter assigned to a particular core. For this selection, the order does not matter, so different embodiments select a filter slice randomly, or start from the lowest indexed core.

For inputs corresponding to the selected filter slice, the process 2300 maps (at 2330) the inputs with non-zero weight values to different multiplexer inputs. As previously noted, for the partial dot product computation circuits shown above, ideally at least 75% of the inputs have corresponding weight values equal to 0. In these examples, if the number of non-zero weight values in a filter slice is greater than 36 (or 40, if the redundant circuits shown in FIG. 14 are used), then it will not be possible to successfully perform this mapping. To perform the mapping, some embodiments use the same cuckoo hashing algorithm used to design the wiring of activation window buffer slots to multiplexers.

The process 2300 then determines (at 2335) whether all of the inputs with nonzero weights are successfully mapped to different multiplexers. As noted, if the number of nonzero weights in the filter slice is larger than the number of multiplexers, then compiler can identify that the condition is not met without performing the mapping algorithm (e.g., cuckoo hashing). However, in some cases, depending on the arrangement of the input values with nonzero weight values, even if there are fewer of such input values than available multiplexers a successful mapping is not possible. Using cores with redundant multiplexers (as shown in FIG. 14) significantly increases the likelihood of a successful mapping for sparsity very close to 75%, but if the amount is slightly larger then success is not be guaranteed.

If a successful mapping of the input values is available, then the filter slice does not necessitate splitting the filter, and the process 2300 determines (at 2340) whether additional filter slices remain for the currently selected filter. If additional filter slices remain, then the process returns to 2325 to select the next filter slice (i.e., the slice assigned to the next core of the neural network computation fabric) and test this filter slice. Otherwise, the process 2300 proceeds to 2360, which is described below.

On the other hand, if the input values with nonzero corresponding weight values cannot be successfully mapped to separate multiplexers, then the process 2300 splits (at 2345) the filter to a secondary dot product index and maps each set of inputs with non-zero weights to multiplexer inputs across both the original dot product index for the filter and the secondary dot product index. In some embodiments, the remaining weight values are filled in as zeros. The secondary dot product index, in some embodiments, is the index of the dot product bus lane that provides its output as the secondary input to the post-processing unit having the index to which the currently selected filter is assigned. For instance, referring to the table 2200 of FIG. 22, if the filter to be split is filter 17, then half of the filter is assigned to index 49.

To map the sets of inputs with non-zero weights to multiplexer inputs with the split filter, the compiler of some embodiments intelligently moves weights from the original dot product index to the secondary dot product index. In some embodiments, the compiler maps the input values to multiplexer inputs collectively across both of the dot product indices. That is, each input value is wired to four different possible multiplexer inputs (or six for certain inputs in the case of redundant circuits) rather being wired to two different multiplexer inputs. This provides significantly more possibilities for successfully mapping all of the input values with non-zero weights to different multiplexer inputs. The compiler then moves the corresponding weights to the secondary dot product index for the filter slice.

It should be noted that some embodiments split all of the filter slices of a particular filter once one of those filters needs to be split, as doing so does not impose a significant additional cost in terms of the usage of a dot product index (even for cores in which the filter does not require splitting, that index cannot be used for a different filter because the dot product bus lane is occupied). In this case, the mapping (or re-mapping) is performed for all of the filter slices of the current filter. However, other embodiments only split the filter slices for which doing so is required, in order to save weight memory usage (i.e., all of the extra zeros that are stored for the split filters).

Next, the process 2300 rearranges (at 2355) the filters to dot product indices if needed. If a second filter is currently assigned to the secondary dot product index for the selected filter, then that second filter is reassigned to a different dot product index. To preserve contiguous use of post-processing unit indices (and thus contiguous packing of output values on the activation write bus), some embodiments assign the second filter to the dot product index used as the secondary input to the post-processing unit index to which the second filter was previously assigned (before that dot product index was used for the split filter). In addition, if the use of that dot product index necessitates reassigning a third filter, then that third filter is also reassigned, and so on. Once a dot product index is borrowed that does not already have a filter assigned, the reassignment is complete. If too many filters need to be split, then some embodiments also reorder the filters (such that the outputs will be reordered). However, doing so may also necessitate reordering weight values in the subsequent layer of the neural network.

After reassigning the filters (or after verifying that all of the filter slices for the selected filter do not need to be split), the process 2300 determines (at 2360) whether additional filters remain in the layer. In some embodiments, as mentioned, all of the filter slices for a particular filter are split if any of the slices necessitate splitting. In other embodiments, if each filter slice is verified separately, then the process would proceed to operation 2340 from operation 2355, and only proceed to operation 2360 once all of the filter slices were verified. If additional filters remain, the process returns to 2320 to select the next filter.

Finally, once all of the filters have been verified and reassigned as needed, the process generates (at 2365) instructions (i) for loading weights to the neural network computation circuit and (ii) for the circuit to execute the network. These instructions, in some embodiments, specify the order of the weights and to which core they are assigned (so that they will be loaded into the correct filter slice buffers in the correct order). In addition, the instructions identify the active cores for the layer, the mapping of input values to multiplexers for each node, any use of secondary dot product inputs for post-processing units, etc.

While the examples shown for filter splitting are dot products with (i) less than the maximum number of components for computation in a single cycle and (ii) small enough input values for computation in a cycle (e.g., 4-bit input values in the examples shown above), it should be understood that some embodiments also apply filter splitting to dot products that do not meet these requirements. In these cases, at least the secondary activation window buffer is already in use (if not also the secondary filter slice buffers), so some such embodiments split the filter into a second dot product index and combine the dot products at the post-processing unit (as in FIG. 20 above). For such split filters, the adder 1015 will combine the primary and secondary inputs in both clock cycles, and the adder 1025 will add together these combined dot products from the first and second clock cycles (with the bit shifting operating as normal for large-input dot products).

As discussed in detail above, the neural network computation circuit of some embodiments is designed to execute neural networks with ternary weight values (that is, with weight values that for each layer can be scaled to 0, 1, and −1). Some embodiments use techniques similar to filter splitting to enable larger numbers of possible weight values while using this same hardware designed for ternary weights. To illustrate these techniques, the example of quinary weights (e.g., the weights in each layer scale to −2, −1, 0, 1, 2) will be used. However, it should be understood that the techniques described can also be extended in some embodiments to larger numbers of discrete weights per layer. Some embodiments use multiple different techniques to enable quinary weights, while other embodiments always use one or the other of the solutions described below.

Figure 24:
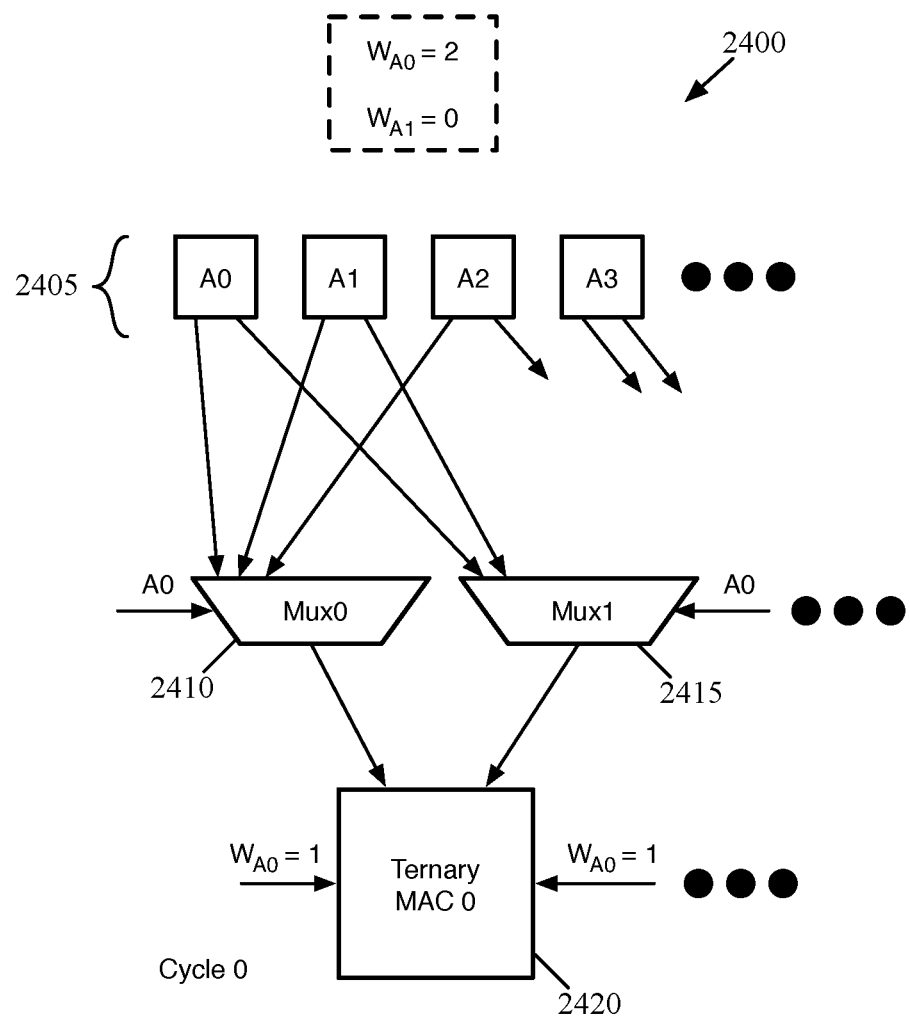
FIG. 24 conceptually illustrates an example of a solution that does not incur any extra latency cycles or use any extra dot product indices for a filter with quinary weights for a partial dot product computation circuit of some embodiments.

If a particular filter with quinary weights is sparse enough (i.e., has a large percentage of 0 values), then the dot product can be computed without incurring any extra latency cycles or using any extra dot product indices (as opposed to the filter splitting solutions shown above). FIG. 24 conceptually illustrates an example of this solution for a partial dot product computation circuit 2400, similar to those shown in FIGS. 13 and 14. This figure shows input values 2405 (including the wiring for values A0 and A1), two of the input multiplexers 2410 and 2415, and one of the ternary MAC circuits 2420. In addition, the figure indicates that the weight value corresponding to input A0 is 2 and the weight value corresponding to input A1 is 0.

As described above, each of the input values 2405 in the input value buffer is wired to at least two different multiplexers (in some embodiments, some of the input values are wired to three multiplexers). In this example, both of the multiplexers 2410 and 2415 that receive input value A0 (which has a weight value of 2) select this input, whereas for a network with ternary weight values two multiplexers would not normally be configured to both select the same input value (especially an input value with a nonzero weight).

The ternary MAC circuit 2420 thus receives A0 as both of its inputs, although in many cases the input value with a +2 or −2 weight value would be wired to two multiplexers that are further apart and do not provide inputs to the same ternary MAC circuit (e.g., if A2 had a corresponding weight value of +2 or −2). As shown, the ternary MAC circuit 2420 also receives weight values of +1 for both of its inputs, such that this circuit will output A0+A0=2×A0, thus correctly applying the +2 weight to the input value A0. Similarly, if an input value has a corresponding weight value of −2, then that input value will be selected by two multiplexers to which it is wired, and the corresponding weight values provided to the ternary MAC circuit or circuits that receive these input values will be −1.

While the solution shown in FIG. 24 is an optimal one for handling filters with quinary weight values, if the number of +2/−2 weight values is large or the sparsity is not much above 75%, then such a solution will likely not be possible. In such cases, both multiplexers that receive each of the input values with +2/−2 weights will not always be free to select these input values (e.g., assuming exactly two wires per input value, if any multiplexer receives two different inputs with +2 or −2 corresponding weight values, then no solution is possible).

In these cases, however, the compiler can use filter splitting techniques to enable the use of quinary weights. Rather than move half of the input values to a different input value buffer (either the secondary buffer or a buffer with a different index), the entire filter is duplicated. Weight values of +2/−2 are represented by +1/−1 in both filters, while weight values of +1/−1 are represented by +1/−1 in the first filter and 0 in the second filter.

Figure 25:
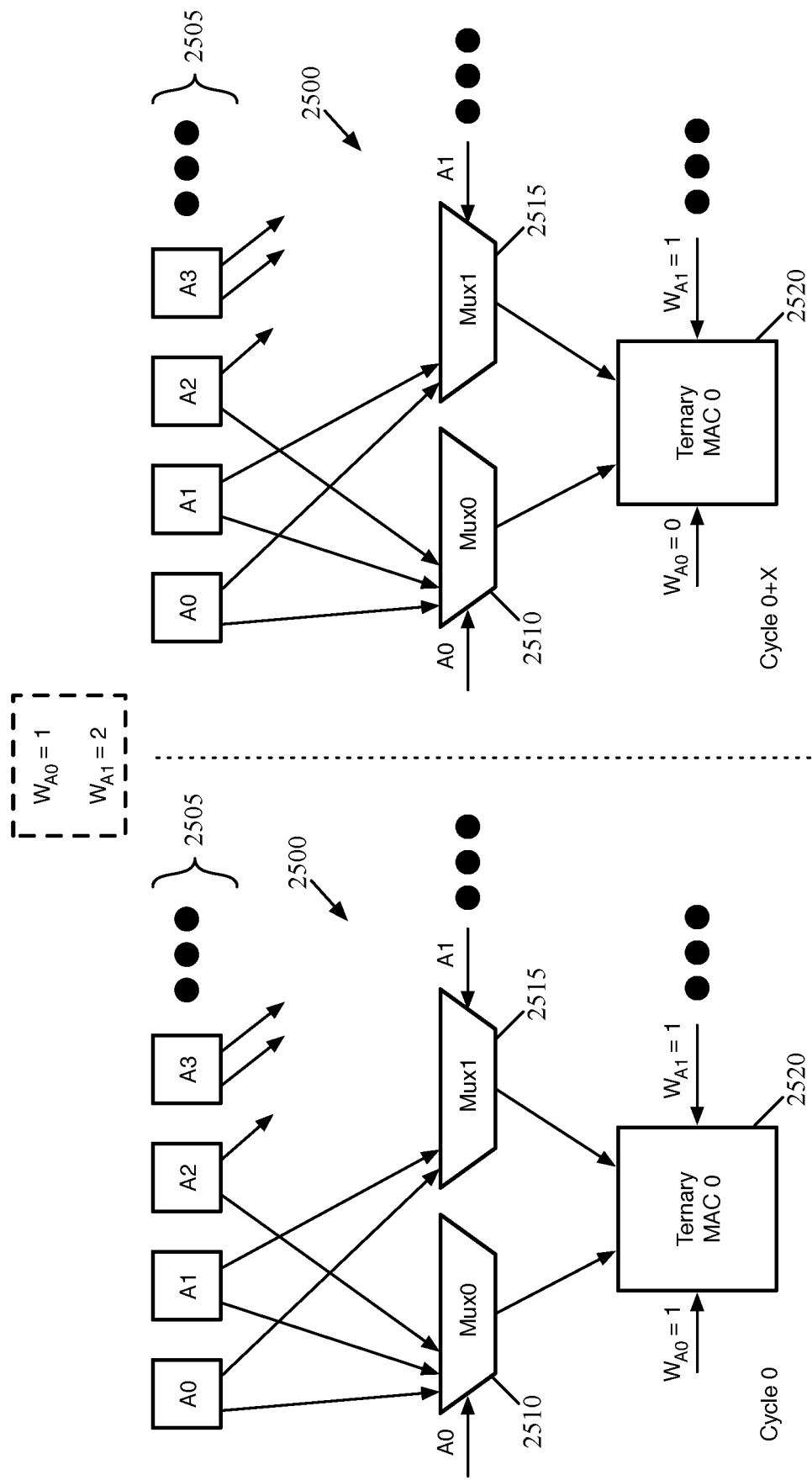
FIG. 25 conceptually illustrates an example of a solution for quinary weights that uses a single partial dot product computation circuit while incurring additional latency.

FIG. 25 conceptually illustrates an example of a first solution for quinary weights that uses a single partial dot product computation circuit 2500 (i.e., a single adder tree index) while incurring additional latency (similar to the filter splitting shown in FIG. 20). This figure shows input values 2505 (including the wiring for input values A0 and A1), two of the input multiplexers 2510 and 2515, and one of the ternary MAC circuits 2520. In addition, the figure indicates that the weight value corresponding to input value A0 is 1 and the weight value corresponding to input value A2 is 2.

In the first clock cycle, the first multiplexer 2510 is configured to select input value A0 and the second multiplexer 2515 is configured to select input value A1, so that the ternary MAC circuit 2520 receives A0 and A1 as its inputs. This ternary MAC circuit 2520 receives the values +1 for both weight values, and therefore outputs the value A0+A1 to the remainder of the adder tree circuit.

In the second clock cycle, the first multiplexer 2510 is again configured to select input value A0 and the second multiplexer 2515 is configured to select input value A1, such that the ternary MAC circuit 2520 again receives A0 and A1 as its inputs. However, the ternary MAC circuit 2520 receives the value 0 as the weight for input A0 and +1 as the weight for input A1. Thus, the circuit outputs the value A1 in the second clock cycle, and the total contribution to the dot product from these inputs is A0+(2×A1). For both the first and second clock cycles, the same input values from the primary activation buffer are used. However, in the first clock cycle, weight values from the primary weight value buffer are used and, in the second clock cycle, weight values from the secondary weight value buffer are used. Weight values of +1 are loaded into the primary weight value buffer for weights that are +1 or +2, while weight values of +1 are only loaded into the secondary weight value buffer for weights that are +2 (with the equivalent negative values used for weights of −1 and −2).

As noted above, filter splitting can be accomplished by dividing a filter over time (using multiple clock cycles) or by dividing a filter over space (using multiple dot product indices in a single clock cycle). The same applies to the use of quinary weights; as an alternative to duplicating the +2/−2 values of a filter into a second clock cycle (using the secondary weight value buffer), some embodiments duplicate these values into a second filter index and configure the post-processing unit to add the results of both dot product indices.

Figure 26:
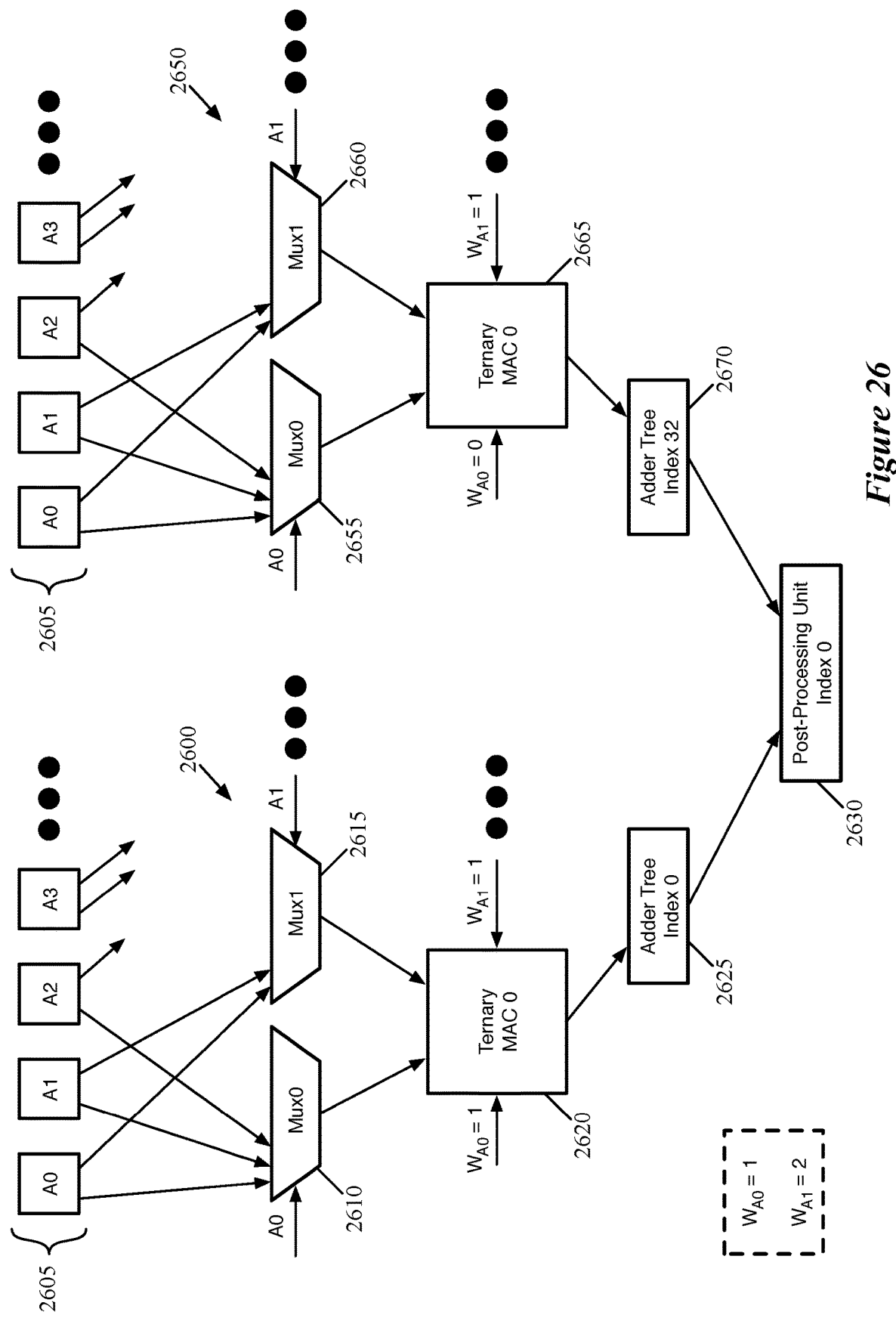
FIG. 26 conceptually illustrates an example of a solution for quinary weights that avoids extra latency for the dot product by using a second adder tree index.

FIG. 26 conceptually illustrates an example of this solution for quinary weights that avoids extra latency for the dot product by using a second adder tree index (similar to the filter splitting shown in FIG. 21). This figure shows input values 2605 as well as two partial dot product computation circuits 2600 and 2650 in the same core that receive these input values. In addition, the figure indicates that the weight value corresponding to input value A0 is 1 and the weight value corresponding to input value A1 is 2.

The input values 2605 are shown twice, as the activation window buffer in the core is wired to both of these partial dot product computation circuits 2600 and 2650 (as well as to all of the other such circuits in the core). The first partial dot product computation circuit 2600 has index 0 and the second partial dot product computation circuit has index 32, such that the post-processing unit 2630 with index 0 receives the output of both of these circuits (as aggregated by the respective dot product bus lanes, which are not shown in the figure).

The two separate groups of multiplexers receive the same configuration and thus select the same input values in both partial dot product computation circuits 2600 and 2650. As shown, multiplexers 2610 and 2655 both select A0, while multiplexers 2615 and 2660 both select A1. As such, both of the ternary MAC circuits 2620 and 2665 receive A0 and A1 as their input values. However, where these two computations differ is that the ternary MAC circuit 2620 receives the values +1 for both of its weight values, whereas the ternary MAC circuit 2665 receives the value 0 as the weight value for A0 and the value 1 as the weight value for A1. Thus, the ternary MAC circuit 2620 outputs the value A0+A1 to the adder tree 2625 with index 0 while the ternary MAC circuit 2665 outputs the value A1 to the adder tree 2670 with index 32. These adder trees 2625 and 2670 receive the outputs of their respective additional ternary MAC circuits and provide their outputs to different dot product bus lanes, which are added together at the post-processing unit 2630 with index 0 (i.e., this post-processing unit in one of the channel segments). As in the previous example, the total contribution to the dot product from these two inputs is A0+(2×A1). Using this technique, the neural network computation fabric can simultaneously compute the dot products for a network layer with up to 32 filters having quinary weights.

In some embodiments, the compiler uses both of these filter splitting techniques to handle filters with quinary weights (i.e., either using the secondary weight value buffer and incurring a latency penalty or moving the second half of the filter to a weight value buffer with a different index), depending on the requirements of the network. For example, if the number of filters is large and all of the filters use quinary weights, then using the secondary weight value buffers and incurring the latency penalty may be preferred. On the other hand, if the filters have a large number of weights (such that the dot products have more components than can be computed in a single cycle), then the compiler of some embodiments duplicates the filters into multiple dot product indices, as the secondary buffers are already needed.

Figure 27:
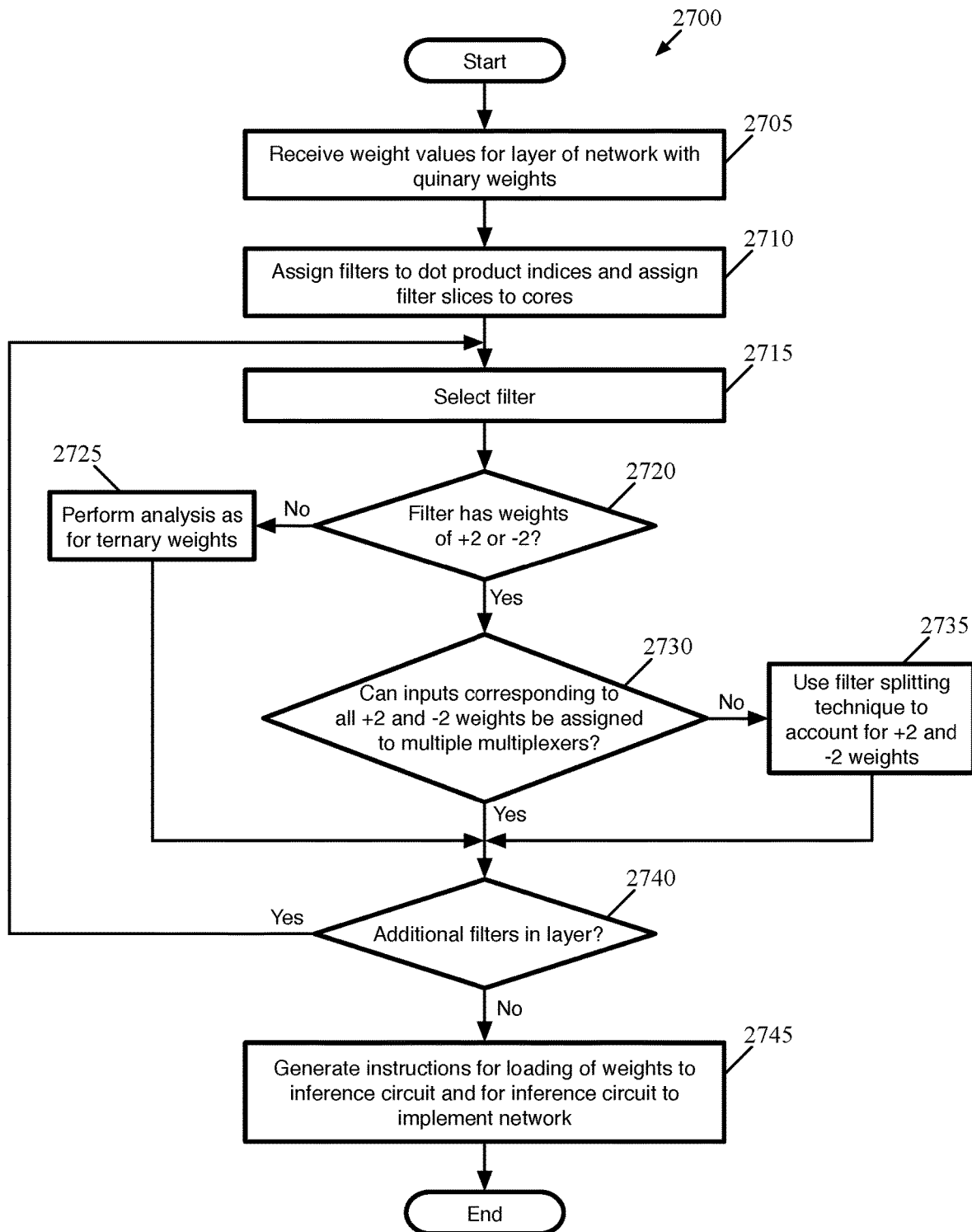
FIG. 27 conceptually illustrates a process of some embodiments for generating program instructions for a layer of a neural network that uses quinary weights.

In addition, the compiler of some embodiments attempts to avoid duplicating filters with quinary weights when possible (i.e., as shown in FIG. 24). FIG. 27 conceptually illustrates a process 2700 of some embodiments for generating program instructions for a layer of a neural network that uses quinary weights. The process 2700 is performed by a compiler of some embodiments in order to generate neural network program instructions that can be executed by the neural network computation fabric. As mentioned, the compiler receives a neural network definition (e.g., definitions for each layer, including layer type, filter dimensions, and parameter values, including weights). The process 2700 relates specifically to a process performed by the compiler to assign the filters of a convolutional layer to different filter slice buffers and generate instructions that define the configuration data for the input multiplexers of the partial dot product computation circuits specifying which input values to select and for the post-processing units specifying which inputs to enable and disable. It should be understood that other operations will also be performed by the compiler in some embodiments (e.g., assigning the active cores for the particular layer, assigning the channel segment to perform post-processing for each post-processing unit, etc.).

As shown, the process 2700 begins by receiving (at 2705) weight values for the filters of a network layer that uses quinary weights. In some embodiments, the filter dimensions are defined by a kernel size (e.g., 3×3, 5×5, etc.) as well as the number of channels (which is based on the output values of the previous layer). Based on the training of the neural network, the compiler receives the weight values for each filter. In some embodiments, each of these weight values is in the set $\{0, \alpha, -\alpha, 2\alpha, -2\alpha\}$, with a varying for each layer. In some such embodiments, the compiler receives these weights normalized to $\{0, 1, -1, 2, -2\}$ along with $\alpha$ as a scaling value. As discussed, in some embodiments, ideally at least 75% of the weight values of each filter are 0; however, in some cases, even if the overall sparsity of the network is greater than 75%, a single filter may not meet this threshold.

Next, the process assigns (at 2710) each of the filters to a dot product index, divides the filters into filter slices, and assigns these filters to cores of the neural network computation circuit. These operations of some embodiments are described above by reference to FIG. 23. In some embodiments, for the initial assignment, each filter is assigned to a single dot product index, even if the filter has weight values of +2 and/or −2. For networks with quinary weights, some embodiments restrict the number of filters that may be assigned to 32, because of the potential need to use secondary dot product indices for many of the filters. In some such embodiments, layers with more than 32 filters are divided across two sets of computations. That is, the first group of filters would be loaded and used for all of their nodes (with successively different sets of input values), then another group of filters would be loaded (such that all of the input values would have to be loaded multiple times).

The process 2700 then selects (at 2715) a filter. Some embodiments start at the filter assigned to dot product index 0 and proceed from that point. The process 2700 determines (at 2720) whether the filter has at least one weight value of +2 or −2 (i.e., does the selected filter include quinary weights). If the selected filter does not include any such weight values (i.e., all of the weight values are in the set $\{0, 1, -1\}$, then the process performs (at 2725) analysis on the filter as for ternary weights. In some embodiments, this involves verifying whether each filter slice needs to be split, and splitting the filter if necessary, as shown in operations 2325-2355 of FIG. 23.

On the other hand, if the filter does have at least one weight value of +2 or −2, the process determines (at 2730) whether all of the input values with corresponding weights of +2 and −2 can be assigned to multiple multiplexers, as in FIG. 24. As previously noted, this will usually require either very few such weight values or a very sparse filter (e.g., ~90% zeros). If, for example, there are more than 18 (or 20, if the redundant circuits shown in FIG. 14 are used) weight values of +2 or −2 in a filter slice of 144 weight values, then the input values corresponding to these cannot all be mapped to multiple multiplexers. In addition, if the number of weight values of +2 or −2 in a filter slice multiplied by two, plus the number of weight values of +1 or −1, is greater than 36 (or 40 for redundant circuits), then the input values corresponding to these weight values cannot all be mapped to separate multiplexers as needed.

If all of the input values with weights corresponding to +2 or −2 can be mapped to multiple multiplexers successfully, then the compiler uses these mappings for each of these filter slices. However, when this is not the case, the process uses (at 2735) a filter splitting technique to account for the +2 and −2 weight values. Some embodiments always use the time-multiplexing technique (i.e., using the secondary weight value buffers and a second clock cycle as shown in FIG. 25), while other embodiments always use a second dot product index as shown in FIG. 26. Still other embodiments use one or the other of these solutions depending on the other characteristics of the network layer (i.e., whether the secondary buffers are already needed for large dot products or large input values, the number of filters in the layer, etc.). Some embodiments perform operations 2730 and 2735 separately for each filter slice, only using the filter splitting technique for filter slices where it is required. Other embodiments, however, duplicate all of the filter slices into either the secondary buffer or a second dot product index (while changing the +1 and −1 weight values to 0) if the input values for any of the filter slices cannot be mapped successfully.

The process 2700 then determines (at 2740) whether the layer includes additional filters. If additional filters remain, the process returns to 2715 to select the next filter. Once all of the filters have been verified and reassigned as needed, the process generates (at 2745) instructions (i) for loading weights to the neural network computation circuit and (ii) for the circuit to execute the network. These instructions, in some embodiments, specify the order of the weights and to which core they are assigned (so that they will be loaded into the correct filter slice buffers in the correct order), and account for the duplication of filters with quinary weights. In addition, the instructions identify the active cores for the layer, the mapping of input values to multiplexers for each node, any use of secondary dot product inputs for post-processing units, etc.

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT devices), etc.

Figure 28:
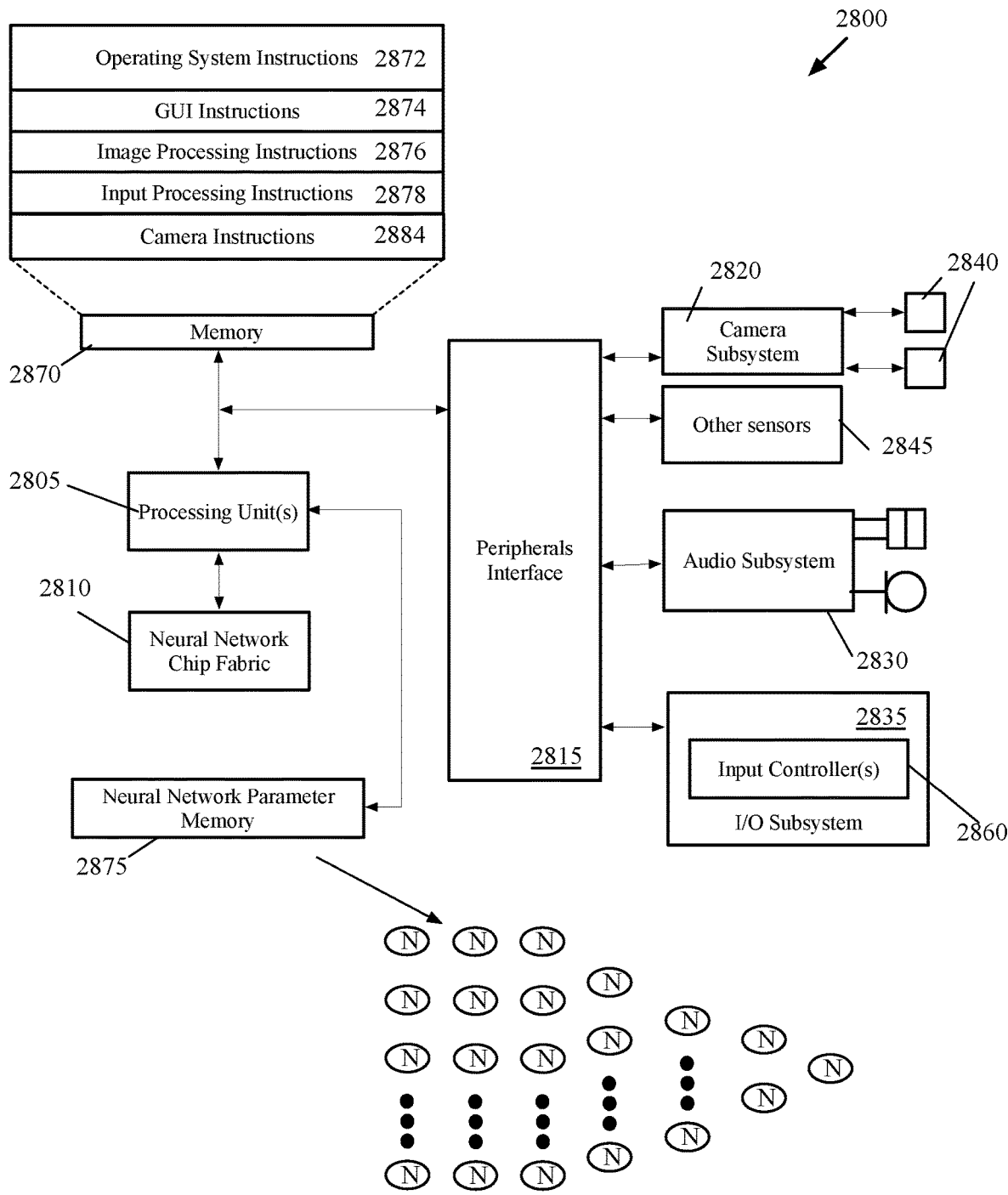
FIG. 28 is an example of an architecture of an electronic device that includes the neural network integrated circuit of some embodiments.

FIG. 28 is an example of an architecture 2800 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 2800 includes one or more general-purpose processing units 2805, a neural network chip fabric 2810, and a peripherals interface 2815.

The peripherals interface 2815 is coupled to various sensors and subsystems, including a camera subsystem 2820, an audio subsystem 2830, an I/O subsystem 2835, and other sensors 2845 (e.g., motion/acceleration sensors), etc. The peripherals interface 2815 enables communication between the processing units 2805 and various peripherals. For example, an orientation sensor (e.g., a gyroscope) and an acceleration sensor (e.g., an accelerometer) can be coupled to the peripherals interface 2815 to facilitate orientation and acceleration functions. The camera subsystem 2820 is coupled to one or more optical sensors 2840 (e.g., charged coupled device (CCD) optical sensors, complementary metal-oxide-semiconductor (CMOS) optical sensors, etc.).

The camera subsystem 2820 and the optical sensors 2840 facilitate camera functions, such as image and/or video data capturing.

The audio subsystem 2830 couples with a speaker to output audio (e.g., to output voice navigation instructions). Additionally, the audio subsystem 2830 is coupled to a microphone to facilitate voice-enabled functions, such as voice recognition, digital recording, etc. The I/O subsystem 2835 involves the transfer between input/output peripheral devices, such as a display, a touch screen, etc., and the data bus of the processing units 2805 through the peripherals interface 2815. The I/O subsystem 2835 various input controllers 2860 to facilitate the transfer between input/output peripheral devices and the data bus of the processing units 2805. These input controllers 2860 couple to various input/control devices, such as one or more buttons, a touch-screen, etc.

In some embodiments, the device includes a wireless communication subsystem (not shown in FIG. 28) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 28, a memory 2870 (or set of various physical storages) stores an operating system (OS) 2872. The OS 2872 includes instructions for handling basic system services and for performing hardware dependent tasks. The memory 2870 also stores various sets of instructions, including (1) graphical user interface instructions 2874 to facilitate graphic user interface processing; (2) image processing instructions 2876 to facilitate image-related processing and functions; (3) input processing instructions 2878 to facilitate input-related (e.g., touch input) processes and functions; and (4) camera instructions 2884 to facilitate camera-related processes and functions. The processing units 2810 execute the instructions stored in the memory 2870 in some embodiments.

The memory 2870 may represent multiple different storages available on the device 2800. In some embodiments, the memory 2870 includes volatile memory (e.g., high-speed random access memory), non-volatile memory (e.g., flash memory), a combination of volatile and non-volatile memory, and/or any other type of memory.

The instructions described above are merely exemplary and the memory 2870 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 2875 stores the weight values, bias parameters, etc. for implementing one or more machine-trained networks by the neural network chip fabric 2810. As mentioned above, different clusters of cores of the fabric 2810 can implement different machine-trained networks in parallel in some embodiments. In different embodiments, these neural network parameters are stored on-chip (i.e., in memory that is part of the neural network chip fabric 2810) or loaded onto the IC 2810 from the neural network parameter memory 2875 via the processing unit(s) 2805.

While the components illustrated in FIG. 28 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 2805 and the neural network IC 2810, which enables the processing units 2805 to provide inputs to the neural network IC 2810 and receive the outputs of the network from the IC 2810. Also, while many of the functions have been described as being performed by one component, one of ordinary skill in the art will realize that the functions described with respect to FIG. 28 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 29:
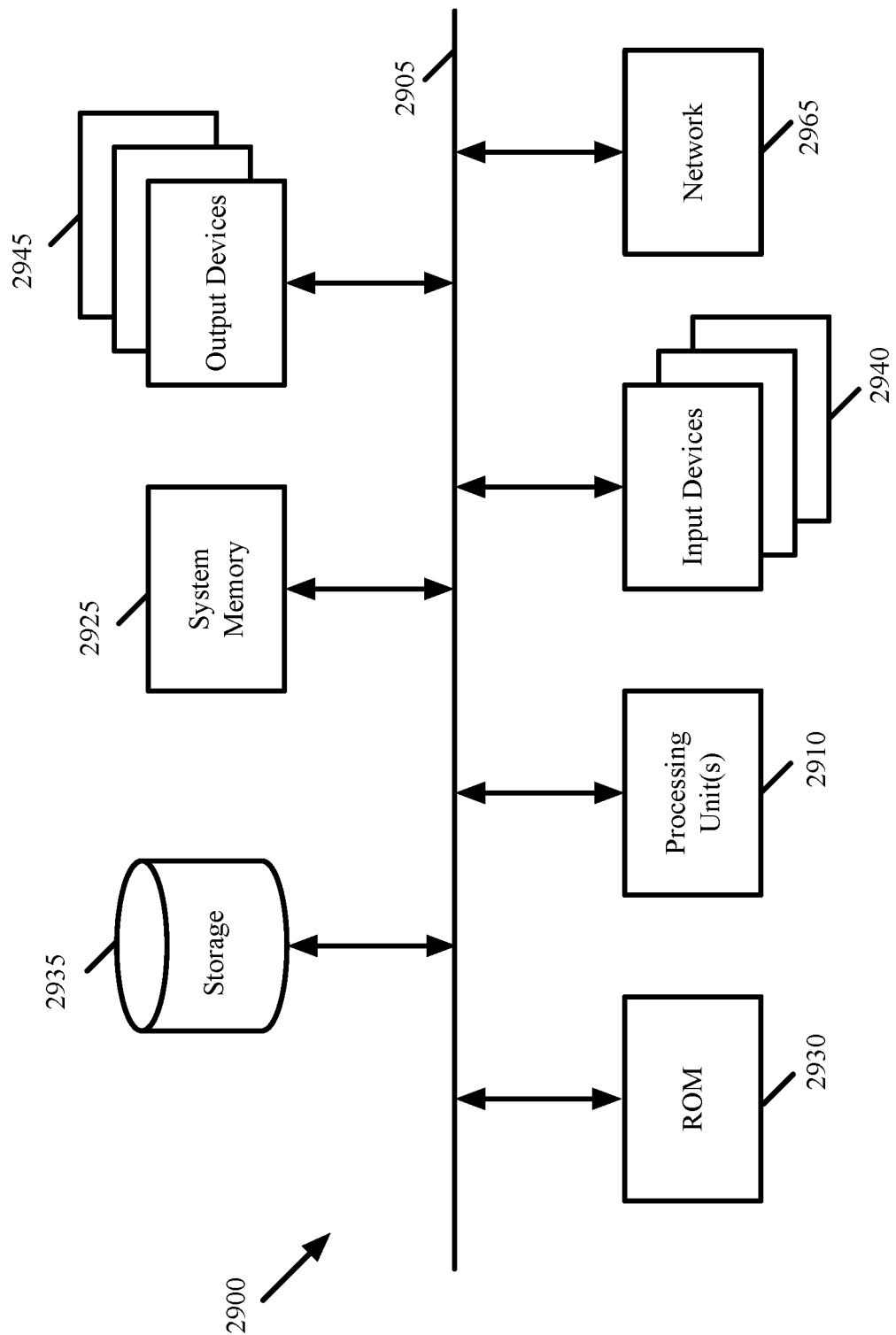
FIG. 29 conceptually illustrates an electronic system with which some embodiments of the invention are implemented.

FIG. 29 conceptually illustrates an electronic system 2900 with which some embodiments of the invention are implemented. The electronic system 2900 can be used to execute any of the control and/or compiler systems described above in some embodiments. The electronic system 2900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2900 includes a bus 2905, processing unit(s) 2910, a system memory 2925, a read-only memory 2930, a permanent storage device 2935, input devices 2940, and output devices 2945.

The bus 2905 collectively represents all system, peripheral, and chipset buses that communicatively connect the numerous internal devices of the electronic system 2900. For instance, the bus 2905 communicatively connects the processing unit(s) 2910 with the read-only memory 2930, the system memory 2925, and the permanent storage device 2935.

From these various memory units, the processing unit(s) 2910 retrieves instructions to execute and data to process in order to execute the processes of the invention. The processing unit(s) may be a single processor or a multi-core processor in different embodiments.

The read-only-memory (ROM) 2930 stores static data and instructions that are needed by the processing unit(s) 2910 and other modules of the electronic system. The permanent storage device 2935, on the other hand, is a read-and-write memory device. This device is a non-volatile memory unit that stores instructions and data even when the electronic system 2900 is off. Some embodiments of the invention use a mass-storage device (such as a magnetic or optical disk and its corresponding disk drive) as the permanent storage device 2935.

Other embodiments use a removable storage device (such as a floppy disk, flash drive, etc.) as the permanent storage device. Like the permanent storage device 2935, the system memory 2925 is a read-and-write memory device. However, unlike storage device 2935, the system memory is a volatile read-and-write memory, such a random-access memory. The system memory stores some of the instructions and data that the processor needs at runtime. In some embodiments, the invention's processes are stored in the system memory 2925, the permanent storage device 2935, and/or the read-only memory 2930. From these various memory units, the processing unit(s) 2910 retrieves instructions to execute and data to process in order to execute the processes of some embodiments.

The bus 2905 also connects to the input and output devices 2940 and 2945. The input devices enable the user to communicate information and select commands to the electronic system. The input devices 2940 include alphanumeric keyboards and pointing devices (also called "cursor control devices"). The output devices 2945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 29, bus 2905 also couples electronic system 2900 to a network 2965 through a network adapter (not shown). In this manner, the computer can be a part of a network of computers (such as a local area network ("LAN"), a wide area network ("WAN"), or an Intranet, or a network of networks, such as the Internet. Any or all components of electronic system 2900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 15, 16, 18, 23, and 27) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for compiling a neural network program for a neural network inference circuit that comprises a plurality of dot product cores that each comprises a same number of partial dot product computation circuits for computing dot products between weight values and input values, the method comprising:

receiving a neural network definition comprising a plurality of computation nodes, each computation node of a set of the computation nodes comprising a dot product between (i) a set of weight values of a filter and (ii) a set of input values for the computation node;

assigning a group of filters to specific partial dot product computation circuits, each filter in the group assigned to a different set of the partial dot product computation circuits;

when a particular filter does not have enough weight values equal to zero for a first set of partial dot product computation circuits to which the particular filter is assigned to compute dot products for the computation nodes that use the particular filter, dividing the particular filter between the first set of partial dot product computation circuits and a second set of partial dot product computation circuits; and generating program instructions for instructing the neural network inference circuit to execute the neural network by using the first and second partial dot product computation circuits to compute the dot products for the computation nodes that use the particular filter, wherein each partial dot product computation circuit is assigned an index and each set of partial dot product computation circuits having a same index comprises one partial dot product computation circuit from each core that are connected by a separate dot product aggregation bus.

2. The method of claim 1, wherein each separate dot product aggregation bus aggregates partial dot products from the partial dot product computation circuits that connect to the dot product aggregation bus.

3. The method of claim 1, wherein assigning the particular filter to the first set of the partial dot product computation circuits comprises assigning the particular filter to partial dot product computation circuits having a same index in each core of a set of the cores.

4. The method of claim 3, wherein dividing the particular filter comprises assigning a first subset of the weight values of the particular filter to the first set of partial dot product computation circuits and assigning a second subset of the weight values of the particular filter to the second set of partial dot product computation circuits.

5. The method of claim 4, wherein:
the neural network inference circuit further comprises the same number of sets of post-processing circuits as partial dot product computation circuits in each core;
a particular post-processing circuit in the set of post-processing circuits having the same index as the first set of partial dot product computation circuits receives an aggregated dot product from the dot product aggregation bus connected to the first set of partial dot product computation circuits as a first input;
the particular post-processing circuit receives an aggregated dot product from the dot product aggregation bus connected to the second set of partial dot product computation circuits as a second input; and
the particular post-processing circuit adds the first and second inputs to compute the dot products for computation nodes that use the particular filter.

6. The method of claim 4, wherein the particular filter is a first filter and a second filter is initially assigned to the second set of partial dot product computation circuits, the method further comprising re-assigning a second filter that was initially assigned to the second set of partial dot product computation circuits to a third set of partial dot product computation circuits.

7. The method of claim 4, wherein the set of weight values of the particular filter is a first set of weight values, wherein dividing the particular filter further comprises:
assigning the value zero to a third set of weight values that replaces the second subset of weight values in the first set of partial dot product computation circuits; and
assigning the value zero to a fourth set of weight values that replaces the first subset of weight values in the second set of partial dot product computation circuits.

8. The method of claim 1, wherein:
each partial dot product computation circuit comprises a set of input multiplexers that reduces a first number of input values for a set of computation nodes to a second number of input values for a particular computation node; and
each of a first number of input value buffer slots is wired to at least two of the input multiplexers of at least one partial dot product computation circuit.

9. The method of claim 8, wherein:
assigning a particular filter to a set of the partial dot product computation circuits comprises assigning subsets of the weight values of the particular filter to each partial dot product computation circuit in the set; and
each weight value has a corresponding input value for each computation node that uses the particular filter that includes the weight value.

10. The method of claim 1, wherein the neural network is trained so that the plurality of filters has at least a threshold percentage of weight values equal to zero.

11. A method for compiling a neural network program for a neural network inference circuit that comprises a plurality of partial dot product computation circuits for computing dot products between weight values and input values, the method comprising:
receiving a neural network definition comprising a plurality of computation nodes, each computation node of a set of the computation nodes comprising a dot product between (i) a set of weight values of a filter and (ii) a set of input values for the computation node;
assigning a group of filters to specific partial dot product computation circuits, wherein (i) assigning a particular filter to a set of the partial dot product computation circuits comprises assigning subsets of the weight values of the particular filter to each partial dot product computation circuit in the set, (ii) each weight value has a corresponding input value for each computation node that uses the particular filter that includes the weight value, (iii) each partial dot product computation circuit comprises a set of input multiplexers that reduces a first number of input values for a set of computation nodes to a second number of input values for a particular computation node, and (iv) each of a first number of input value buffer slots is wired to at least two of the input multiplexers of at least one partial dot product computation circuit;
when the particular filter does not have enough weight values equal to zero for a first set of partial dot product computation circuits to which the particular filter is assigned to compute dot products for the computation nodes that use the particular filter, dividing the particular filter between the first set of partial dot product computation circuits and a second set of partial dot product computation circuits, wherein the particular filter does not have enough weight values equal to zero when at least one subset of the weight values has more non-zero values than each partial dot product computation circuit has input multiplexers; and
generating program instructions for instructing the neural network inference circuit to execute the neural network by using the first and second partial dot product computation circuits to compute the dot products for the computation nodes that use the particular filter.

12. A method for compiling a neural network program for a neural network inference circuit that comprises a plurality of partial dot product computation circuits for computing dot products between weight values and input values, the method comprising:
receiving a neural network definition comprising a plurality of computation nodes, each computation node of a set of the computation nodes comprising a dot product between (i) a set of weight values of a filter and (ii) a set of input values for the computation node;
assigning a group of filters to specific partial dot product computation circuits, wherein (i) assigning a particular filter to a set of the partial dot product computation circuits comprises assigning subsets of the weight values of the particular filter to each partial dot product computation circuit in the set, (ii) each weight value has a corresponding input value for each computation node that uses the particular filter that includes the weight value, (iii) each partial dot product computation circuit comprises a set of input multiplexers that reduces a first number of input values for a set of computation nodes to a second number of input values for a particular computation node, and (iv) each of a first number of input value buffer slots is wired to at least two of the input multiplexers of at least one partial dot product computation circuit;

determining, for each subset of the weight values assigned to a particular partial dot product computation circuit, whether each of the input value buffer slots for the input values that correspond to the non-zero weight values of the subset can be mapped to different input multiplexers;

when the particular filter does not have enough weight values equal to zero for a first set of partial dot product computation circuits to which the particular filter is assigned to compute dot products for the computation nodes that use the particular filter, dividing the particular filter between the first set of partial dot product computation circuits and a second set of partial dot product computation circuits; and generating program instructions for instructing the neural network inference circuit to execute the neural network by using the first and second partial dot product computation circuits to compute the dot products for the computation nodes that use the particular filter.

13. The method of claim 12, wherein the particular filter does not have enough weight values equal to zero when, for at least one subset of the weight values of the particular filter, each of the input value buffer slots for the input values that correspond to the non-zero weight values of the subset cannot be mapped to different input multiplexers.

14. A non-transitory machine-readable medium storing a program which when executed by at least one processing unit compiles a neural network program for a neural network inference circuit that comprises a plurality of dot product cores that each comprises a same number of partial dot product computation circuits for computing dot products between weight values and input values, the program comprising sets of instructions for:

receiving a neural network definition comprising a plurality of computation nodes, each computation node of a set of the computation nodes comprising a dot product between (i) a set of weight values of a filter and (ii) a set of input values for the computation node;

assigning a group of filters to specific partial dot product computation circuits, each filter in the group assigned to a different set of the partial dot product computation circuits;

when a particular filter does not have enough weight values equal to zero for a first set of partial dot product computation circuits to which the particular filter is assigned to compute dot products for the computation nodes that use the particular filter, dividing the particular filter between the first set of partial dot product computation circuits and a second set of partial dot product computation circuits; and generating program instructions for instructing the neural network inference circuit to execute the neural network by using the first and second partial dot product computation circuits to compute the dot products for the computation nodes that use the particular filter, wherein each partial dot product computation circuit is assigned an index and each set of partial dot product computation circuits having a same index comprises one partial dot product computation circuit from each core that are connected by a separate dot product aggregation bus.

15. The non-transitory machine-readable medium of claim 14, wherein:

the set of instructions for assigning the particular filter to the first set of the partial dot product computation circuits comprises a set of instructions for assigning the particular filter to partial dot product computation circuits having a same index in each core of a set of the cores; and the set of instructions for dividing the particular filter comprises a set of instructions for assigning (i) a first subset of the weight values of the particular filter to the first set of partial dot product computation circuits and (ii) a second subset of the weight values of the particular filter to the second set of partial dot product computation circuits.

16. The non-transitory machine-readable medium of claim 15, wherein:

the neural network inference circuit further comprises the same number of sets of post-processing circuits as partial dot product computation circuits in each core;

a particular post-processing circuit in the set of post-processing circuits having the same index as the first set of partial dot product computation circuits receives an aggregated dot product from the dot product aggregation bus connected to the first set of partial dot product computation circuits as a first input;

the particular post-processing circuit receives an aggregated dot product from the dot product aggregation bus connected to the second set of partial dot product computation circuits as a second input; and the particular post-processing circuit adds the first and second inputs to compute the dot products for computation nodes that use the particular filter.

17. The non-transitory machine-readable medium of claim 15, wherein the particular filter is a first filter and a second filter is initially assigned to the second set of partial dot product computation circuits, the program further comprising a set of instructions for re-assigning a second filter that was initially assigned to the second set of partial dot product computation circuits to a third set of partial dot product computation circuits.

18. The non-transitory machine-readable medium of claim 15, wherein the set of weight values of the particular filter is a first set of weight values, wherein the set of instructions for dividing the particular filter further comprises sets of instructions for:

assigning the value zero to a third set of weight values that replaces the second subset of weight values in the first set of partial dot product computation circuits; and assigning the value zero to a fourth set of weight values that replaces the first subset of weight values in the second set of partial dot product computation circuits.

19. The non-transitory machine-readable medium of claim 14, wherein:

each partial dot product computation circuit comprises a set of input multiplexers that reduces a first number of input values for a set of computation nodes to a second number of input values for a particular computation node;

each of a first number of input value buffer slots is wired to at least two of the input multiplexers of at least one partial dot product computation circuit;

the set of instructions for assigning a particular filter to a set of the partial dot product computation circuits comprises a set of instructions for assigning subsets of the weight values of the particular filter to each partial dot product computation circuit in the set; and each weight value has a corresponding input value for each computation node that uses the particular filter that includes the weight value.

20. A non-transitory machine-readable medium storing a program which when executed by at least one processing unit compiles a neural network program for a neural network inference circuit that comprises a plurality of partial dot product computation circuits for computing dot products between weight values and input values, the program comprising sets of instructions for:

receiving a neural network definition comprising a plurality of computation nodes, each computation node of a set of the computation nodes comprising a dot product between (i) a set of weight values of a filter and (ii) a set of input values for the computation node;

assigning a group of filters to specific partial dot product computation circuits, wherein (i) assigning a particular filter to a set of the partial dot product computation circuits comprises assigning subsets of the weight values of the particular filter to each partial dot product computation circuit in the set, (ii) each weight value has a corresponding input value for each computation node that uses the particular filter that includes the weight value, (iii) each partial dot product computation circuit comprises a set of input multiplexers that reduces a first number of input values for a set of computation nodes to a second number of input values for a particular computation node, and (iv) each of a first number of input value buffer slots is wired to at least two of the input multiplexers of at least one partial dot product computation circuit;

when the particular filter does not have enough weight values equal to zero for a first set of partial dot product computation circuits to which the particular filter is assigned to compute dot products for the computation nodes that use the particular filter, dividing the particular filter between the first set of partial dot product computation circuits and a second set of partial dot product computation circuits, wherein the particular filter does not have enough weight values equal to zero when at least one subset of the weight values has more non-zero values than each partial dot product computation circuit has input multiplexers; and generating program instructions for instructing the neural network inference circuit to execute the neural network by using the first and second partial dot product computation circuits to compute the dot products for the computation nodes that use the particular filter.

21. A non-transitory machine-readable medium storing a program which when executed by at least one processing unit compiles a neural network program for a neural network inference circuit that comprises a plurality of partial dot product computation circuits for computing dot products between weight values and input values, the program comprising sets of instructions for:

receiving a neural network definition comprising a plurality of computation nodes, each computation node of a set of the computation nodes comprising a dot product between (i) a set of weight values of a filter and (ii) a set of input values for the computation node;

assigning a group of filters to specific partial dot product computation circuits, wherein (i) assigning a particular filter to a set of the partial dot product computation circuits comprises assigning subsets of the weight values of the particular filter to each partial dot product computation circuit in the set, (ii) each weight value has a corresponding input value for each computation node that uses the particular filter that includes the weight value, (iii) each partial dot product computation circuit comprises a set of input multiplexers that reduces a first number of input values for a set of computation nodes to a second number of input values for a particular computation node, and (iv) each of a first number of input value buffer slots is wired to at least two of the input multiplexers of at least one partial dot product computation circuit;

determining, for each subset of the weight values assigned to a particular partial dot product computation circuit, whether each of the input value buffer slots for the input values that correspond to the non-zero weight values of the subset can be mapped to different input multiplexers;

when the particular filter does not have enough weight values equal to zero for a first set of partial dot product computation circuits to which the particular filter is assigned to compute dot products for the computation nodes that use the particular filter, dividing the particular filter between the first set of partial dot product computation circuits and a second set of partial dot product computation circuits; and generating program instructions for instructing the neural network inference circuit to execute the neural network by using the first and second partial dot product computation circuits to compute the dot products for the computation nodes that use the particular filter.

22. The non-transitory machine-readable medium of claim 21, wherein the particular filter does not have enough weight values equal to zero when, for at least one subset of the weight values of the particular filter, each of the input value buffer slots for the input values that correspond to the non-zero weight values of the subset cannot be mapped to different input multiplexers.

* * * * *